(12) United States Patent
Maki et al.

(10) Patent No.: US 8,366,210 B2
(45) Date of Patent: Feb. 5, 2013

(54) BRAKING APPARATUS FOR VEHICLE

(75) Inventors: Kazuya Maki, Nagoya (JP); Koichi Kokubo, Nagoya (JP); Masayuki Naito, Takahama (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 1187 days.

(21) Appl. No.: 11/723,108

(22) Filed: Mar. 16, 2007

(65) Prior Publication Data

US 2007/0228821 A1 Oct. 4, 2007

(30) Foreign Application Priority Data

Apr. 3, 2006 (JP) ................. 2006-102064
Apr. 3, 2006 (JP) ................. 2006-102461
Apr. 7, 2006 (JP) ................. 2006-106191
Apr. 13, 2006 (JP) ................. 2006-111242

(51) Int. Cl.
B60T 8/64 (2006.01)

(52) U.S. Cl. ....................................... 303/151

(58) Field of Classification Search ........... 303/151–152
See application file for complete search history.

(56) References Cited

U.S. PATENT DOCUMENTS

| 5,511,859 | A | 4/1996 | Kade et al. | |
| 6,216,808 | B1 * | 4/2001 | Kuno et al. | 180/65.31 |
| 6,735,511 | B2 * | 5/2004 | Nakamura et al. | 701/70 |
| 6,910,747 | B2 * | 6/2005 | Tsunehara | 303/152 |
| 6,957,870 | B2 * | 10/2005 | Kagawa et al. | 303/113.4 |
| 7,136,737 | B2 * | 11/2006 | Ashizawa et al. | 701/70 |
| 2003/0080614 | A1 * | 5/2003 | Soga | 303/152 |
| 2005/0200197 | A1 * | 9/2005 | Crombez et al. | 303/152 |
| 2005/0269875 | A1 | 12/2005 | Maki et al. | |
| 2006/0220452 | A1 | 10/2006 | Emmerich et al. | |
| 2007/0013230 | A1 * | 1/2007 | Yang | 303/152 |

FOREIGN PATENT DOCUMENTS

| CN | 1706700 A | 12/2005 |
| DE | 103 32 207 A1 | 2/2005 |
| DE | 10 2005 024 339 A1 | 1/2006 |
| JP | 2006-021745 A | 1/2006 |
| WO | WO 2004/080774 A1 | 9/2004 |

OTHER PUBLICATIONS

German Office Action dated Jun. 11, 2010 issued in the corresponding German Patent Application No. 10 2007 000 195.0-21, and English language translation of German Office Action.
Chinese Office Action dated Nov. 26, 2010 issued in the corresponding Chinese Patent Application No. 200710090669.4, and English-language translation thereof.

\* cited by examiner

Primary Examiner — Robert A Siconolfi
Assistant Examiner — Anna Momper
(74) Attorney, Agent, or Firm — Buchannan Ingersoll & Rooney PC

(57) ABSTRACT

A braking apparatus for a vehicle includes a hydraulic brake apparatus generating a basic hydraulic pressure so that a basic hydraulic braking force is generated at wheels, the hydraulic brake apparatus generating a controlled hydraulic pressure so that a controlled hydraulic braking force is generated at the wheels, a regenerative brake apparatus causing a regenerative braking force to be generated at any of the wheels, and braking force replacement controlling means for gradually replacing the regenerative braking force with the controlled hydraulic braking force while braking during which at least the regenerative braking force is applied for a purpose of achieving a braking force replacement control to ensure a total braking force required for the wheels by decreasing the regenerative braking force at a gradient within a predetermined range and by increasing the controlled hydraulic braking force in response to the decrease of the regenerative braking force.

17 Claims, 27 Drawing Sheets

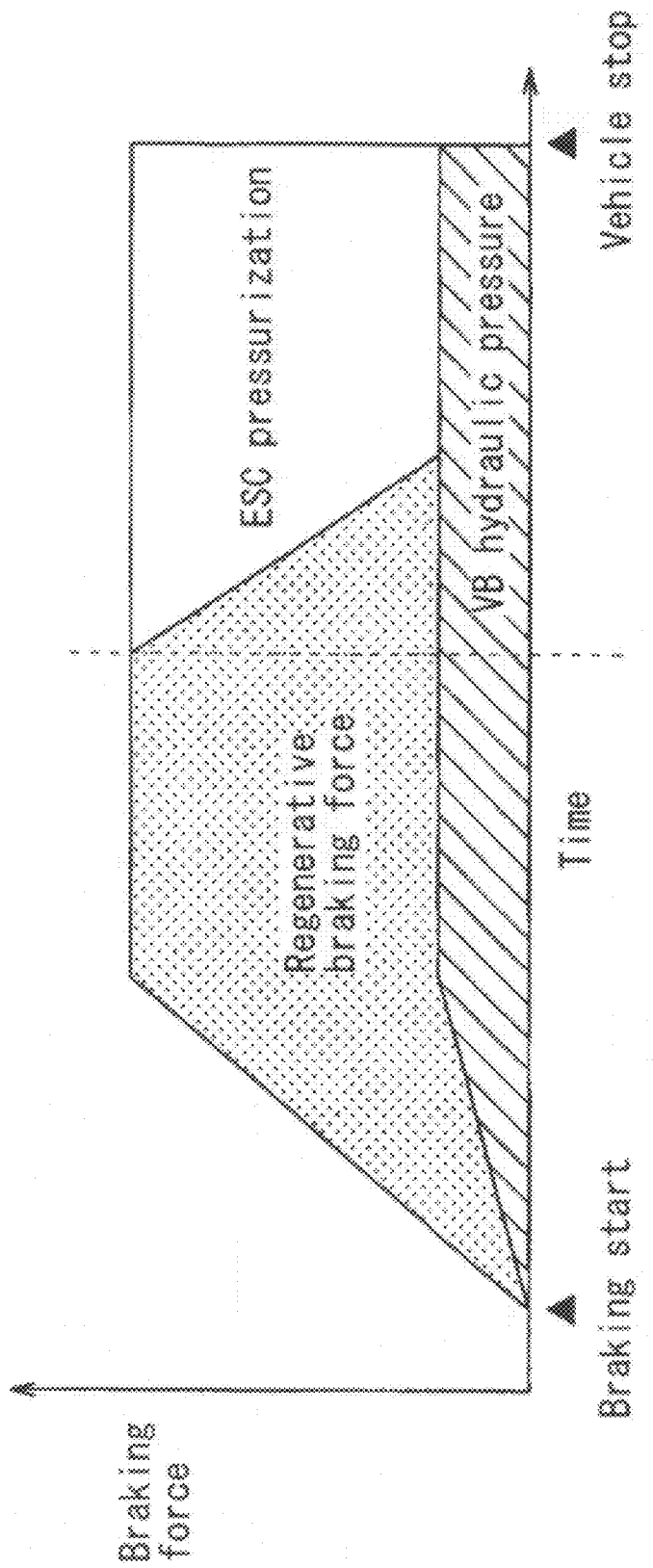

F I G. 30
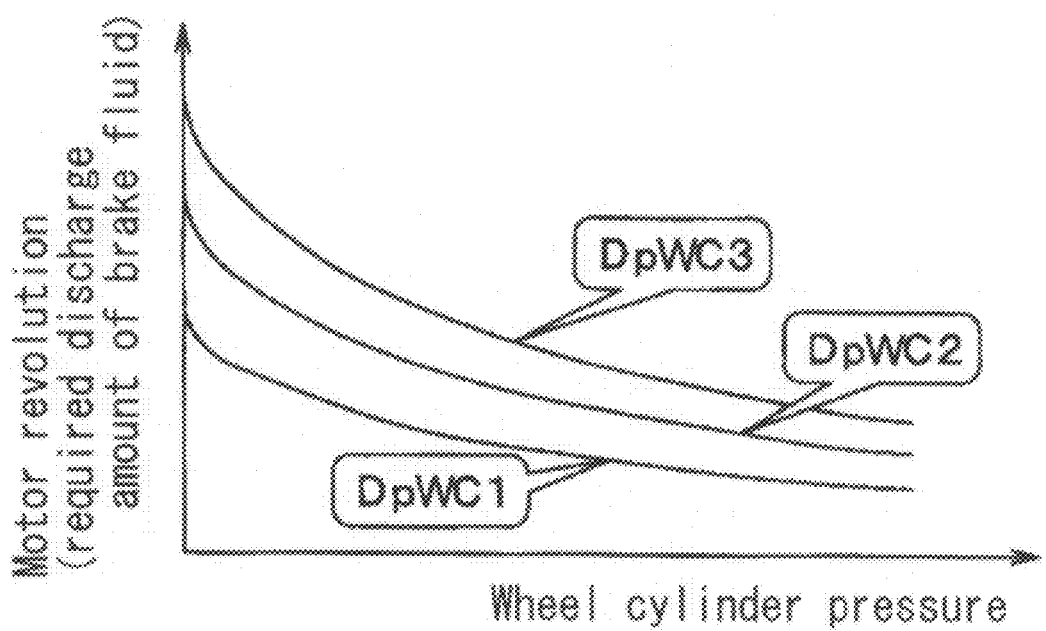

BRAKING APPARATUS FOR VEHICLE

CROSS REFERENCE TO RELATED APPLICATIONS

This application is based on and claims priority under 35 U.S.C. §119 to Japanese Patent Application No. 2006-102064 filed on Apr. 3, 2007, No. 2006-111242 filed on Apr. 13, 2007, No. 2006-102461 filed on Apr. 3, 2007, and 2006-106191 filed on Apr. 7, 2007, the entire contents of which are incorporated herein by reference.

FIELD OF THE INVENTION

This invention generally relates to a braking apparatus for a vehicle. More particularly, this invention pertains to a braking apparatus for a vehicle that achieves a total braking force applied to wheels in response to a brake operation state as a sum of a hydraulic braking force generated by a hydraulic brake apparatus and a regenerative braking force generated by a regenerative brake apparatus.

BACKGROUND

A known braking apparatus for a vehicle such as disclosed in JP2006-21745A includes a hydraulic brake apparatus and a regenerative brake apparatus. The hydraulic brake apparatus generates a basic hydraulic pressure by a master cylinder in response to a brake operation, and applies the generated basic hydraulic pressure to wheel cylinders provided at respective wheels connected to the master cylinder by means of a fluid passage at which a hydraulic pressure control valve is provided so that a basic hydraulic braking force is generated at each of the wheels. In addition, the hydraulic brake apparatus applies to the wheel cylinders a controlled hydraulic pressure that is generated by a driving of a pump so that a controlled hydraulic braking force is generated at each of the wheels corresponding to the respective wheel cylinders where the controlled hydraulic pressure is applied. The regenerative brake apparatus causes a regenerative braking force to be generated at the front or rear wheels in response to the state of the brake operation.

According to the aforementioned braking apparatus for a vehicle, a braking force replacement control (i.e., replacement of the regenerative braking force with the controlled hydraulic braking force) is performed for the purposes of ensuring a total braking force required for the wheels by gradually replacing the regenerative braking force with the controlled hydraulic braking force while braking during which at least the application of the regenerative braking force is performed.

The braking force replacement control will be explained with reference to FIG. 9. An upper view in FIG. 9 illustrates a correlation between the braking force and time while a lower view illustrates a correlation between a stroke of a brake pedal and time. At t1, the driver starts depressing the brake pedal in a vehicle in motion. From t1 to t2, the brake pedal is moved at a predetermined depressing speed. From t2 to t3, an amount of depression of the brake pedal is constant. From t1 to t3, the basic hydraulic braking force (portion with a rising diagonal stroke from bottom left to top right indicated as "VB hydraulic pressure" in FIG. 9) and the regenerative braking force (portion with a rising diagonal stroke from bottom right to top left indicated as "regenerative braking force" in FIG. 9) are applied to the wheels. That is, a regenerative cooperative braking is performed.

When the vehicle speed decreases, the regenerative braking force decreases accordingly, which may lead to insufficiency of the regenerative braking force in the total braking force required for the wheels. The shortage of the regenerative braking force is covered or compensated by the controlled hydraulic braking force (portion with a rising diagonal stroke from bottom right to top left indicated as "ESC pressurization in FIG. 9). That is, the braking force replacement control is performed in such a way to be started at t3 and finished at t4.

As illustrated in FIG. 10, when the vehicle speed reaches a predetermined speed (i.e., start replacement vehicle speed) Va1 at t3, the regenerative braking force starts decreasing. When the vehicle speed further decreases to reach a predetermined speed (i.e., end replacement vehicle speed) Vb1, the application of the regenerative braking force is stopped. That is, the braking force replacement control is started when the vehicle speed reaches the predetermined speed Va1 and is stopped when the vehicle speed reaches the predetermined speed Vb1. Accordingly, after a point of t4, the basic hydraulic braking force and the controlled hydraulic braking force are applied to the wheels and finally the vehicle is stopped at t5.

According to the braking apparatus for a vehicle disclosed in JP2006-21745A, while the braking force replacement control is being conducted between t3 and t4, the brake pedal is further depressed or lowered without further action by the driver, i.e., the pedal stroke becomes larger than that obtained during a period between t2 and t3, because of an operation of a pump for applying the controlled hydraulic pressure to the wheel cylinders. As a result, the driver may have an uncomfortable feeling that the brake pedal is further depressed or lowered without his or her further action.

Especially, when comparing the cases illustrated in FIG. 10 and FIG. 11 in which a deceleration of the vehicle is greater than that in FIG. 10, a time period for the vehicle speed to reach the end replacement vehicle speed is shorter in FIG. 11 because of the large deceleration even if the braking force replacement control is started at the same time of t3 with the same regenerative braking force. That is, in FIG. 11, a decreasing rate of the regenerative braking force is large and thus a depressing speed of the brake pedal becomes large regardless of the same amount of the pedal stroke. Accordingly, the driver of the vehicle may have an uncomfortable feeling that the brake pedal is depressed suddenly without further action.

In addition, in the case of replacing the regenerative braking force with the controlled hydraulic braking force, a brake fluid supplied by the pump at the time of replacement start becomes insufficient and thus a start-up delay of the controlled hydraulic braking force may occur, thereby preventing the deceleration that has been achieved before replacement from being retained.

Thus, a need exists for a braking apparatus for a vehicle that can provide an improved brake feeling by achieving a certain depressing speed of a brake pedal during a braking force replacement control. Further, a need also exists for a braking apparatus for a vehicle that can prevent a start-up delay of a controlled hydraulic braking force at the time of replacement start caused by an insufficient brake fluid supplied by a pump for the purposes of retaining a deceleration that has been obtained before the replacement.

SUMMARY OF THE INVENTION

According to an aspect of the present invention, a braking apparatus for a vehicle includes a hydraulic brake apparatus including a master cylinder, a pump, a hydraulic pressure control valve, and a fluid passage and generating a basic hydraulic pressure by the master cylinder in response to a brake operation so as to apply the generated basic hydraulic pressure to wheel cylinders provided at respective wheels connected to the master cylinder by means of the fluid passage at which the hydraulic pressure control valve is provided so that a basic hydraulic braking force is generated at the wheels, the hydraulic brake apparatus generating a controlled hydraulic pressure by driving the pump by a motor so as to apply the generated controlled hydraulic pressure to the wheel cylinders so that a controlled hydraulic braking force is generated at the wheels, a regenerative brake apparatus causing a regenerative braking force to be generated at any of the wheels in response to a state of the brake operation, and braking force replacement controlling means for gradually replacing the regenerative braking force with the controlled hydraulic braking force while braking during which at least the regenerative braking force is applied for a purpose of achieving a braking force replacement control to ensure a total braking force required for the wheels by decreasing the regenerative braking force at a gradient within a predetermined range and by increasing the controlled hydraulic braking force in response to the decrease of the regenerative braking force.

BRIEF DESCRIPTION OF THE DRAWINGS

The foregoing and additional features and characteristics of the present invention will become more apparent from the following detailed description considered with reference to the accompanying drawings, wherein:

FIG. 26 is a time chart illustrating the composition of the braking force according to a fourth embodiment;

FIG. 30 is a graph showing a correlation between the wheel cylinder pressure and the motor revolution for each wheel cylinder pressure change amount per time unit.

DETAILED DESCRIPTION

Figure 1:
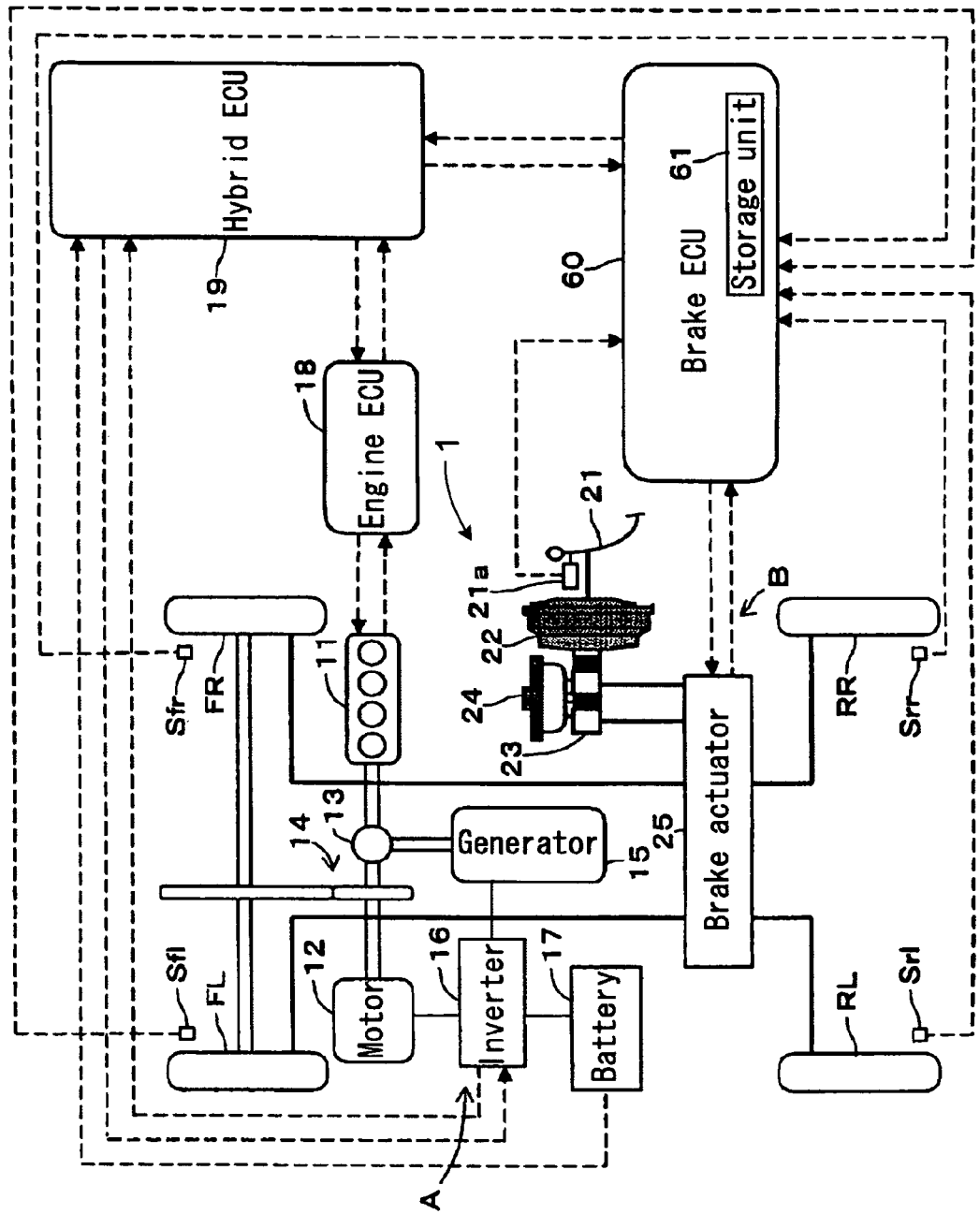
FIG. 1 is a schematic view illustrating a structure of a hybrid vehicle in which a braking apparatus for a vehicle according to embodiments of the present invention is employed.
Figure 2:
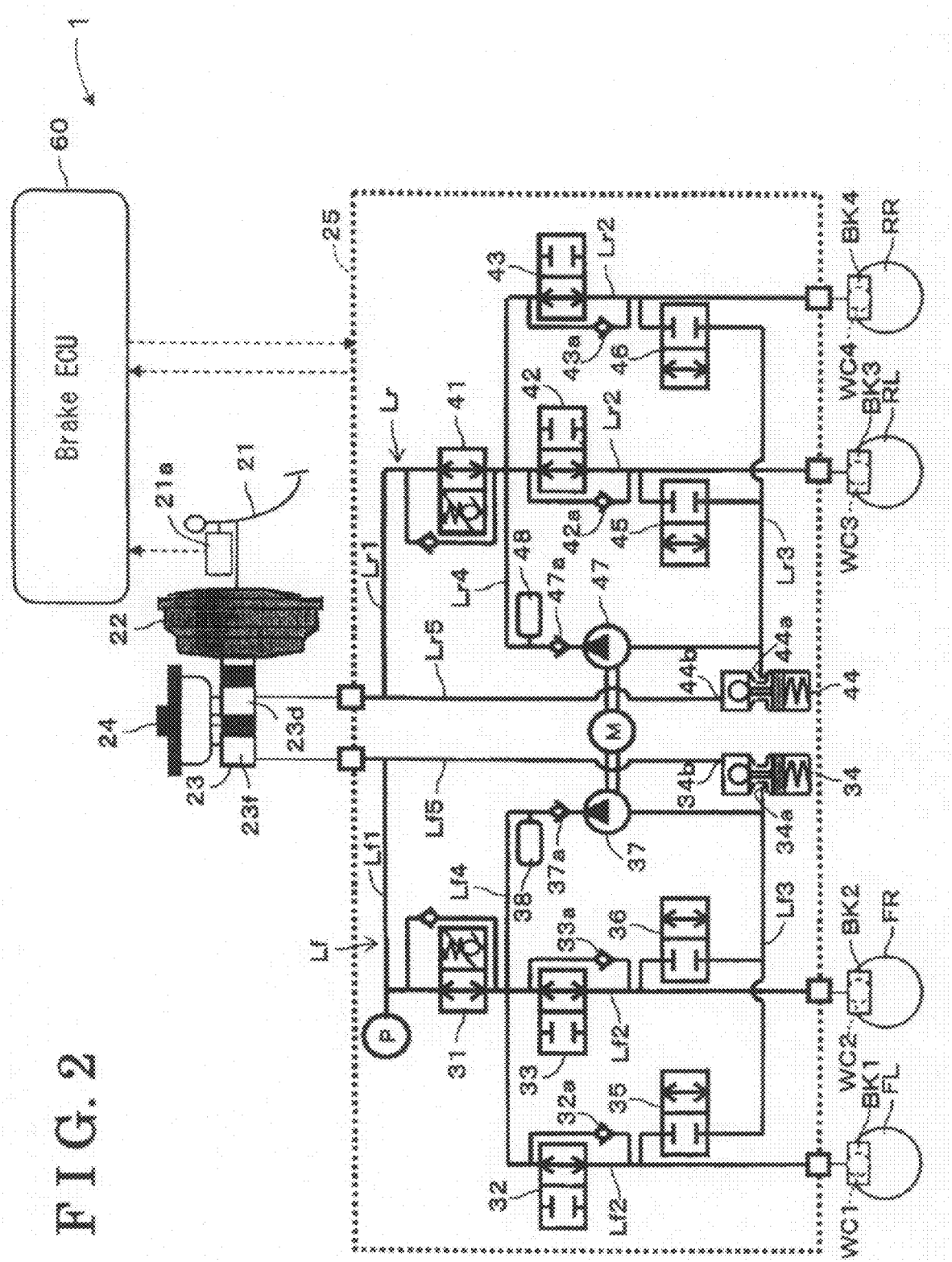
FIG. 2 is a schematic view illustrating a structure of a hydraulic brake apparatus in the hybrid vehicle according to the embodiments of the present invention.

A braking apparatus for a vehicle 1 according to a first embodiment of the present invention employed in a hybrid vehicle will be explained with reference to the attached drawings. FIG. 1 is a schematic view illustrating a structure of the hybrid vehicle. FIG. 2 is a schematic view illustrating a structure of a hydraulic brake apparatus of the hybrid vehicle. In the hybrid vehicle, driving wheels, i.e., front-left and front-right wheels FL and FR, for example, are driven by means of a hybrid system as shown in FIG. 1. The hybrid system is a power train using two types of power sources, i.e., an engine 11 and an electric motor 12, in combination. According to the present embodiment, a parallel hybrid system in which both the engine 11 and the motor 12 directly drive the wheels is used. Besides the parallel hybrid system, a series hybrid system is known, in which an electric motor drives the wheels and an engine serves as an electric power supply source to the motor.

The hybrid vehicle incorporating the parallel hybrid system includes the engine 11 and the motor 12. A driving force of the engine 11 is transmitted to the driving wheels, i.e., front-left and front-right wheels FL and FR according to the present embodiment, by means of a power distribution mechanism 13 and a power transmission mechanism 14. A driving force of the motor 12 is transmitted to the driving wheels by means of the power transmission mechanism 14. The power distribution mechanism 13 appropriately divides the driving force of the engine 11 into a vehicle driving force and a generator driving force. The power transmission mechanism 14 appropriately integrates and transmits, in response to a running condition of the vehicle, the driving forces of the engine 11 and the motor 12 to the driving wheels. The power transmission mechanism 14 adjusts the percentage of the driving force transmitted by the engine 11 relative to the driving force transmitted by the motor 12 in a range between zero to one hundred percent and one hundred to zero percent. The power transmission mechanism 14 includes a speed change function.

The motor 12 assists an output of the engine 11 so as to enhance the driving force applied to the wheels FL and FR. The motor 12 also charges a battery 17 by generating electric power while the vehicle is braking. A generator 15 generates electric power upon reception of the output of the engine 11 and functions as a starter at the time of the engine start. The motor 12 and the generator 15 are electrically connected to an inverter 16 that is electrically connected to the battery 17 serving as a direct current power source. The inverter 16 converts an alternating-current voltage input from the motor 12 and the generator 15 into a direct-current voltage, which is then supplied to the battery 17, and, oppositely, converts a direct-current voltage input from the battery 17 into an alternating-current voltage, which is then supplied to the motor 12 and to the generator 15.

According to the present embodiment, the motor 12, the inverter 16, and the battery 17 constitute a regenerative brake apparatus A. The regenerative brake apparatus A causes a regenerative braking force to be generated at either of the front wheels or the rear wheels (precisely, the front-left and front-right wheels FL and FR driven by the motor 12 as a driving source according to the present embodiment) in response to a state of a brake operation detected by a brake operation state detecting means.

The state of the brake operation is an operating state of a brake pedal (brake operation member) 21 such as an amount of stroke of the brake pedal 21, a brake pedal pressure (i.e., depression of the brake pedal 21), and a master cylinder pressure related to the brake pedal pressure. The brake operation state detecting means detecting such brake operation state is constituted by a pedal stroke sensor 21a for detecting an amount of stroke of the brake pedal 21, a pressure sensor P for detecting the master cylinder pressure, and the like.

The engine 11 is controlled by an engine ECU (Electronic Control Unit) 18, which outputs an opening command to an electronically controllable throttle (not shown) by following an engine output request value from a hybrid ECU (Electronic Control Unit) (controlling means) 19 so as to control the number of revolutions of the engine 11.

The inverter 16 is connected to the hybrid ECU 19 in such a manner that; the inverter 16 and the hybrid ECU 19 can communicate with each other. The hybrid ECU 19 calculates a required engine output (i.e., engine output request value), an electric motor torque (i.e., electric motor torque request value), and a generator torque (i.e., generator torque request value) based on an acceleration opening and a shift position (which is calculated from a shift position signal input from a shift position sensor, not shown). The calculated engine output request value is transmitted to the engine ECU 18 so that the driving force of the engine 11 can be controlled. The hybrid ECU 19 controls the motor 12 and the generator 15 by means of the inverter 16 based on the calculated electric motor torque request value and the generator torque request value. In addition, the battery 17 is connected to the hybrid ECU 19 for the purposes of monitoring a charged condition, a charged current, and the like, of the battery 17. Further, an acceleration opening sensor (not shown) assembled onto an acceleration pedal (not shown) is connected to the hybrid ECU 19 for detecting an acceleration opening so that the hybrid ECU 19 inputs an acceleration opening signal from the acceleration opening sensor.

The hybrid vehicle includes a hydraulic brake apparatus B for directly applying a hydraulic braking force to each of the wheels FL, FR, RL and RR to thereby brake the vehicle. As shown in FIG. 2, according to the hydraulic brake apparatus B, a basic hydraulic pressure is generated at the master cylinder 23 in response to the brake operation state acquired by the depression of the brake pedal 21. The generated basic hydraulic pressure is directly applied to wheel cylinders WC1, WC2, WC3, and WC4 of the wheels FL, FR, RL and RR, respectively, connected to the master cylinder 23 by means of fluid passages Lf and Lr at which hydraulic pressure control valves 31 and 41 are disposed, respectively, thereby causing a basic hydraulic braking force corresponding to the basic hydraulic pressure to be generated at each of the wheels FL, FR, RL, and RR. At the same time, the hydraulic brake apparatus B applies a controlled hydraulic pressure obtained independently from the basic hydraulic pressure, which is generated in response to the brake operation state, by a driving of pumps 37 and 47, and a control of the hydraulic pressure control valves 31 and 41 to the wheel cylinders WC1, WC2, WC3, and WC4 of the respective wheels FL, FR, RL, and RR. The hydraulic brake apparatus B is able to bring a controlled hydraulic braking force to be generated at each of the wheels FL, FR, RL, and RR.

The hydraulic brake apparatus B includes a vacuum booster 22, the master cylinder 23, a reservoir tank 24, and a brake actuator (controlled hydraulic braking force generating apparatus) 25. The vacuum booster 22 is a booster device for assisting and boosting (i.e., enhancing) the brake operation force generated upon depression of the brake pedal 21 by the driver by applying a manifold air pressure from the engine 11 to a diaphragm incorporated in the vacuum booster 22. The master cylinder 23 generates and supplies to the wheel cylinders WC1 to WC4 a brake fluid (or oil) with the basic hydraulic pressure achieved in response to the brake operation (i.e., operating state of the brake pedal 21) that is enhanced by the vacuum booster 22. The reservoir tank 24 stores the brake fluid and replenishes the master cylinder 23 with the brake fluid. The brake actuator 25 is provided between the master cylinder 23 and the wheel cylinders WC1 to WC4 for generating the controlled hydraulic pressure. The brake pedal 21, the vacuum booster 22, the master cylinder 23, and the reservoir tank 24 constitute a basic hydraulic braking force generating apparatus.

In the hydraulic brake apparatus B, front and rear brake systems are employed. That is, first and second hydraulic chambers 23d and 23f of the master cylinder 23 are connected to the fluid passages Lr and Lf, respectively, as shown in FIG. 2. The fluid passage Lr brings the first hydraulic chamber 23d to communicate with the wheel cylinders WC3 and WC4 of the rear-left and rear-right wheels RL and RR, respectively, while the fluid passage Lf brings the second hydraulic chamber 23f to communicate with the wheel cylinders WC1 and WC2 of the front-left and front-right wheels FL and FR, respectively.

When each of the wheel cylinders WC1, WC2, WC3, and WC4 receives the hydraulic pressure (i.e., the basic hydraulic pressure and the controlled hydraulic pressure) from the master cylinder 23 through the fluid passages Lf and Lr, the wheel cylinders WC1, WC2, WC3, and WC4 cause brake means BK1, BK2, BK3, and BK4, which are provided at the wheel cylinders WC1, WC2, WC3, and WC4, respectively, to operate so that the hydraulic braking force (i.e., the basic hydraulic braking force and the controlled hydraulic braking force) is applied to each of the wheels FL, FR, RL, and RR. Each of the brake means BK1, BK2, BK3, and BK4 is constituted by a disc brake, a drum brake, and the like in which a friction member such as a brake pad and a brake shoe restricts a rotation of a disc rotor, a brake drum, and the like integrally provided at each wheel.

The brake actuator 25 will be explained in detail with reference to FIG. 2. The brake actuator 25 of a known type includes the hydraulic pressure control valves 31 and 41, ABS (antilock brake system) control valves such as pressure-intensifying control valves 32, 33, 42, and 43, and pressure-reducing control valves 35, 36, 45, and 46, pressure control reservoirs 34 and 44, the pumps 37 and 47, and an electric motor M all packaged in a single case.

A front brake system of the brake actuator 25 will be explained below. The hydraulic pressure control valve 31 constituted by a differential pressure control valve is provided at the fluid passage Lf. The hydraulic pressure control valve 31 switches between a communication established state and a differential pressure state by a brake ECU (Electronic Control Unit) (controlling means) 60. When the hydraulic pressure control valve 31, which is normally in the communication established state, is brought to the differential pressure state, the fluid passage Lf2 connected to the wheel cylinders WC1 and WC2 can be retained at a higher pressure by a predetermined pressure (i.e., differential pressure) than the fluid passage Lf1 connected to the master cylinder 23. The predetermined deferential pressure is adjusted by the brake ECU 60 in response to a control current.

The fluid passage Lf2 is split into two portions, one of which is provided with the pressure-intensifying control valve 32 for controlling an increase of a brake hydraulic pressure applied to the wheel cylinder WC1 in an increased pressure mode of the ABS control while the other one of which is provided with the pressure-intensifying control valve 33 for controlling an increase of the brake hydraulic pressure applied to the wheel cylinder WC2 in the increased pressure mode of the ABS control. The pressure-intensifying control valves 32 and 33 are each constituted by a two-position valve that can be controlled between a communication established state (i.e., open state) and a communication interrupted state (i.e., closed state) by the brake ECU 60. When the pressure-intensifying control valves 32 and 33 are controlled to be in the open state, the basic hydraulic pressure obtained by the master cylinder 23 and/or the controlled hydraulic pressure obtained by the driving of the pump 37 (i.e., the suction or pressurization of the pump 37) and the control of the hydraulic pressure control valve 31 can be applied to each of the wheel cylinders WC1 and WC2. In addition, the pressure-intensifying control valves 32 and 33 can perform the ABS control together with the pressure-reducing control valves 35 and 36, and the pump 37.

In the case of a normal brake state in which the ABS control is not performed, the pressure-intensifying control valves 32 and 33 are controlled to be in the normally open state. Further, safety valves 32a and 33a are provided in parallel with each other at the pressure-intensifying control valves 32 and 33, respectively, and by means of which, at the time of the ABS control, the brake fluid is returned from the wheel cylinders WC1 and WC2 to the reservoir tank 24 upon release of the brake pedal 21.

The fluid passage Lf2 arranged between the pressure-intensifying control valves 32 and 33, and the wheel cylinders WC1 and WC2 communicates with a reservoir bore 34a of the pressure control reservoir 34 via a fluid passage Lf3. The pressure-reducing control valves 35 and 36 are provided at the fluid passage Lf3 and are controlled between the communication established state (i.e., open state) and the communication interrupted state (i.e., closed state) by the brake ECU 60. The pressure-reducing control valves 35 and 36 are controlled to be in the normally closed state at the time of the normal brake state (i.e., the ABS control is not performed). The pressure-reducing control valves 35 and 36 are appropriately opened to thereby send the brake fluid to the pressure control reservoir 34 through the fluid passage Lf3. Accordingly, the brake hydraulic pressure at the wheel cylinders WC1 and WC2 can be controlled so as to prevent the wheels from tending to lock.

Further, the pump 37 and a safety valve 37a are provided at a fluid passage Lf4 that connects the fluid passage Lf2 arranged between the hydraulic pressure control valve 31, and the pressure-intensifying control valves 32 and 33 to the reservoir bore 34a of the pressure control reservoir 34. In addition, a fluid passage Lf5 is provided so as to connect a reservoir bore 34b of the pressure control reservoir 34 to the master cylinder 23 via the fluid passage Lf1. The pump 37 is driven by the motor M in response to a command from the brake ECU 60. In a reduced pressure mode of the ABS control, the pump 37 suctions the brake fluid in the wheel cylinders WC1 and WC2, or the brake fluid stored in the pressure control reservoir 34 and then returns the brake fluid to the master cylinder 23 via the hydraulic pressure control valve 31 in the open state. Further, in the case of achieving the controlled hydraulic pressure for stably controlling an operation of a vehicle such as in an ESC (Electronic Stability Control), a traction control, and a brake assist control, the pump 37 suctions the brake fluid in the master cylinder 23 via the fluid passages Lf1 and Lf5, and the pressure control reservoir 34 and then discharges the brake fluid via the fluid passages Lf4 and Lf2, and the pressure-intensifying control valves 32 and 33 in the open state to each of the wheel cylinders WC1 and WC2 so that the differential pressure can be generated at the hydraulic pressure control valve 31 that has switched to the differential pressure state. In order to absorb pulsation of the brake fluid discharged from the pump 37, a dumper 38 is provided at the upstream side of the pump 37 in the fluid passage Lf4.

The pressure sensor P is provided at the fluid passage Lf1 for the purposes of detecting the master cylinder pressure that corresponds to the brake hydraulic pressure in the master cylinder 23. A detection signal of the pressure sensor P is transmitted to the brake ECU 60. The pressure sensor P may be provided at the fluid passage Lr1, alternatively. The master cylinder pressure is regarded as the brake operation state.

A pedal stroke of the brake pedal 21 is also considered as the brake operation state. The pedal stroke is detected by the pedal stroke sensor 21a provided at the brake pedal 21. A detection signal of the pedal stroke sensor 21a is transmitted to the brake ECU 60. In FIGS. 1 and 2, both the pressure sensor P and the pedal stroke sensor 21a are illustrated. However, according to the present embodiment, the pressure sensor P only is mounted in the braking apparatus for a vehicle 1. As an example of the other embodiment, the pedal stroke sensor 21a may be provided instead of the pressure sensor P.

A rear brake system of the brake actuator 25 has a similar structure to that of the front brake system. That is, the fluid passage Lr constituting the rear brake system includes fluid passages Lr1, Lr2, Lr3, Lr4, and Lr5 as in the same way as the fluid passage Lf in the front brake system. A hydraulic pressure control valve 41 corresponding to the hydraulic pressure control valve 31 and a pressure control reservoir 44 corresponding to the pressure control reservoir 34 are provided at the fluid passage Lr. Then, reservoir bores 44a and 44b corresponding to the reservoir bores 34a and 34b are provided at the pressure control reservoir 44. Pressure-intensifying control valves 42 and 43 corresponding to the pressure-intensifying control valves 32 and 33 in the front-wheel line are provided at the fluid passages Lr2 split into two portions that communicate with the wheel cylinders WC3 and WC4, respectively. In addition, pressure-reducing control valves 45 and 46 corresponding to the pressure-reducing control valves 35 and 36 in the front-wheel line are provided at the fluid passage Lr3. Further, the pump 47, a safety valve 47a, and a dumper 48 corresponding to the pump 37, the safety valve 37a, and the dumper 38 in the front-wheel line are provided at the fluid passage Lr4. Furthermore, safety valves 42a and 43a corresponding to the safety valves 32a and 33a in the front-wheel line are arranged in parallel with each other at the pressure-intensifying control valves 42 and 43, respectively.

Accordingly, the controlled hydraulic braking force can be generated at each of the wheels FL, FR, RL, and RR by applying to the wheel cylinders WC1, WC2, WC3, and WC4 of the respective wheels FL, FR, RL, and RR the controlled hydraulic pressure, which is obtained through the driving of the pumps 37 and 47, and the control of the hydraulic pressure control valves 31 and 41.

As illustrated in FIG. 1, the braking apparatus for a vehicle 1 includes wheel speed sensors Sfl, Sfr, Srl, and Srr. The wheel speed sensors Sfl, Sfr, Srl, and Srr provided in the vicinity of the wheels FL, FR, RL, and RR, respectively, output to the brake ECU 60 a pulse signal with a frequency in response to a rotation of each of the wheels FL, FR, RL, and RR.

The braking apparatus for a vehicle 1 includes the brake ECU 60 connected to the wheel speed sensors Sfl, Sfr, Srl, and Srr, the pressure sensor P, the control valves 31, 32, 33, 35, 36, 41, 42, 43, 45, and 46, and the motor M. The brake ECU 60 performs a state switch control or a current supply control on each of the control valves 31, 32, 33, 35, 36, 41, 42, 43, 45, and 46 of the hydraulic brake apparatus B based on a detected signal from each of the aforementioned sensors so as to control the controlled hydraulic pressure applied to the wheel cylinders WC1 to WC4, i.e., the controlled hydraulic braking force applied to each of the wheels FL, FR, RL, and RR.

Further, the brake ECU 60 is connected to the hybrid ECU 19 so as to communicate with each other. The brake ECU 60 performs the cooperative control between the regenerative brake conducted by the motor 12 and the hydraulic brake so that a total braking force of the vehicle can be equal to that of a vehicle in which only the hydraulic brake is used. Precisely, in response to a braking request of the driver, i.e., the brake operation state, the brake ECU 60 outputs to the hybrid ECU 19 a regenerative request value, which the regenerative brake apparatus should follow, as a target value for the regenerative brake apparatus, i.e., a target regenerative braking force. The hybrid ECU 19 calculates, on the basis of the input regenerative request value (i.e., target regenerative braking force), the actual regenerative value that is actually applied as the regenerative brake by considering a vehicle speed, a battery charged state, and the like. Then, the hybrid ECU 19 controls the motor 12 via the inverter 16 so that the motor 12 can generate the regenerative braking force corresponding to the calculated actual regenerative value and also outputs the calculated regenerative execution value to the brake ECU 60.

The brake ECU 60 performs a braking force replacement control (braking force replacement controlling means) during the braking during which at least the regenerative braking force is applied. According to the braking force replacement control, the regenerative braking force is gradually replaced with the controlled hydraulic braking force while ensuring the total braking force required for the wheels FL, FR, RL, and RR. Specifically, the regenerative braking force decreases at a gradient within a predetermined range and at the same time the controlled hydraulic braking force increases in response to the decrease of the regenerative braking force.

Figure 3:
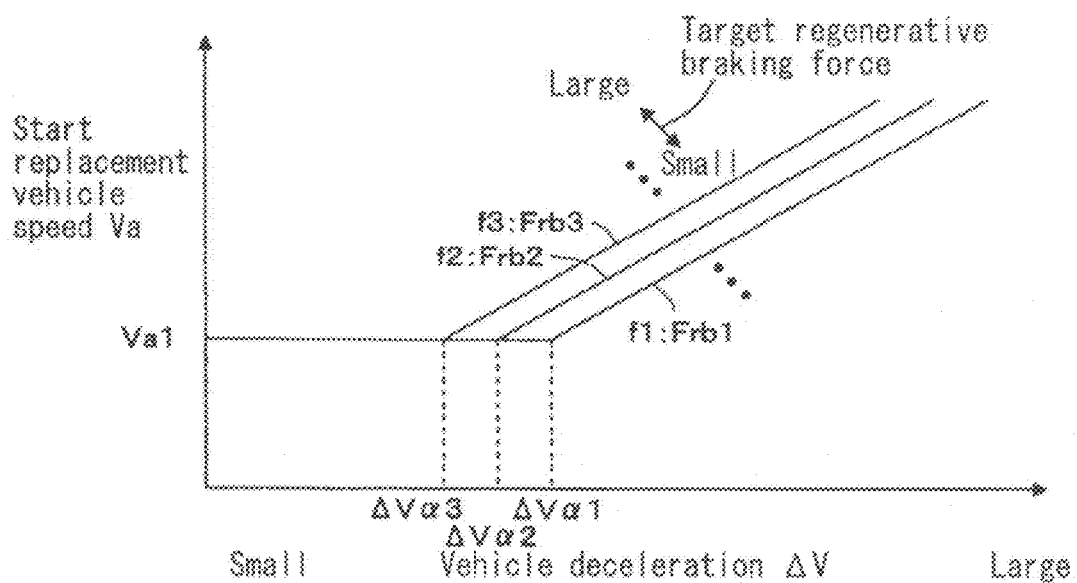
FIG. 3 is a correlation diagram between a start replacement vehicle speed and a vehicle deceleration for each target regenerative braking force according to a first embodiment.
Figure 4:
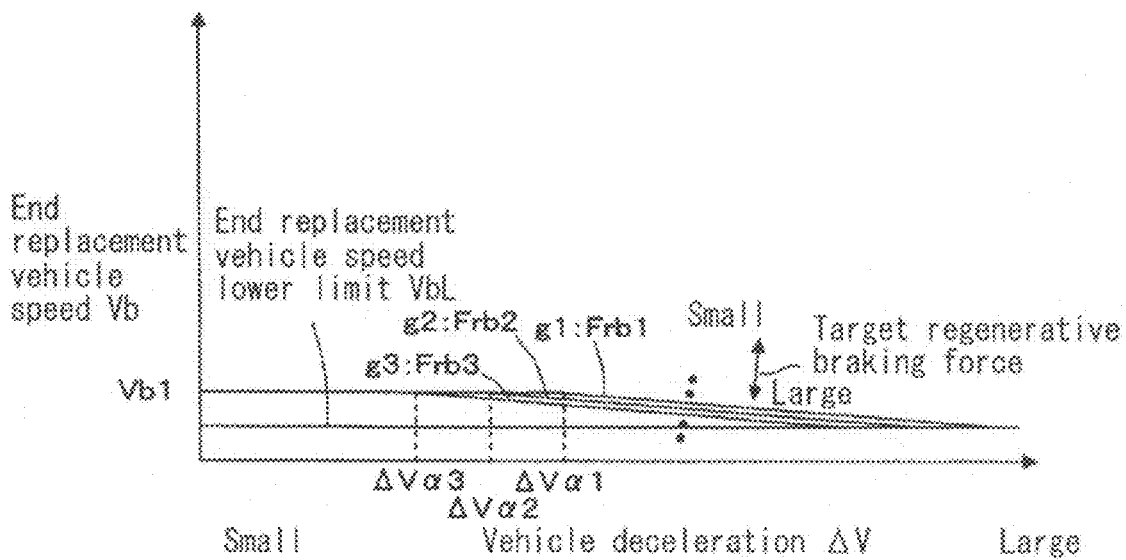
FIG. 4 is a correlation diagram between an end replacement vehicle speed and the vehicle deceleration for each target regenerative braking force according to the first embodiment.

The brake ECU 60 further includes a storage unit 61 (storage means) for storing a first map or arithmetic expression as illustrated in FIG. 3, and a second map or arithmetic expression illustrated in FIG. 4. The first map or arithmetic expression indicates a correlation between a start replacement vehicle speed Va and a deceleration $\Delta V$ for each target regenerative braking force. The start replacement vehicle speed Va is a vehicle speed at which a decrease of the regenerative braking force, i.e., the braking force replacement control, is started. The second map or arithmetic expression indicates a correlation between an end replacement vehicle speed Vb and the deceleration $\Delta V$ for each target regenerative braking force. The end replacement vehicle speed Vb is a vehicle speed at which a decrease of the regenerative braking force, i.e., the braking force replacement control, is finished. The end replacement vehicle speed Vb is specified smaller than the start replacement vehicle speed Va.

In the first map, when a target regenerative braking force Frb* is defined to be Frb1, Frb2, Frb3, and the like, the correlation between the start replacement vehicle speed Va and the deceleration $\Delta V$ is defined to be f1, f2, f3, and the like. Frb1, Frb2, Frb3, and the like are set to have a predetermined interval therebetween.

Figure 10:
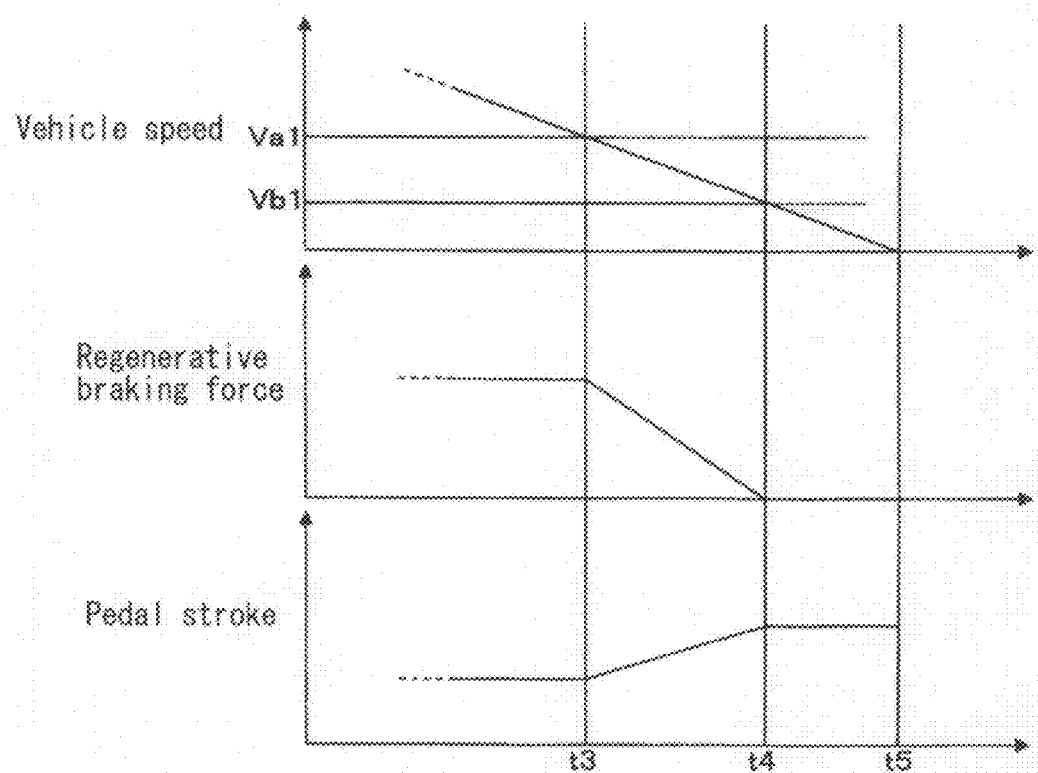
FIG. 10 is a time chart illustrating the braking force replacement control that does not provide an uncomfortable pedal feeling upon braking force replacement control according to the first embodiment.

As illustrated in FIG. 10, the brake pedal 21 is further depressed or lowered without further action by the driver, upon application of the controlled hydraulic pressure by the operation of the pumps 37 and 47 during the braking force replacement control (i.e., replacement of the regenerative braking force with the controlled hydraulic braking force) (i.e., during a period between t3 and t4 in FIG. 10). At this time, the pedal stroke is made larger than that obtained until t3. That is, the brake pedal 21 is further depressed or lowered upon starting of the braking force replacement control without further action by the driver. In the cases where a depressing speed of the brake pedal 21, i.e., Vbp, is larger than a predetermined speed Vbp*, the driver has an uncomfortable feeling that the brake pedal is suddenly depressed or lowered, and, on the other hand, the driver does not feel such discomfort when the depressing speed Vbp is less than the predetermined speed Vbp*.

The depressing speed of the brake pedal Vbp and a decreasing speed of the regenerative braking force (i.e., decreasing gradient) are correlated with each other. When the depressing speed Vbp is larger than the predetermined speed Vbp*, i.e., the decreasing gradient of the regenerative braking force ΔFrb is larger than a predetermined gradient ΔFrb* corresponding to the predetermined speed Vbp*, the driver has the uncomfortable feeing that the brake pedal is suddenly depressed or lowered. When the depressing speed Vbp is smaller than the predetermined speed Vbp*, i.e., the decreasing gradient of the regenerative braking force ΔFrb is smaller than the predetermined gradient ΔFrb*, the driver does not have the uncomfortable feeling. That is, the predetermined speed Vbp*, i.e., the predetermined gradient ΔFrb*, is a threshold for determining whether or not the driver feels uncomfortable. In this case, the predetermined gradient ΔFrb* may have a predetermined range. The predetermined range should be specified so as to correspond to the depressing speed of the brake pedal 21 at which the driver does not feel uncomfortable.

Figure 11:
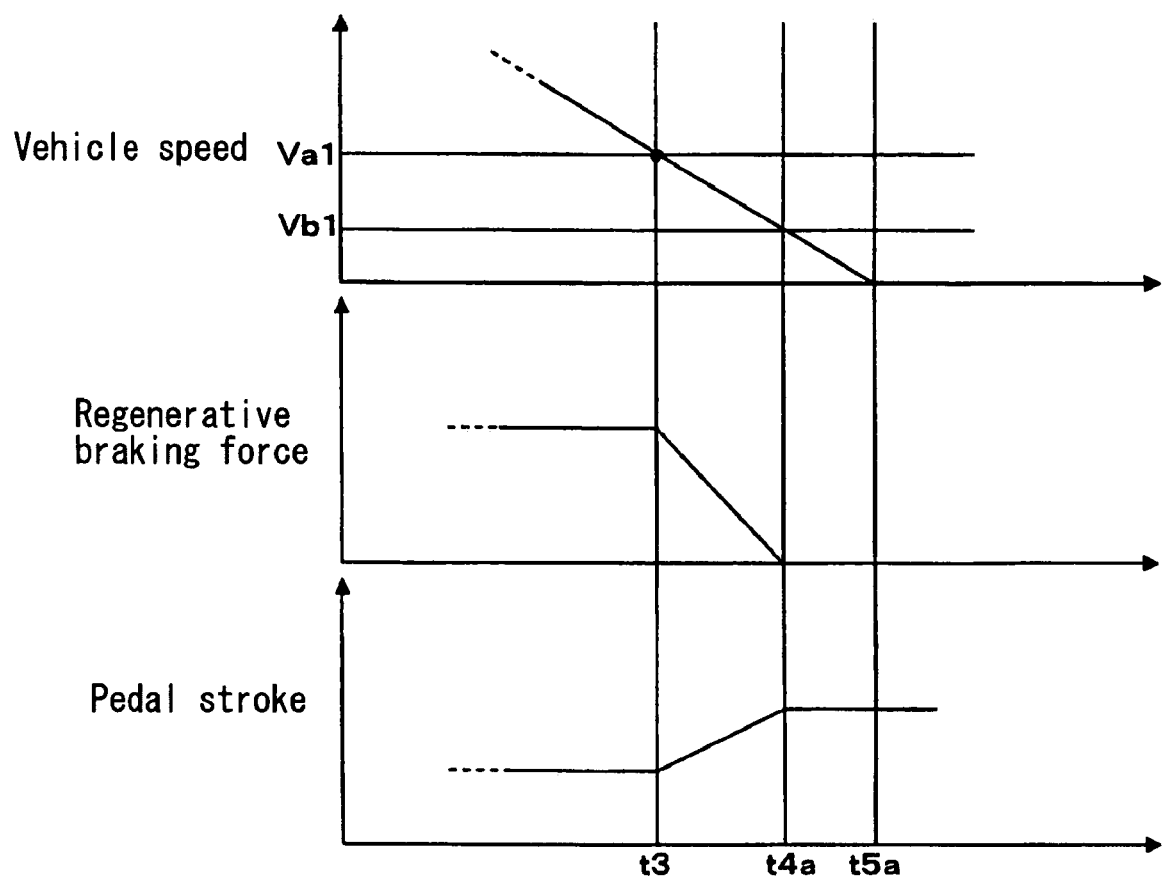
FIG. 11 is a time chart illustrating the braking force replacement control that provides the uncomfortable pedal feeling according to a conventional apparatus.

In the cases where the deceleration ΔV is large as illustrated in FIG. 11 as compared to the case illustrated in FIG. 10 in which the deceleration ΔV is small and thus the driver does not feel uncomfortable, even if the braking force replacement control is started at the same time t3 with the same regenerative braking force, a time period for the vehicle speed to reach an end replacement vehicle speed Vb1 (i.e., t4a) is short because of the large deceleration ΔV. The gradient of the regenerative braking force ΔFrb is larger than the predetermined gradient ΔFrb*, and thus, even though a total amount of the pedal stroke is same, the depressing speed of the brake pedal Vbp is made larger than the predetermined speed Vbp*.

In order to decrease the gradient of the regenerative braking force ΔFrb to or below the predetermined gradient ΔFrb* so that the depressing speed of the brake pedal Vbp is decreased to or below the predetermined speed Vbp* in the cases where the acceleration of the vehicle speed is large as illustrated in FIG. 11, the start replacement vehicle speed Va may be changed from Va1 to Va2 that is larger than Va1 on the assumption that the regenerative braking force at the replacement control start is fixed (same as that illustrated in FIG. 10) and the end replacement vehicle speed Vb is fixed to be Vb1. The start replacement vehicle speed Va2 is specified in such a way that by means of which the decreasing gradient of the regenerative braking force ΔFrb is made equal to the predetermined gradient ΔFrb*, i.e., the depressing speed of the brake pedal Vbp is made equal to the predetermined speed Vbp*. In addition, the greater the deceleration ΔV is, the greater the start replacement vehicle speed Va is.

Meanwhile, in the cases where the deceleration ΔV is small and thus the driver does not feel uncomfortable, even if the braking force replacement control is started at the same time t3 with the same regenerative braking force, a time period for the vehicle speed to reach the end replacement vehicle speed Vb1 is long, i.e., the vehicle speed reaches the end replacement vehicle speed Vb1 after a point of t4 illustrated in FIG. 10, because of the small deceleration ΔV. That is, the gradient of the regenerative braking force ΔFrb is smaller than the predetermined gradient ΔFrb* and thus the depressing speed of the brake pedal Vbp is smaller than the predetermined speed Vbp*, which prevents the driver from feeling uncomfortable. Accordingly, when the deceleration ΔV is smaller than a predetermined value ΔVα, it is not required to change the start replacement vehicle speed Va. The predetermined value ΔVα is a threshold value for determining whether or not the gradient of the regenerative braking force ΔFrb is larger than the predetermined gradient ΔFrb*, i.e., whether or not the depressing speed of the brake pedal Vbp is larger than the predetermined speed Vbp*, so as to decide necessity of changing the start replacement vehicle speed Va.

As described above, when the deceleration ΔV is smaller than the predetermined value ΔVα, it is not required to change the start replacement vehicle speed Va. In addition, when the deceleration ΔV is larger than the predetermined value ΔVα, the start replacement vehicle Va should be specified larger in response to the increase of the deceleration ΔV. Accordingly, in the correlation between the start replacement vehicle speed Va and the deceleration ΔV, i.e., f1, f2, f3, and the like in the first map illustrated in FIG. 3, the start replacement vehicle speed Va is specified to be constant when each deceleration ΔV is smaller than each of the predetermined values ΔVα1, ΔVα2, ΔVα3, and the like, while on the other hand, the start replacement vehicle speed Va is specified larger in response to the increase of the deceleration ΔV when each deceleration ΔV is greater than each of the predetermined values ΔVα1, ΔVα2, ΔVα3, and the like.

The aforementioned correlation between the start replacement vehicle speed Va and the deceleration ΔV, i.e., f1, f2, f3, and the like, is positioned from top to bottom in order of magnitude of the regenerative braking force. This is because, in order to change the magnitude of the regenerative braking force at the replacement control start under the same deceleration speed ΔV so as to bring the gradient of the regenerative braking force ΔFrb to be equal to the predetermined gradient ΔFrb*, it is required to specify the start replacement vehicle speed Va to be greater in response to the magnitude of the regenerative braking force at the replacement control start.

Next, in the second map illustrated in FIG. 4, when the target regenerative braking force Frb* is defined to be Frb1, Frb2, Frb3, and the like, the correlation between the end replacement vehicle speed Vb and the deceleration ΔV is defined to be g1, g2, g3, and the like. Frb1, Frb2, Frb3, and the like are set to have a predetermined interval therebetween.

In the cases where the deceleration ΔV is large as illustrated in FIG. 11 as compared to the case illustrated in FIG. 10 in which the deceleration ΔV is small and thus the driver does not feel uncomfortable, in order to decrease the gradient of the regenerative braking force ΔFrb to or below the predetermined gradient ΔFrb* so that the depressing speed of the brake pedal Vbp is decreased to or below the predetermined speed Vbp* when the regenerative braking force at the replacement control start is fixed (same as that illustrated in FIG. 10) and the start replacement vehicle speed Va is fixed to be Va1, the end replacement vehicle speed Vb may be changed from Vb1 to Vb2 that is smaller than Vb1. The end replacement vehicle speed Vb2 is specified so that the decreasing gradient of the regenerative braking force ΔFrb is made equal to the predetermined gradient ΔFrb*, i.e., the depressing speed of the brake pedal Vbp is made equal to the predetermined speed Vbp*. In addition, the greater the deceleration ΔV is, the smaller the end replacement vehicle speed Vb is. Meanwhile, in the cases where the deceleration ΔV is small and thus the driver does not feel uncomfortable, the deceleration ΔV is smaller than the predetermined value ΔVα and thus it is not required to change the end replacement vehicle speed Vb.

As described above, when the deceleration ΔV is smaller than the predetermined value ΔVα, it is not required to change the end replacement vehicle speed Vb. In addition, when the deceleration ΔV is larger than the predetermined value ΔVα, the end replacement vehicle speed Vb should be specified smaller in response to the increase of the deceleration ΔV. Accordingly, in the correlation between the end replacement vehicle speed Vb and the deceleration ΔV, i.e., g1, g2, g3, and the like in the second map illustrated in FIG. 4, the end replacement vehicle speed Vb is specified to be constant when each deceleration ΔV is smaller than each of the predetermined values ΔVα1, ΔVα2, ΔVα3, and the like, while on the other hand, the end replacement vehicle speed Vb is specified smaller in response to the increase of the deceleration ΔV when each deceleration ΔV is greater than each of the predetermined values ΔVα1, ΔVα2, ΔVα3, and the like.

The aforementioned correlation between the end replacement vehicle speed Vb and the deceleration ΔV, i.e., g1, g2, g3, and the like, is positioned from bottom to top in order of magnitude of the regenerative braking force. This is because, in order to change the magnitude of the regenerative braking force at the replacement control start under the same deceleration speed ΔV so as to bring the gradient of the regenerative braking force ΔFrb to be equal to the predetermined gradient ΔFrb*, it is required to specify the end replacement vehicle speed Vb to be smaller (i.e., replacement end regenerative braking force to be smaller) in response to the magnitude of the regenerative braking force at the replacement control start.

The end replacement vehicle speed Vb is restricted by an end replacement vehicle speed lower limit VbL so that the end replacement vehicle speed Vb is prevented from falling below the end replacement vehicle speed lower limit VbL. Thus, the erroneous operation in a low vehicle speed range can be securely prevented.

Figure 5:
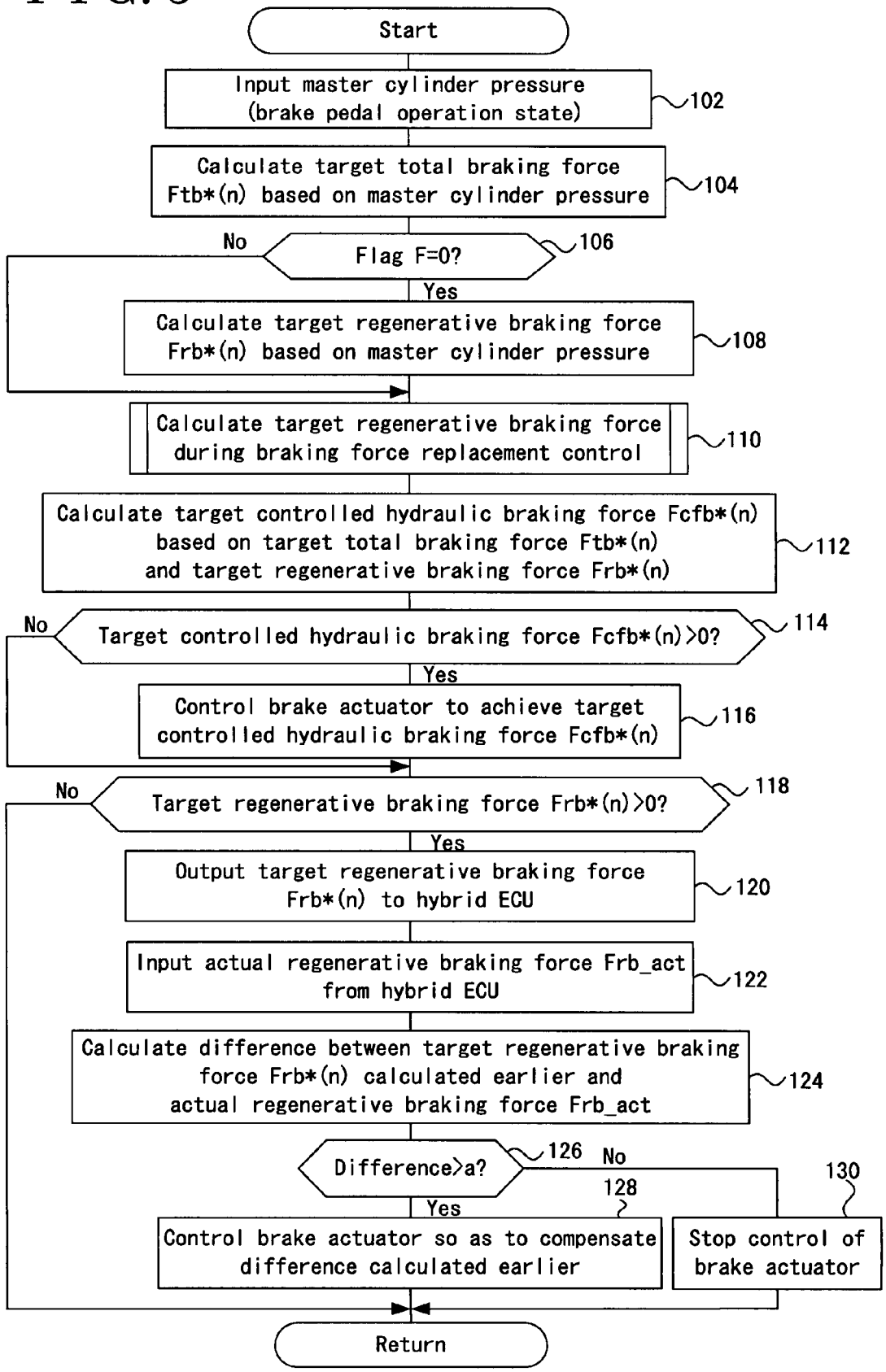
FIG. 5 is a flowchart of a control program performed by a brake ECU according to the first embodiment.
Figure 6:
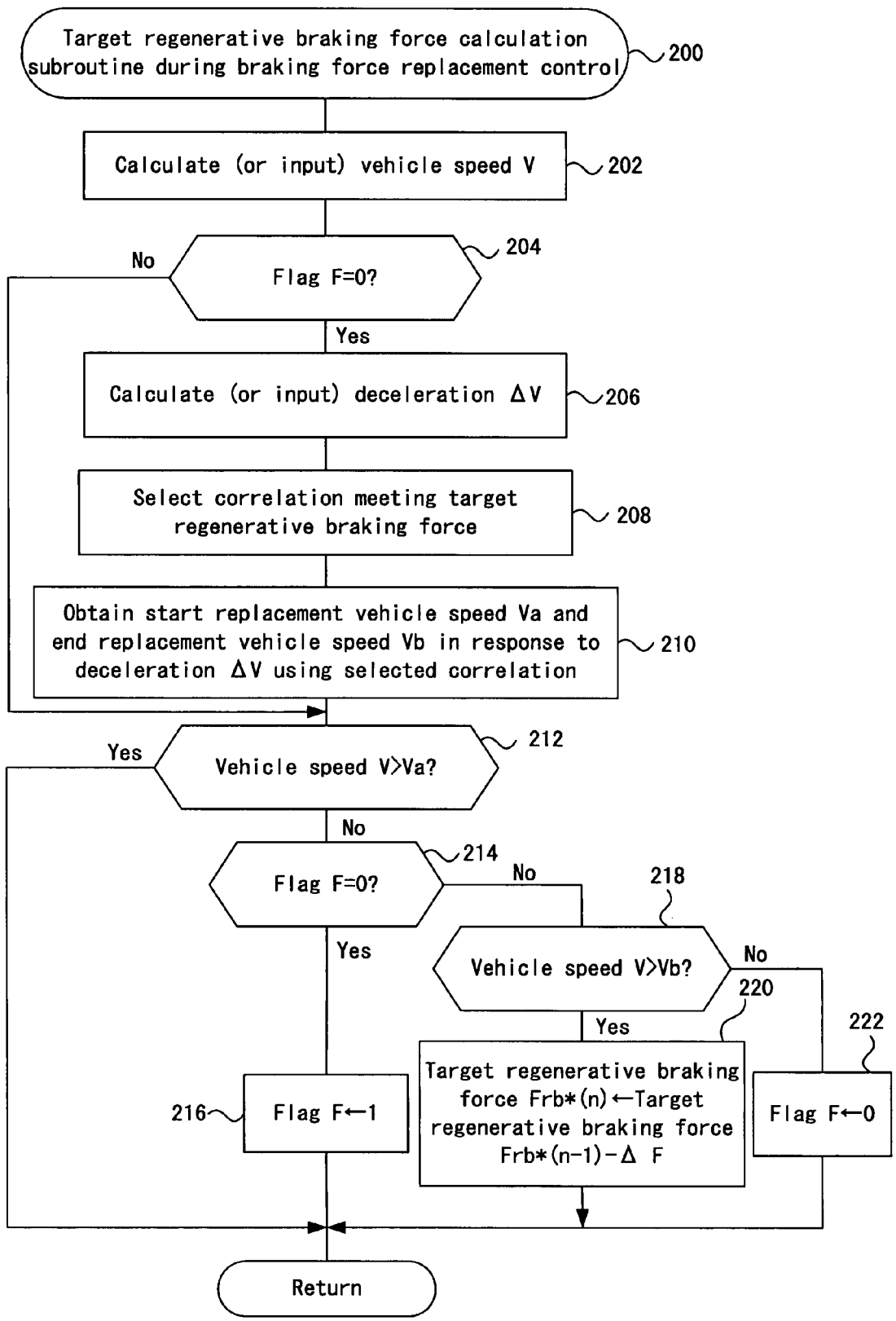
FIG. 6 is another flowchart of the control program performed by the brake ECU according to the first embodiment.

The storage unit 61 in the brake ECU 60 stores beforehand a map, table or arithmetic expression indicating a correlation between the brake operation state that is equal to the master cylinder pressure (or the stroke of the brake pedal 21) and the target total braking force applied to the wheels FL, FR, RL, and RR in response to the brake operation state. In addition, the storage unit 61 stores beforehand a map, table, or arithmetic expression indicating a correlation between the brake operation state equal to the master cylinder pressure and the basic hydraulic braking force applied to the wheels FL, FR, RL, and RR in response to the brake operation state. Further, the storage unit 61 stores beforehand a map, table, or arithmetic expression indicating a correlation between the brake operation state equal to the master cylinder pressure and the target regenerative braking force applied to the wheels FL, FR, RL, and RR in response to the brake operation state. The brake ECU 60 stores a cooperative control program (vehicle brake control program) as illustrated in FIGS. 5 and 6.

An operation of the braking apparatus for a vehicle 1 having the aforementioned structure will be explained with reference to a flowchart illustrated in FIGS. 5 and 6. The brake ECU 60 executes a program corresponding to the flowchart at a predetermined time interval (i.e., calculation period) T when an ignition switch (not shown) of a vehicle is in ON state, for example. The brake ECU 60 inputs a master cylinder pressure representing the brake operation state from the pressure sensor P in step 102 and then calculates a target total braking force Ftb*(n) based on the input master cylinder pressure in step 104. At this time, the brake ECU 60 uses the map, table, or arithmetic expression stored beforehand and indicating the correlation between the master cylinder pressure, i.e., the brake operation state, and the target total braking force applied to the wheels FL, FR, RL, and RR.

When it is determined that a flag F is equal to zero in step 106, which indicates that the braking force replacement control is not being performed, the brake ECU 60 then calculates a target regenerative braking force Frb*(n) based on the input master cylinder pressure in step 108. At this time, the brake ECU 60 uses the map, table, or arithmetic expression stored beforehand and indicating the correlation between the master cylinder pressure, i.e., the brake operation state, and the target regenerative braking force applied to the wheels FL, FR, RL, and RR.

On the other hand, when it is determined that the flag F is equal to one in step 106, which indicates that the braking force replacement control is being performed, the brake ECU 60 calculates, in step 110, the target regenerative braking force Frb*(n) during the braking force replacement control by the other method than the calculation conducted in step 104. Precisely, the brake ECU 60 performs a calculation subroutine of the target regenerative braking force during the braking force replacement control as illustrated in FIG. 6.

Each time the subroutine is executed in step 200, the brake ECU 60 calculates a vehicle speed V based on the wheel speed of each of the wheels FL, FR, RL, and RR input from the wheel speed sensors Sfl, Sfr, Srl, and Srr, respectively, in step 202. At this time, alternatively, a speed sensor for detecting a vehicle speed can be provided separately so that the detected vehicle speed can be input to the brake ECU 60.

When it is determined that the flag F is equal to zero in step 204, the braking force replacement control is not presently performed and thus the brake ECU 60 executes processes from step 206 to step 210 for deciding a start replacement vehicle speed Va and an end replacement vehicle speed Vb for the braking force replacement control. On the other hand, when it is determined that the flag F is equal to one in step 204, the braking force replacement control is presently performed and thus the brake ECU 60 skips processes from step 206 to step 210 and the program proceeds to step 212 since the start replacement vehicle speed Va and the end replacement vehicle speed Vb for the braking force replacement control are not required.

The brake ECU 60 decides the start replacement vehicle speed Va and the end replacement vehicle speed Vb for the braking force replacement control in the processes from step 206 through step 210. In step 206, the brake ECU 60 calculates a deceleration ΔV based on the calculated vehicle speed V (i.e., deceleration detecting means). At this time, the deceleration ΔV is obtained from the vehicle speed V per predetermined time interval that has been calculated and stored in the past, and the vehicle speed V presently calculated. For example, a difference between the presently calculated vehicle speed V and the previously calculated vehicle speed V is divided by the calculation period T. In this case, alternatively, an acceleration sensor for detecting a longitudinal acceleration of a vehicle can be provided separately so that the detected acceleration is input to the brake ECU 60.

In step 208, the brake ECU 60 selects from the first map the correlation meeting the target regenerative braking force Frb*(n) calculated earlier. For example, when the target regenerative braking force Frb*(n) is equal to Frb1, the correlation f1 is selected. In step 210, the brake ECU 60 calculates the start replacement vehicle speed Va in response to the deceleration ΔV calculated beforehand using the selected correlation. In this case, the start replacement vehicle speed Va only is changed and the end replacement vehicle speed Vb is retained at the fixed value Vb1.

From step 208 through step 210, the end replacement vehicle speed Vb can be calculated using the second map so as to change the end replacement vehicle speed Vb only and to retain the start replacement vehicle speed Va at the fixed value Va1. Alternatively, the start replacement vehicle speed Va and the end replacement vehicle speed Vb both can be calculated using the first map and the second map so as to change both the start replacement vehicle speed Va and the end replacement vehicle speed Vb.

The brake ECU 60 compares the vehicle speed V calculated (or input) earlier and the start replacement vehicle speed Va calculated earlier with each other in step 212. When it is determined that the vehicle speed V does not reach the start replacement vehicle speed Va, the present subroutine is terminated. On the other hand, when it is determined that the vehicle speed V reaches the start replacement vehicle speed Va, the braking force replacement control is started and is performed from step 214 through step 222.

That is, since it is determined that the flag F is equal to zero in step 214, the brake ECU 60 sets the flag F to one in step 216 so as to indicate that the braking force replacement control is being performed. Until the vehicle speed V further decreases from the start replacement vehicle speed Va to reach the end replacement vehicle speed Vb (in step 218), the brake ECU 60 sets the target regenerative braking force Frb*(n) to decrease at a predetermined gradient ΔFrb* in step 220. Specifically, the present target regenerative braking force Frb*(n) is obtained by subtracting a predetermined value ΔF corresponding to the predetermined gradient ΔFrb* from the target regenerative braking force Frb*(n−1) obtained in the previous calculation routine. Then, when the vehicle speed V reaches the end replacement vehicle speed Vb, the flag F is set to zero in step 222 and the braking force replacement control is terminated.

When the target regenerative braking force calculation subroutine during the braking force replacement control illustrated in FIG. 6 is terminated, the program proceeds to step 112 in FIG. 5. In step 112, the brake ECU 60 calculates a target controlled hydraulic braking force Fcfb*(n) based on the previously calculated target total braking force Ftb*(n) and the target regenerative braking force Frb*(n) (i.e., Fcfb*(n)=Ftb*(n)−Frb*(n)).

When it is determined that the target controlled hydraulic braking force Fcfb*(n) is greater than zero in Step 114, the brake ECU 60 controls the brake actuator 25 so that the target controlled hydraulic braking force Fcfb*(n) can be achieved in step 116. That is, the brake ECU 60 controls the brake actuator 25 in such a way that the current is applied to the hydraulic pressure control valves 31 and 41 so that the hydraulic pressure of the brake fluid supplied from the pumps 37 and 47 to the wheel cylinders WC1 to WC4 can be equal to the target controlled hydraulic pressure while driving the motor M to drive the pumps 37 and 47. Accordingly, the hydraulic brake apparatus B applies the target controlled hydraulic braking force Fcfb*(n) to the wheels FL, FR, RL, and RR. When the target controlled hydraulic braking force Fcfb*(n) is zero, the brake actuator 25 is not controlled.

When it is determined that the target regenerative braking force Frb*(n) is greater than zero in step 118, the brake ECU 60 outputs the target regenerative braking force Frb*(n) calculated in step 108 or step 110 to the hybrid ECU 19 in step 120. Then, the hybrid ECU 19 inputs the regenerative request value representing the target regenerative braking force Frb*(n) so as to control, on the basis of that input value, the motor 12 via the inverter 16 for the purpose of generating the regenerative braking force by considering the vehicle speed, the battery charged state, and the like and to output the actual regenerative value to the brake ECU 60.

Accordingly, in the cases where the brake pedal 21 is depressed by the driver (i.e., the brake operation is conducted) with the target controlled hydraulic braking force Fcfb*(n) equal to zero and the target regenerative braking force Frb*(n) greater than zero, only the regenerative braking force in addition to the basic hydraulic braking force is applied to the wheels FL, FR, RL, and RR.

On the other hand, in the cases where the brake pedal 21 is depressed by the driver with the target controlled hydraulic braking force Fcfb*(n) greater than zero and the target regenerative braking force Frb*(n) greater than zero, both the regenerative braking force and the controlled hydraulic braking force in addition to the basic hydraulic braking force are applied to the wheels FL, FR, RL, and RR.

Further, in the processes from step 122 to step 128, the brake ECU 60 compensates a difference between the target regenerative braking force Frb*(n) and a regenerative braking force Frb_act(n) actually applied by the regenerative brake apparatus A to either the front wheels FL and FR or the rear wheels RL and RR. Specifically, in step 122, the brake ECU 60 inputs from the hybrid ECU 19 an actual regenerative value representing the regenerative braking force Frb_act(n) actually applied from the regenerative brake apparatus A to either the front wheels FL and FR or the rear wheels RL and RR relative to the target regenerative braking force Frb*(n) calculated in step 108 or step 110. Then, in step 124, the brake ECU 60 calculates a difference between the target regenerative braking force Frb*(n) calculated in step 108 or step 110 and the actual regenerative braking force Frb_act(n) input in step 122. When the difference calculated is greater than a predetermined value a, the brake ECU 60 detects that the regenerative braking force varies in step 126.

When the variation in the regenerative braking force is detected in step 126, the brake ECU 60 controls the brake actuator 25 in such a way that the current is applied to the hydraulic pressure control valves 31 and 41 so that the hydraulic pressure of the brake fluid supplied from the pumps 37 and 47 to the wheel cylinders WC1 to WC4 can be equal to the target controlled hydraulic pressure while driving the motor M to drive the pumps 37 and 47 in step 128. Accordingly, the hydraulic brake apparatus B applies to the wheels FL, FR, RL, and RR the controlled hydraulic braking force, i.e., the difference between the target regenerative braking force Frb*(n) and the actual regenerative braking force Frb_act(n).

Meanwhile, when the variation in the regenerative braking force is not detected, the brake ECU 60 stops the control of the brake actuator 25 in step 130.

Figure 9:
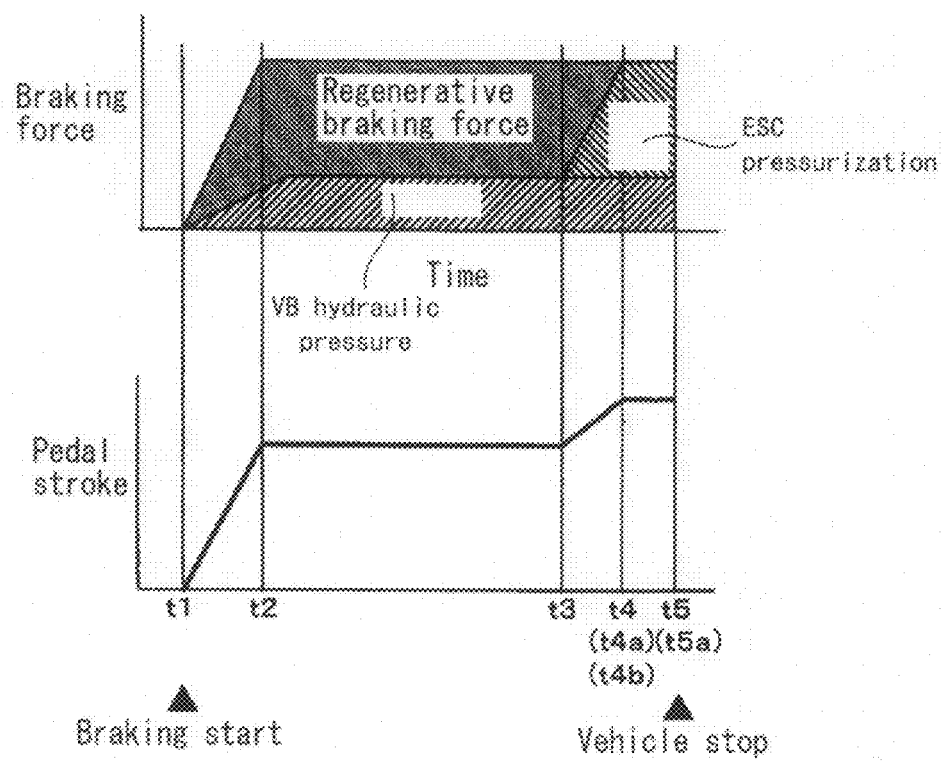
FIG. 9 is a time chart illustrating a correlation between a composition of a braking force and a stroke of a brake pedal according to the first embodiment.

According to the aforementioned braking apparatus for a vehicle 1, as illustrated in FIG. 9, the driver of a vehicle in motion starts depressing the brake pedal 21 at t1. Then, the brake pedal 21 is shifted at a predetermined depressing speed up to t2. The amount of depression of the brake pedal 21 is constant from t2 to t3. Between t1 to t3, the basic hydraulic braking force (portion with rising diagonal stroke from bottom left to top right shown as "VB hydraulic pressure" in FIG. 9) and the regenerative braking force (portion with rising diagonal stroke from bottom right to top left shown as "regenerative braking force" in FIG. 9) are applied to the wheels FL, FR, RL, and RR (i.e., regenerative cooperative braking).

Meanwhile, when the vehicle speed decreases, thereby decreasing the regenerative braking force. Therefore, the regenerative braking force in the total braking force required for the wheels FL, FR, RL, and RR may become insufficient. That insufficient portion is covered or compensated by the controlled hydraulic braking force (portion with rising diagonal stroke from bottom right to top left shown as "ESC pressurization" in FIG. 9). This is the braking force replacement control (i.e., replacement of the regenerative braking force with the controlled hydraulic braking force), which is started at t3 and finished at t4.

A case in which the start replacement vehicle speed Va is changed for performing the braking force replacement control will be explained with reference to FIG. 7. The brake ECU 60 changes the start replacement vehicle speed Va to Va2 by using the first map in step 110 based on the target regenerative braking force Frb*(n) calculated in step 108 and the deceleration ΔV calculated in step 206. When the vehicle speed V reaches Va2 at t3a, the braking force replacement control is started in step 216. The point of t3a is earlier than t3 in FIG. 10 and FIG. 11.

Then, until the vehicle speed V decreases to reach the end replacement vehicle speed Vb (=Vb1) (from t3a to t4a), the target regenerative braking force decreases at the gradient ΔFrb from the target regenerative braking force Frb*(n) obtained at t3a in step 220. Thus, the regenerative braking force with a large gradient shown by a dashed line in FIG. 7 can be changed to that with a small gradient shown by a solid line (i.e., predetermined gradient ΔFrb*) in FIG. 7, thereby preventing the driver from feeling uncomfortable. The rapid depressing speed of the pedal stroke shown by a dotted line in FIG. 7 can be changed to the predetermined speed Vbp* shown by a solid line, thereby preventing the driver from feeling uncomfortable.

When the vehicle speed V reaches the fixed end replacement vehicle speed Vb (=Vb1) (at t4a), the application of the regenerative braking force is stopped. After the point of t4a, the basic hydraulic braking force and the controlled hydraulic braking force are applied to the wheels FL, FR, RL, and RR so that the vehicle is finally stopped at t5a.

A case in which the end replacement vehicle speed Vb is changed for performing the braking force replacement control will be explained with reference to FIG. 8. The brake ECU 60 changes the end replacement vehicle speed Vb to Vb2 by using the second map in step 110 based on the target regenerative braking force Frb*(n) calculated in step 108, and the deceleration ΔV calculated in step 206. When the vehicle speed V reaches the fixed start replacement vehicle speed Va (=Va1) at t3, the braking force replacement control is started in step 216. The point of t3 is equal to that illustrated in FIGS. 10 and 11.

Then, until the vehicle speed V decreases to reach the end replacement vehicle speed Vb2 previously defined (from t3 to t4b), the target regenerative braking force decreases at the gradient ΔFrb from the target regenerative braking force Frb*(n) obtained at t3 in step 220. Thus, the regenerative braking force with a large gradient shown by a dashed line in FIG. 8 can be changed to that with a small gradient shown by a solid line (i.e., predetermined gradient ΔFrb*) in FIG. 8, thereby preventing the driver from feeling uncomfortable. The rapid depressing speed of the pedal stroke shown by a dotted line in FIG. 8 can be changed to the predetermined speed Vbp* shown by a solid line, thereby preventing the driver from feeling uncomfortable.

When the vehicle speed V reaches Vb2 (at t4b), the application of the regenerative braking force is stopped. After the point of t4b, the basic hydraulic braking force and the controlled hydraulic braking force are applied to the wheels FR, FR, RL, and RR so that the vehicle is finally stopped at t5a.

Figure 7:
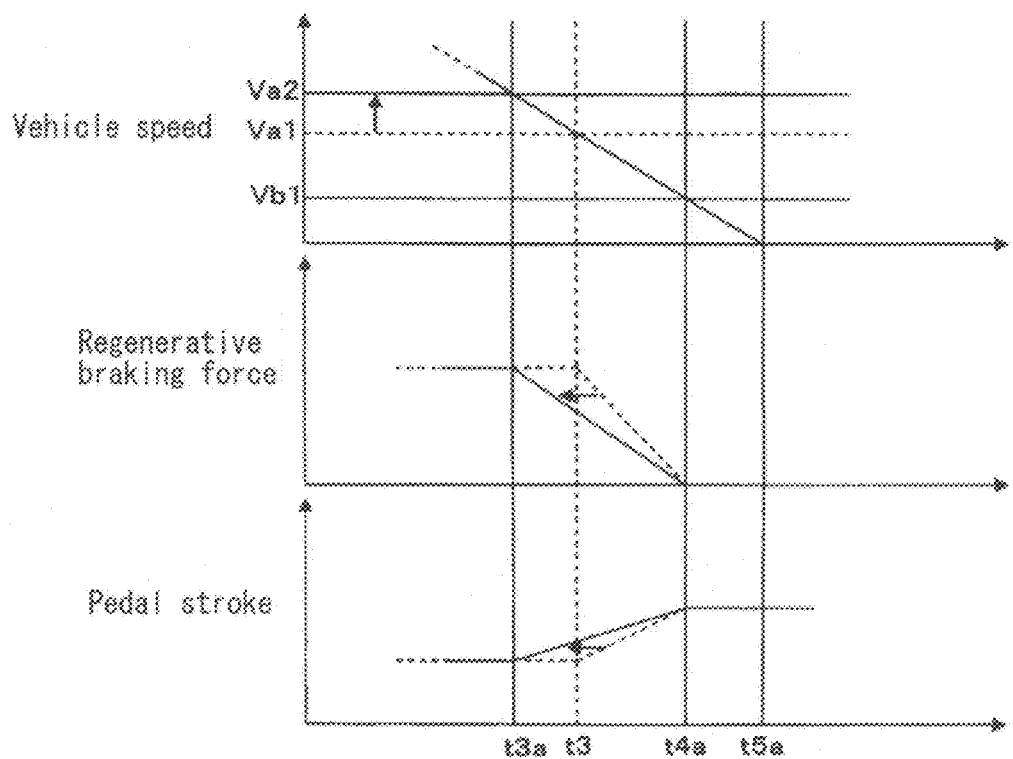
FIG. 7 is a time chart illustrating a braking force replacement control in the cases where the start replacement vehicle speed varies according to the first embodiment.
Figure 8:
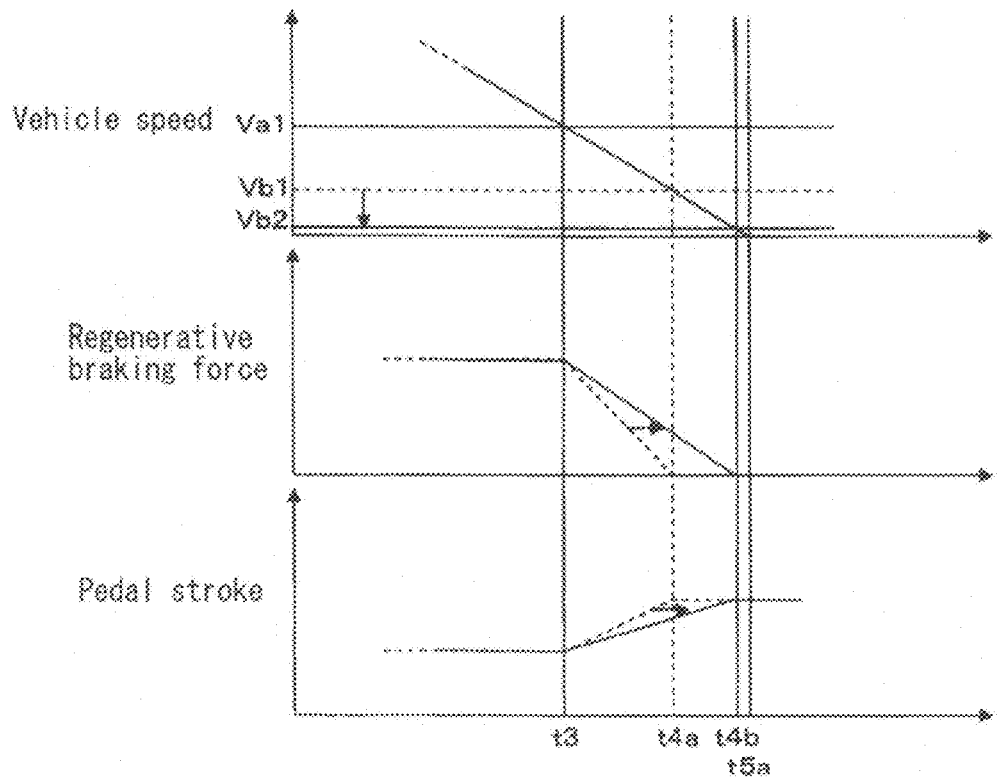
FIG. 8 is a time chart illustrating the braking force replacement control in the cases where the end replacement vehicle speed varies according to the first embodiment.

As described above, according to the present embodiment, the brake ECU 60 serving as the braking force replacement controlling means decreases the regenerative braking force at the predetermined gradient ΔFrb* (or gradient within the predetermined range) as illustrated in FIGS. 7 and 8 during the braking in which at least the regenerative braking force is applied as illustrated in FIG. 9. In addition, the brake ECU 60 increases the controlled hydraulic braking force in response to the decrease of the regenerative braking force so as to gradually replace the regenerative braking force with the controlled hydraulic braking force. As a result, the brake ECU 60 performs the braking force replacement control for ensuring the total braking force required for the wheels FL, FR, RL, and RR. Accordingly, even during the braking with the large acceleration, the regenerative braking force for the braking force replacement control decreases at the predetermined gradient ΔFrb* (or gradient within the predetermined range) and therefore the depressing speed of the brake pedal 21 obtained upon application of the controlled hydraulic pressure by the operation of the pumps 37 and 47 can be defined to the speed Vbp*, thereby preventing the driver from having an uncomfortable feeling such as the sudden depression of the brake pedal.

In addition, when the vehicle speed V reaches the start replacement vehicle speed Va, the brake ECU 60 starts the braking force replacement control, and then finishes it when the vehicle speed V reaches the end replacement vehicle speed Vb smaller than the start replacement vehicle speed Va. Further, the start replacement vehicle speed Va and/or the end replacement vehicle speed Vb are variable so that the regenerative braking force during the braking force replacement control decreases at the predetermined gradient ΔFrb* (or gradient within the predetermined range), thereby easily and surly performing the braking force replacement control.

Since the start replacement vehicle speed Va and the end replacement vehicle speed Vb are defined on the basis of at least one of the deceleration ΔV and the regenerative braking force during the braking, the braking force replacement control can be appropriately performed on the basis of at least one of the deceleration ΔV and the regenerative braking force.

As mentioned above, the storage unit 61 includes the first map representing the correlation between the start replacement vehicle speed Va and the deceleration ΔV and according to which the start replacement vehicle speed Va is made larger in response to the increase of the deceleration ΔV in the cases where the deceleration ΔV is larger than the predetermined value ΔVα. In addition, the deceleration detecting means (step 206) are provided for calculating the deceleration ΔV. The start replacement vehicle speed Va is calculated on the basis of the first map and the deceleration ΔV and thus the start replacement vehicle speed Va can be easily and surly calculated.

Further, the storage unit 61 includes the second map representing the correlation between the end replacement vehicle speed Vb and the deceleration ΔV and according to which the end replacement vehicle speed Vb is made smaller in response to the increase of the deceleration ΔV in the cases where the deceleration ΔV is larger than the predetermined value ΔVα. In addition, the deceleration detecting means (step 206) is provided for calculating the deceleration ΔV. The end replacement vehicle speed Vb is calculated on the basis of the second map and the deceleration ΔV and thus the end replacement vehicle speed Vb can be easily and surly calculated.

Furthermore, the end replacement vehicle speed Vb is restricted by the end replacement vehicle speed lower limit VbL, thereby securely preventing the erroneous operation in the low vehicle speed range.

According to the aforementioned embodiment, instead of the first map illustrated in FIG. 7, a map representing the correlation between the start replacement vehicle speed Va at each deceleration and the target regenerative braking force Frb*(n) can be used. This map can be set in the same way as the first map. Further, instead of the second map illustrated in FIG. 8, a map representing the correlation between the end replacement vehicle speed Vb at each deceleration and the target regenerative braking force Frb*(n) can be used. This map can be set in the same way as the second map.

Furthermore, according to the aforementioned first embodiment, the regenerative braking force decreases at the gradient within the predetermined range while the controlled hydraulic braking force increases in response to the decrease of the regenerative braking force during the braking in which the braking force replacement controlling means applies at least the regenerative braking force to the wheels, thereby gradually replacing the regenerative braking force with the controlled hydraulic braking force for achieving the braking force replacement control in which the total braking force required for the wheels can be ensured. Thus, even during the braking with the large deceleration, the regenerative braking force for the braking force replacement control can decrease at the gradient within the predetermined range, which can bring the depressing speed of the brake pedal obtained upon the application of the controlled hydraulic pressure by the operation of the pumps to be specified to the degree that the driver no longer has a strange feeling about the further depression of the brake pedal.

Furthermore, according to the aforementioned first embodiment, the braking force replacement controlling means starts the braking force replacement control when the vehicle speed reaches the start replacement vehicle speed, and then finishes the braking force replacement control when the vehicle speed reaches the end replacement vehicle speed that is smaller than the start replacement vehicle speed. In addition, the start replacement vehicle speed and/or the end replacement vehicle speed is variable so that the regenerative braking force during the braking force replacement control can decrease at the gradient within the predetermined range, thereby easily and securely performing the braking force replacement control.

Furthermore, according to the aforementioned first embodiment, the start replacement vehicle speed and the end replacement vehicle speed are specified on the basis of at least one of the deceleration and the regenerative braking force during the braking. Thus, the braking force replacement control can be appropriately performed on the basis of at least one of the deceleration and the regenerative braking force during the braking.

Furthermore, according to the aforementioned first embodiment, the storage means includes the first map representing the correlation between the start replacement vehicle speed and the deceleration and according to which the start replacement vehicle speed is made larger in response to the increase of the deceleration in the cases where the deceleration is larger than the predetermined value. In addition, the deceleration detecting means are provided for calculating the deceleration. The start replacement vehicle speed is calculated on the basis of the first map and the deceleration and thus the start replacement vehicle speed can be easily and surly calculated.

Furthermore, according to the aforementioned first embodiment, the storage means includes the second map representing the correlation between the end replacement vehicle speed and the deceleration and according to which the end replacement vehicle speed is made smaller in response to the increase of the deceleration in the cases where the deceleration is larger than the predetermined value. In addition, the deceleration detecting means is provided for calculating the deceleration. The end replacement vehicle speed is calculated on the basis of the second map and the deceleration and thus the end replacement vehicle speed can be easily and surly calculated.

Furthermore, according to the aforementioned first embodiment, the end replacement vehicle speed is restricted by the end replacement vehicle speed lower limit, thereby securely preventing the erroneous operation in the low vehicle speed range.

Next, a braking apparatus for a vehicle 1 according to a second embodiment of the present invention employed in a hybrid vehicle will be explained with reference to FIGS. 12 to 17. The second embodiment has a substantially same structure as that of the first embodiment and thus an explanation for the similar structure will be omitted and only a different portion will be explained below.

Figure 12:
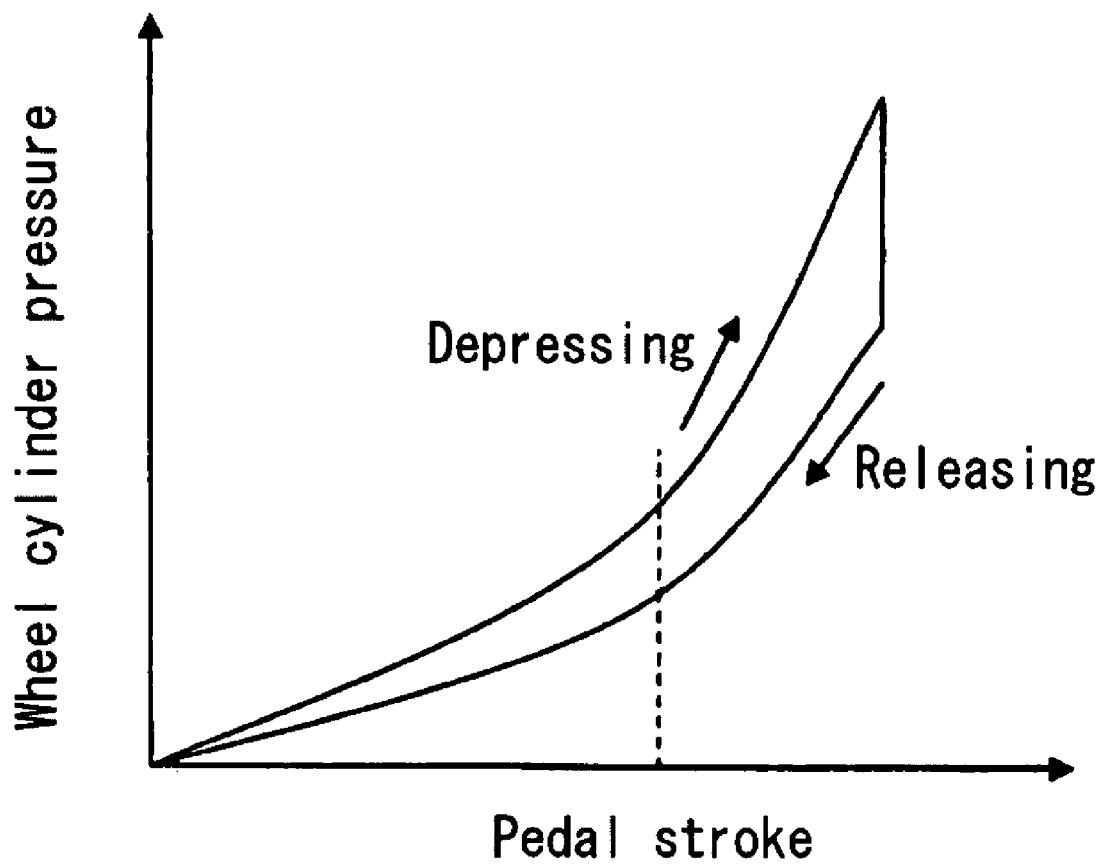
FIG. 12 is a view illustrating a hysteresis in a correlation between a wheel cylinder pressure and the stroke of the brake pedal according to a second embodiment.

As shown in FIG. 12, according to the second embodiment, the hydraulic brake apparatus B has a hysteresis in a correlation between the wheel cylinder pressure and the stroke of the brake pedal 21. That is, on the assumption that the amount of stroke of the brake pedal 21 is same, the wheel cylinder pressure is larger when the brake pedal 21 is depressed as compared to the wheel cylinder pressure generated when the brake pedal 21 is released.

This is because the vacuum booster 22 includes an atmospheric pressure inlet valve that is opened to move a booster output rod of the vacuum booster 22 in a forward direction when the brake pedal 21 is depressed, and a negative pressure inlet valve that is opened to move the booster output rod in a rearward direction when the brake pedal 21 is released. The opening timings between the atmospheric pressure inlet valve and the negative pressure inlet valve are different from each other and this difference achieves the hysteresis of the stroke. In addition, the master cylinder 23 and the wheel cylinders WC1 to WC4 include respective cups for sealing or preventing the hydraulic pressure. Because of the deterioration of each cup, the hysteresis may occur, which leads to no change in the hydraulic pressure even if the stroke varies.

As mentioned above, since the wheel cylinder pressure is larger at the time of depression of the brake pedal 21 than at the time of release thereof even with the same amount of stroke, when the hydraulic pressure (i.e., precisely, the controlled hydraulic pressure) decreases after the brake pedal 21 is depressed to a certain degree and then released, the decrease of the stroke is not as much as that of the wheel cylinder pressure.

Figure 13:
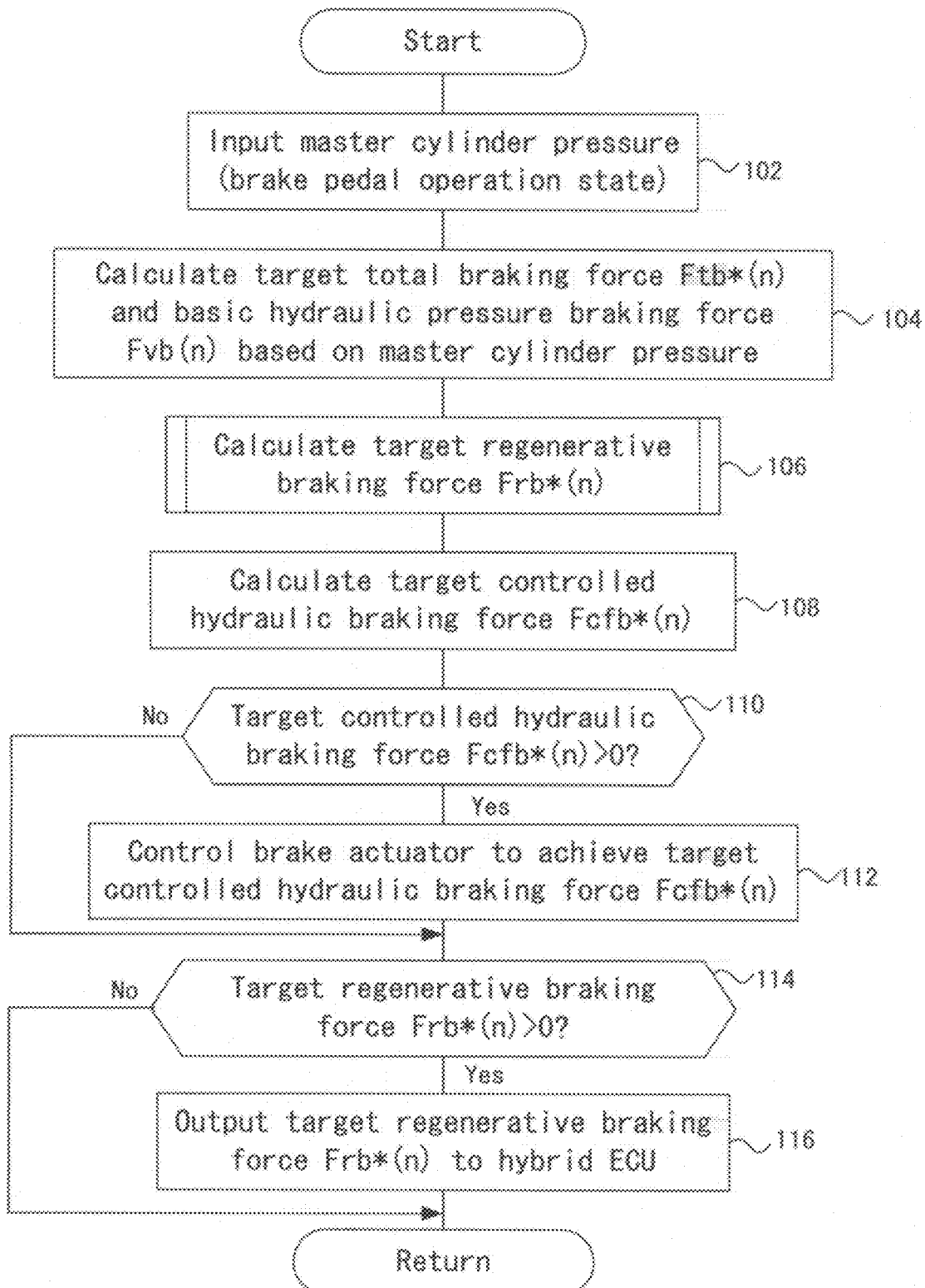
FIG. 13 is a flowchart of the control program performed by the brake ECU according to the second embodiment.
Figure 14:
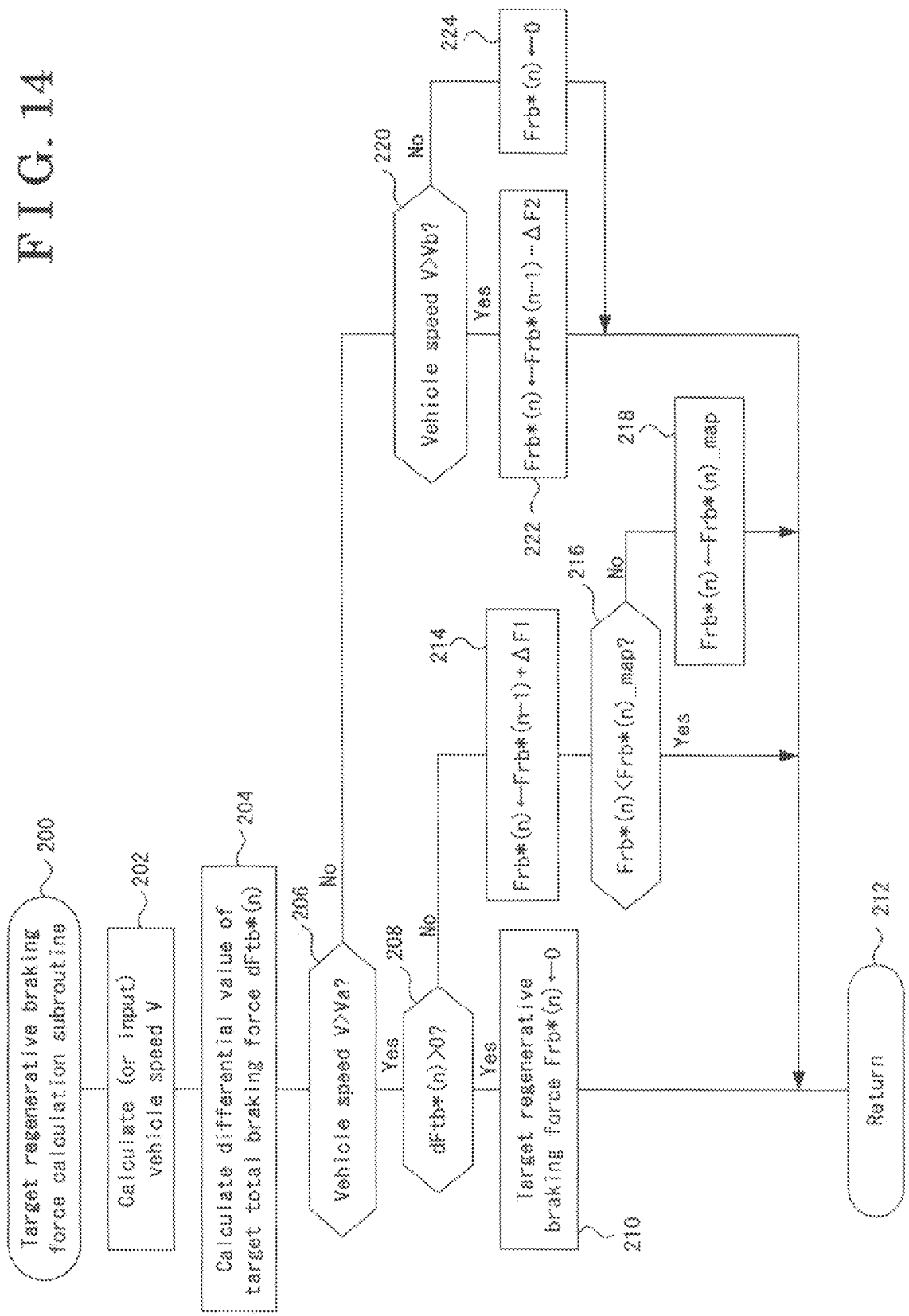
FIG. 14 is another flowchart of the control program performed by the brake ECU according to the second embodiment.

An operation of the braking apparatus for a vehicle 1 according to the second embodiment will be explained with reference to a flowchart illustrated in FIGS. 13 and 14, and a time chart illustrated in FIG. 15. The brake ECU 60 executes a program corresponding to the flowchart at a predetermined time interval (i.e., calculation period) T when an ignition switch (not shown) of a vehicle is in ON state, for example. The brake ECU 60 inputs a master cylinder pressure representing the brake operation state from the pressure sensor P in step 102 and then calculates a target total braking force Ftb*(n) based on the input master cylinder pressure in step 104. At this time, the brake ECU 60 uses a map, table, or arithmetic expression stored beforehand and indicating the correlation between the master cylinder pressure, i.e., the brake operation state, and the target total braking force applied to the wheels FL, FR, RL, and RR. The brake ECU 60 also calculates a basic hydraulic braking force Fvb(n) based on the input master cylinder pressure in step 104. At this time, the brake ECU 60 uses a map, table, or arithmetic expression stored beforehand and indicating the correlation between the master cylinder pressure, i.e., the brake operation state, and the basic hydraulic braking force applied to the wheels FL, FR, RL, and RR.

The brake ECU 60 then calculates a target regenerative braking force Frb*(n) in step 106. Precisely, the brake ECU 60 performs a calculation subroutine of the target regenerative braking force during the braking force replacement control as illustrated in FIG. 14.

Each time the subroutine is executed in step 200, the brake ECU 60 calculates a vehicle speed V based on the wheel speed of each of the wheels FL, FR, RL, and RR input from the wheel speed sensors Sfl, Sfr, Srl, and Srr, respectively, in step 202. At this time, alternatively, a speed sensor for detecting a vehicle speed can be provided separately so that the detected vehicle speed is input to the brake ECU 60.

The brake ECU 60 calculates a differential value of the target total braking force dFtb*(n) in step 204. That is, for example, the brake ECU 60 acquires a value of difference between the presently calculated target regenerative braking force Frb*(n) and the previously calculated target regenerative braking force Frb*(n−1) or a value obtained by dividing that difference by a time T. The brake ECU 60 can also calculate the differential value dFtb*(n) based on multiple data obtained in the past.

When it is determined that the braking of the vehicle is started (at t1) under the condition that a vehicle speed V is greater than a start replacement vehicle speed Va and the differential value dFtb*(n) is greater than zero in step 206 and step 208, respectively, the brake ECU 60 sets the target regenerative braking force Frb*(n) to be zero in step 210. Then, the brake ECU 60 calculates a target controlled hydraulic braking force Fcfb*(n) based on this target regenerative braking force Frb*(n) in step 108. That is, the target controlled hydraulic braking force Fcfb*(n) is obtained by subtracting the sum of the basic hydraulic braking force Fvb(n) and the target regenerative braking force Frb*(n) from the target total braking force Ftb*(n). This case is equal to a case in which the controlled hydraulic braking force is applied instead of the regenerative braking force when the total braking force is composed of the basic hydraulic braking force and the regenerative braking force. Thus, the target regenerative braking force Frb*(n) in the case of applying the total braking force by the basic hydraulic braking force and the regenerative braking force may be calculated, and then the calculated target regenerative braking force Frb*(n) may be regarded as the target controlled hydraulic braking force Fcfb*(n).

Since the target controlled hydraulic braking force Fcfb*(n) is greater than zero, which has been determined in step 110, the brake ECU 60 controls the brake actuator 25 so that the target controlled hydraulic braking force Fcfb*(n) can be achieved in step 112. Further, since the target regenerative braking force Frb*(n) is equal to zero (i.e., negative determination in step 114), the brake ECU 60 terminates the present program.

Figure 15:
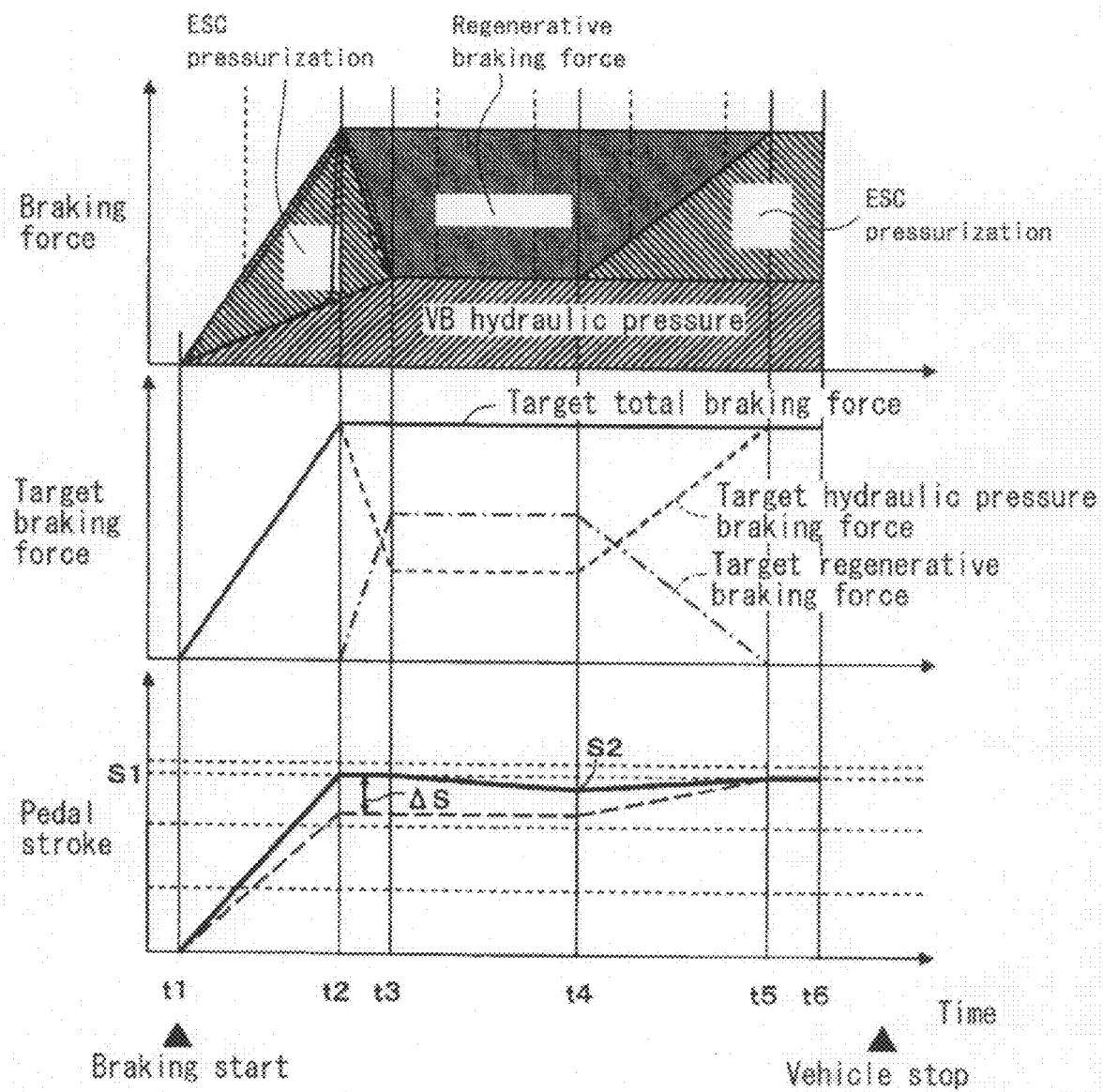
FIG. 15 is a time chart illustrating a correlation between the composition of the braking force, a target value for each braking force, and the stroke of the brake pedal according to the second embodiment.

Accordingly, the brake ECU 60 applies the total braking force only by the basic hydraulic braking force (portion with a rising diagonal stroke from bottom left to top right indicated as "VB hydraulic pressure" in FIG. 15) and the controlled hydraulic braking force (portion with a rising diagonal stroke from bottom right to top left indicated as "ESC pressurization" in FIG. 15) from the start of braking (at t1) until the differential value of the target total braking force dFtb*(n) equals zero (at t2). That is, the brake ECU 60 performs a first control for applying at least the controlled hydraulic braking force during any time period (according to the present embodiment, full time period) while the quantity of the brake operation state (i.e., master cylinder pressure) is increasing.

When the differential value of the target total braking force dFtb*(n) equals zero (i.e., negative determination in step 208), the brake ECU 60 performs a control for gradually replacing the controlled hydraulic braking force with the regenerative braking force. That is, after the first control, the brake ECU 60 performs a second control for applying at least the regenerative braking force by gradually decreasing the controlled hydraulic braking force while gradually increasing the regenerative braking force in response to the decrease of the controlled hydraulic braking force.

Specifically, when the differential value of the target total braking force dFtb*(n) equals zero (at t2), the brake ECU 60 increases the target regenerative braking force Frb*(n) by ΔF1 in step 214. In the cases where the target regenerative braking force Frb*(n) is smaller than a target regenerative braking force Frb*(n)_map calculated on the basis of the brake operation state at that time and the map in step 216, the brake ECU 60 sets the value calculated in step 214 as the target regenerative braking force Frb*(n). Then, using this target regenerative braking force Frb*(n), the brake ECU 60 calculates the target controlled hydraulic braking force Fcfb*(n) in step 108.

Since the target controlled hydraulic braking force Fcfb*(n) is greater than zero, which has been determined in step 110, the brake ECU 60 controls the brake actuator 25 so that the target controlled hydraulic braking force Fcfb*(n) can be achieved in step 112. Further, since the target regenerative braking force Frb*(n) is greater than zero, which has been determined in step 114, the brake ECU 60 outputs the target regenerative braking force Frb*(n), which has been calculated in step 106, to the hybrid ECU 19 in step 116. The hybrid ECU 19 inputs a regenerative request value indicating the target regenerative braking force Frb*(n) and controls the motor 12 via the inverter 16 so as to generate the regenerative braking force based on the input regenerative request value while considering the vehicle speed, the battery charged state, and the like. The hybrid ECU 19 also outputs an actual regenerative value to the brake ECU 60.

Therefore, the brake ECU 60 starts the control for replacing the controlled hydraulic braking force with the regenerative braking force from a point at which the differential value of the target total braking force dFtb*(n) equals zero (i.e., t2). The brake ECU 60 then finishes the control for replacing the controlled hydraulic braking force with the regenerative braking force at t3 at which the target regenerative braking force Frb*(n) becomes equal to the target regenerative braking force Frb*(n)_map. That is, the brake ECU 60 applies the total braking force by the basic hydraulic braking force, the controlled hydraulic braking force, and the regenerative braking force (portion with a rising diagonal stroke from bottom right to top left indicated as "regenerative braking force" in FIG. 15) during a time period between t2 and t3.

When it is determined in step 216 that the target regenerative braking force Frb*(n) calculated in step 214 is greater than the target regenerative braking force Frb*(n)_map calculated on the basis of the brake operation state at that time and the map, the brake ECU 60 sets the target regenerative braking force Frb*(n)_map as the target regenerative braking force Frb*(n) in step 218. Then, the brake ECU 60 calculates the target controlled hydraulic braking force Fcfb*(n) in the way as mentioned above. However, the target controlled hydraulic braking force Fcfb*(n) is zero during a time period between t3 and t4.

Accordingly, the brake ECU 60 applies the total braking force only by the basic hydraulic braking force and the regenerative braking force during the time period between t3 and t4.

When the vehicle speed decreases, the regenerative braking force decreases accordingly, which may lead to insufficiency of the regenerative braking force in the total braking force required for the wheels FL, FR, RL, and RR. The shortage of the regenerative braking force is covered or compensated by the controlled hydraulic braking force (portion with a rising diagonal stroke from bottom right to top left indicated as "ESC pressurization" in FIG. 15), which is the braking force replacement control (i.e., replacement of the regenerative braking force with the controlled hydraulic braking force) started at t4 and completed at t5.

The brake ECU 60 starts the braking force replacement control when the vehicle speed V reaches the start replacement vehicle speed Va (at t4). That is, the brake ECU 60 gradually decreases the target regenerative braking force Frb*(n) when the vehicle speed is equal to or smaller than the start replacement vehicle speed Va (i.e., negative determination in step 206) and is greater than the end replacement vehicle speed Vb (i.e., positive determination in step 220). Precisely, the target regenerative braking force Frb*(n) that is equal to the target regenerative braking force Frb*(n)_map so far is set to decrease by ΔF2 in step 222.

When the vehicle speed V reaches the end replacement vehicle speed Vb (at t5), the target regenerative braking force Frb*(n) is set to zero in step 224, thereby stopping the application of the regenerative braking force and terminating the braking force replacement control. Therefore, the brake ECU 60 applies the total braking force by the basic hydraulic braking force, the regenerative braking force, and the controlled hydraulic braking force during a period between t4 and t5. Accordingly, the brake ECU 60 performs a third control for gradually replacing the regenerative braking force with the controlled hydraulic braking force by decreasing the regenerative braking force while increasing the controlled hydraulic braking force in response to the decrease of the regenerative braking force.

After t5, the basic hydraulic braking force and the controlled hydraulic braking force are applied to the wheels FL, FR, RL, and RR and then the vehicle is sopped (at t6).

According to the aforementioned second embodiment, as illustrated in FIG. 15, the driver starts depressing the brake pedal 21 in the vehicle in motion at t1. In the first control (from t1 to t2) in which the brake pedal 21 is depressed prior to the third control for replacing the regenerative braking force with the controlled hydraulic braking force, at least a portion (precisely, all according to the present embodiment) of a stroke increase ΔS occurring upon the pump drive, i.e., the suction or pressurization of the pumps, for the braking force replacement control can be acquired beforehand. That is, in the first control, the pedal stroke can increase to S1 that is obtained by adding the stroke increase ΔS to the conventional pedal stroke shown with a dotted line in FIG. 15.

Further, the hydraulic brake apparatus B constituted by the master cylinder 23, the wheel cylinders WC1 to WC4, and the like has the hysteresis in the correlation between the wheel cylinder pressure and the stroke of the brake pedal 21 as illustrated in FIG. 12. That is, on the assumption that the amount of stroke of the brake pedal 21 is same, the wheel cylinder pressure is larger when the brake pedal 21 is depressed as compared to the wheel cylinder pressure generated when the brake pedal 21 is released. Even if the hydraulic pressure (i.e., precisely, the controlled hydraulic pressure) decreases after the brake pedal 21 is depressed to a certain degree and then released, the decrease of the stroke is not as much as that of the wheel cylinder pressure (according to the present embodiment, the stroke decreases from S1 to S2 as illustrated in FIG. 15). Accordingly, the controlled hydraulic pressures decreases during the period between t2 and t4 by the second control to thereby decrease the stroke of the brake pedal 21, however, the degree of decrease of the stroke can be reduced by using the hysteresis. The degree of decrease of the stroke can be reduced to a certain level, i.e., S2. S2 is greater than the conventional pedal stroke.

In the third control from t4 to t5, the controlled hydraulic pressure increases to thereby increase the stroke from S2 because of the suction of the pumps 37 and 47. However, since the stroke increase due to the pump drive occurring in the third control is acquired beforehand in the first control and then the stroke decrease caused by the decrease of the controlled hydraulic pressure in the second control can be minimized (i.e., S2), the stroke at the time of the third control start is relatively large. Accordingly, a difference between the stroke obtained at the third control start and the stroke in response to the hydraulic braking force composed of the sum of the basic hydraulic braking force and the controlled hydraulic braking force (i.e., S1) can be minimized as compared to the conventional case. As a result, the amount of stroke further depressed upon driving of the pump in the third control can be minimized.

The further depression of the brake pedal 21 caused by the driving of the pumps 37 and 47 in the braking force replacement control conducted in the second half of the total braking is brought to occur beforehand, i.e., when the brake pedal 21 is depressed by the driver in the first half of the total braking, so as to reduce or minimize the further depression of the brake pedal 21 during the braking force replacement control, thereby preventing the driver from having the uncomfortable feeling.

Further, in the first control, the application of the regenerative braking force is prohibited and instead the controlled hydraulic braking force is applied during a full period in which the quantity of the brake operation state is increasing (i.e., from t1 to t2). Accordingly, the controlled hydraulic braking force can be securely applied beforehand.

Next, a first alternative embodiment to the second embodiment will be explained below with reference to a time chart illustrated in FIG. 16. In the first control according to the second embodiment, the application of the regenerative braking force is prohibited and instead the controlled hydraulic braking force is applied. However, according to this alternative embodiment, a predetermined rate of the total braking force (or the total hydraulic braking force) required for the wheels in response to the brake operation state is applied as the regenerative braking force. The remaining portion of the total braking force can be applied by the hydraulic braking force constituted by the basic hydraulic braking force and the controlled hydraulic braking force.

In this case, instead of step 210 in which the target regenerative braking force Frb*(n) is set to zero, a value obtained by multiplying the target total braking force dFtb*(n) by a predetermined ratio a (a is greater than zero) is set as the target regenerative braking force Frb*(n).

Figure 16:
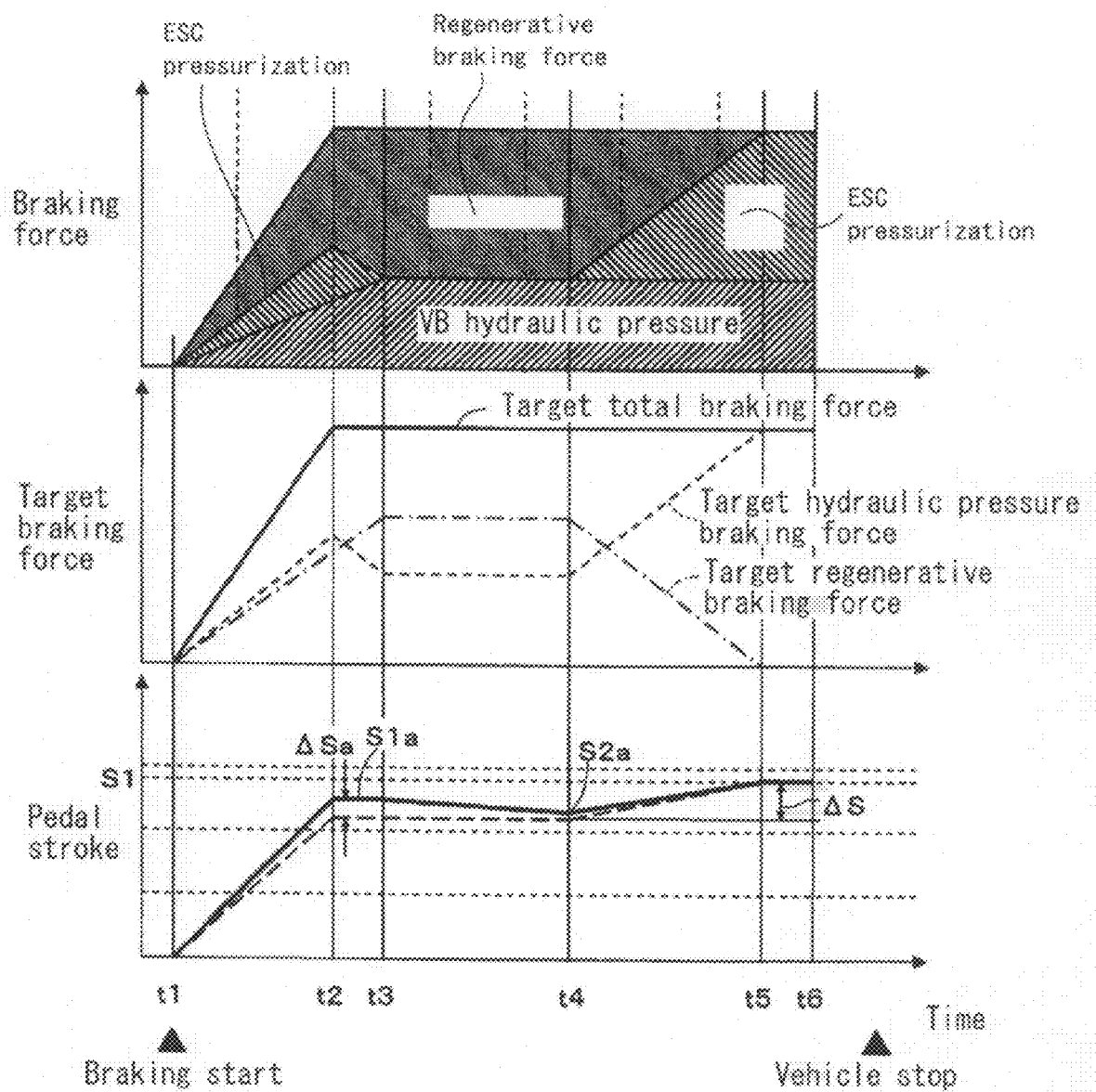
FIG. 16 is a time chart illustrating a correlation between the composition of the braking force, the target value for each braking force, and the stroke of the brake pedal according to a first alternative embodiment to the second embodiment.

According to this alternative embodiment, as illustrated in FIG. 16, at least a portion ΔSa of the stroke increase ΔS occurring upon driving of the pump during the braking force replacement control can be acquired beforehand, i.e., prior to the third control, in the first control in which the brake pedal 21 is depressed by the driver. That is, the pedal stroke increases to a value S1a that is obtained by adding the stroke increase ΔSa to the increasing pedal stroke as in the conventional case shown by a dotted line in FIG. 16.

In the second control, which is the same as the second embodiment, the stroke decreases along with the decrease of the controlled hydraulic pressure during the period between t2 and t4. However, the decrease of the stroke can be minimized by using the hysteresis. That is, the decrease of the stroke can be minimized to a certain level, i.e., S2a. S2a is greater than the conventional stroke.

In the third control from t4 to t5, the controlled hydraulic pressure increases to thereby increase the stroke from S2a because of the suction of the pumps 37 and 47. However, since the stroke increase due to the pump drive occurring in the third control is acquired beforehand in the first control and then the stroke decrease caused by the decrease of the controlled hydraulic pressure in the second control can be minimized (i.e., S2a), the stroke at the time of the third control start is relatively large. Accordingly, a difference between the stroke obtained at the third control start and the stroke in response to the hydraulic braking force composed of the sum of the hydraulic braking force and the controlled hydraulic braking force (i.e., S1a) can be minimized as compared to the conventional case. As a result, the amount of stroke further depressed upon driving of the pump in the third control can be minimized.

The further depression of the brake pedal 21 caused by the driving of the pumps 37 and 47 in the braking force replacement control conducted in the second half of the total braking is brought to occur beforehand, i.e., when the brake pedal 21 is depressed by the driver in the first half of the total braking so as to reduce the further depression of the brake pedal 21 occurring during the braking force replacement control, thereby preventing the driver from having the uncomfortable feeling.

The predetermined ratio a is variable in response to the vehicle speed at the braking start. The predetermine ratio can be set smaller in response to the increase of the vehicle speed at the braking start. Accordingly, the hydraulic braking force and the regenerative braking force can be applied at an appropriate ratio in response to the vehicle speed. The regenerative energy can be highly effectively used while the controlled hydraulic braking force is applied beforehand.

In this case, the regenerative braking force may be restricted by a regenerative braking force upper limit that is specified so that the controlled hydraulic braking force can be applied at least at a minimum. Accordingly, the controlled hydraulic braking force can be appropriately and securely applied beforehand.

Figure 17:
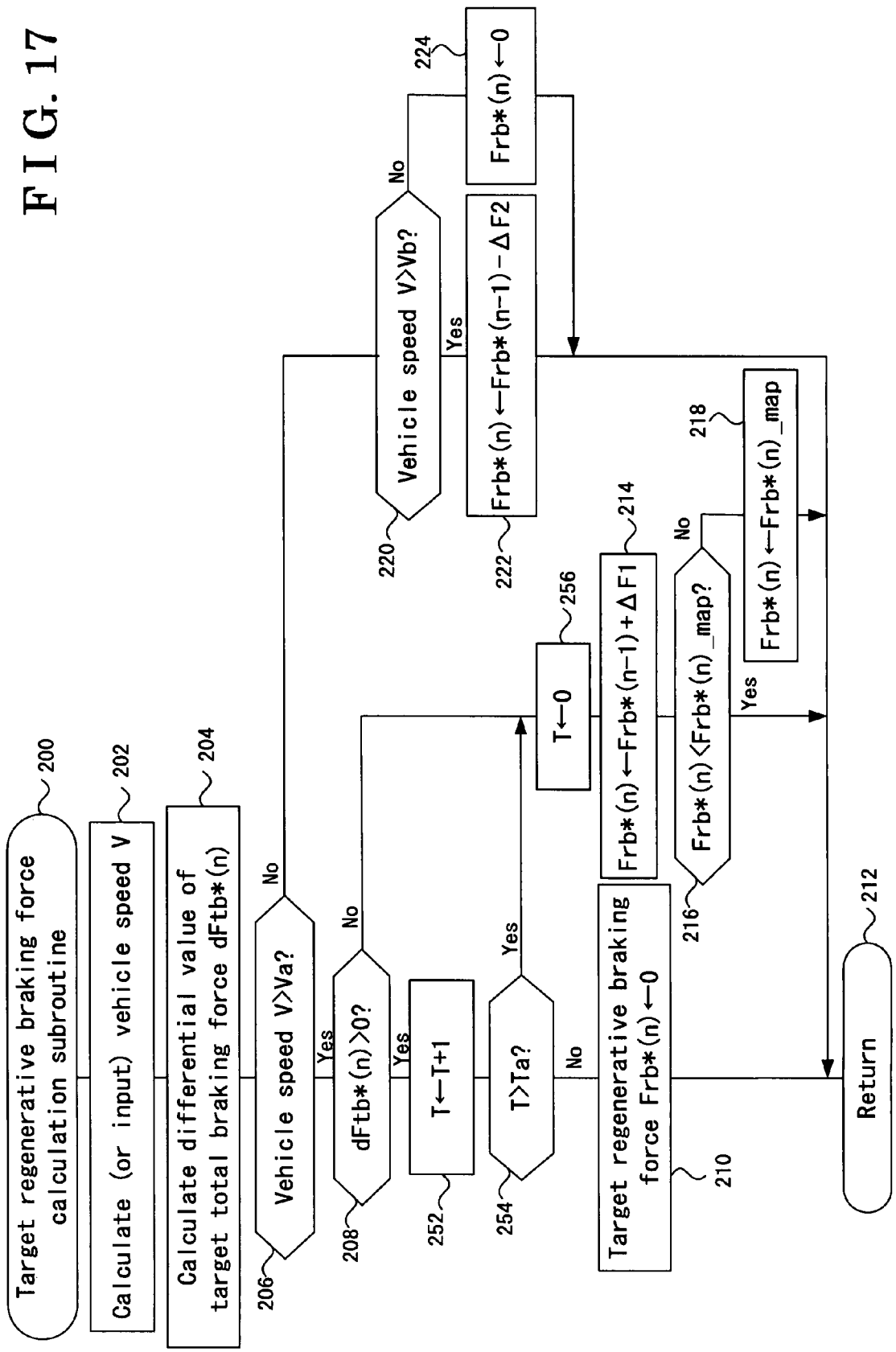
FIG. 17 is a flowchart of the control program performed by the brake ECU according to a second alternative embodiment to the second embodiment.

A second alternative embodiment to the second embodiment will be explained with reference to a flowchart illustrated in FIG. 17. In the first control according to the second embodiment, when the differential value of the target total braking force dFtb*(n) is greater than zero, i.e., while the stroke of the brake pedal 21 is increasing, the application of the regenerative braking force is prohibited and instead the controlled hydraulic braking force is applied. In this alternative embodiment, during a time period from the increase start of the quantity of the brake operation state (i.e., t1 in FIG. 15) to a point where a predetermined time Ta has elapsed, the application of the regenerative braking force is prohibited and instead the controlled hydraulic braking force can be applied.

In this case, the brake ECU 60 starts counting a timer T in step 252 when the differential value of the target total braking force dFtb*(n) becomes greater than zero (step 208), i.e., the braking is started (at t1). When a value of the timer T is equal to or smaller than the predetermined time Ta (step 254), the target regenerative braking force Frb*(n) is set to zero in step 210. When a value of the timer T is greater than the predetermined time Ta, the timer T is reset to zero and the target regenerative braking force Frb*(n) is set to gradually increase in step 214. For example, when the point at which the predetermined time Ta has elapsed is equal to t2, the increase of the target regenerative braking force Frb*(n) is same as illustrated in FIG. 15.

According to the present alternative embodiment, in the first control from the increase start of the quantity of the brake operation state (t1) to the point at which the predetermined time Ta has elapsed (t2), the application of the regenerative braking force is prohibited and instead the controlled hydraulic braking force is applied, thereby securely applying the controlled hydraulic braking force beforehand.

Further, the predetermined time Ta may be variable depending on the changing speed of the quantity of the brake operation state (i.e., depressing speed of the brake pedal 21). The greater the depressing speed is, the shorter the predetermined time Ta is. As a result, the controlled hydraulic pressure instead of the regenerative braking force can be applied for a required time, thereby effectively using the regenerative energy.

Furthermore, according to the aforementioned second embodiment and the alternative embodiments, the regenerative braking force should promptly increase to a regenerative braking force maximum value in the second control. The regenerative braking force maximum value is the target regenerative braking force Frb*(n)_map calculated on the basis of the brake operation state at that time and on the basis of the map. Accordingly, the controlled hydraulic braking force can be replaced with the regenerative braking force as promptly as possible, thereby effectively using the regenerative energy.

Furthermore, the time period, in which the regenerative braking force only is applied besides the basic hydraulic braking force in the second control, should be reduced as much as possible. As illustrated in FIG. 15, by suppressing the decrease of the pedal stroke at t2 and retaining S2 at a large level, the further depression of the brake pedal 21 during the third control for the braking force replacement control can be minimized.

According to the aforementioned second embodiment, at least a portion of the stroke increase occurring upon pump drive, i.e., suction of the pumps, during the braking force replacement control can be obtained beforehand in the first control i.e., prior to the third control, in which the brake pedal is depressed by the driver.

Further, the hydraulic brake apparatus constituted by the master cylinder, the wheel cylinder, and the like has a hysteresis in the correlation between the wheel cylinder pressure and the brake pedal stroke as illustrated in FIG. 12. That is, on the assumption that the amount of stroke of the brake pedal is same, the wheel cylinder pressure is larger when the brake pedal is depressed than when the brake pedal is released. Accordingly, when the hydraulic pressure (i.e., portion of the controlled hydraulic pressure) decreases after the brake pedal is depressed to a certain degree by the driver, the decrease of the stroke is not as much as that of the wheel cylinder pressure. Thus, the decrease of the controlled hydraulic pressure by the second control causes the decrease of the stroke, which, however, can be suppressed to a small level by using the hysteresis.

The controlled hydraulic pressure increases in the third control, which causes increase of the stroke. However, since the stroke increase caused by the pump drive by the third control has been acquired beforehand in the first control and then the decrease of the stroke caused by the decrease of the controlled hydraulic pressure can be minimized in the second control, the stroke at the time of the third control start is relatively large. Accordingly, a difference between the stroke at the time of the third control start and the stroke in response to the hydraulic braking force, which is the sum of the basic hydraulic braking force and the controlled hydraulic braking force, can be reduced as compared to the conventional apparatus. The stroke amount of the brake pedal further depressed by the pump drive in the third control can be minimized.

Furthermore, in the first control, the application of the regenerative braking force is prohibited and instead the controlled hydraulic braking force is applied during the time period from the increase start of the quantity of the brake operation state to the point at which the predetermined time has elapsed, thereby securely achieving the controlled hydraulic braking force to be generated beforehand.

Furthermore, the aforementioned predetermined time is variable in response to the changing speed of the brake operation state quantity, thereby applying the controlled hydraulic braking force instead of the regenerative braking force for a required and sufficient time. The regenerative energy can be effectively used accordingly.

Furthermore, in the first control, the application of the regenerative braking force is prohibited and instead the controlled hydraulic braking force is applied during a full period during which the brake operation state quantity is increasing, thereby securely and sufficiently achieving the controlled hydraulic braking force to be generated beforehand.

Furthermore, according to the aforementioned first alternative embodiment, in the first control, the predetermined ratio of the total braking force required for the wheels in response to the brake operation state is applied as the regenerative braking force and the remaining portion of the total braking force is applied as the hydraulic braking force constituted by the basic hydraulic braking force and the controlled hydraulic braking force. Therefore, the regenerative energy can be effectively used while achieving the controlled hydraulic braking force to be generated beforehand.

Furthermore, the predetermined ratio is variable in response to the vehicle speed at the braking start triggered by the brake operation of the driver, thereby applying the hydraulic braking force and the regenerative braking force at an appropriate ratio in response to the vehicle speed at the braking start.

Furthermore, the regenerative braking force is restricted by the regenerative braking force upper limit, thereby securely and appropriately achieving the controlled hydraulic braking force to be generated beforehand.

Furthermore, in the second control, the regenerative braking force can promptly increase to the regenerative braking force maximum value, thereby effectively using the regenerative energy.

Next, a braking apparatus for a vehicle 1 according to a third embodiment of the present invention employed in a hybrid vehicle will be explained with reference to the attached drawings. The third embodiment has a substantially same structure as that of the first and second embodiments and thus an explanation for the similar structure will be omitted and only a different portion will be explained below.

An operation of the braking apparatus for a vehicle 1 according to the third embodiment will be explained with reference to FIGS. 18 to 25. Before explaining the detailed operation of the braking apparatus 1, a reason why the operation is performed will be described below.

Figure 18:
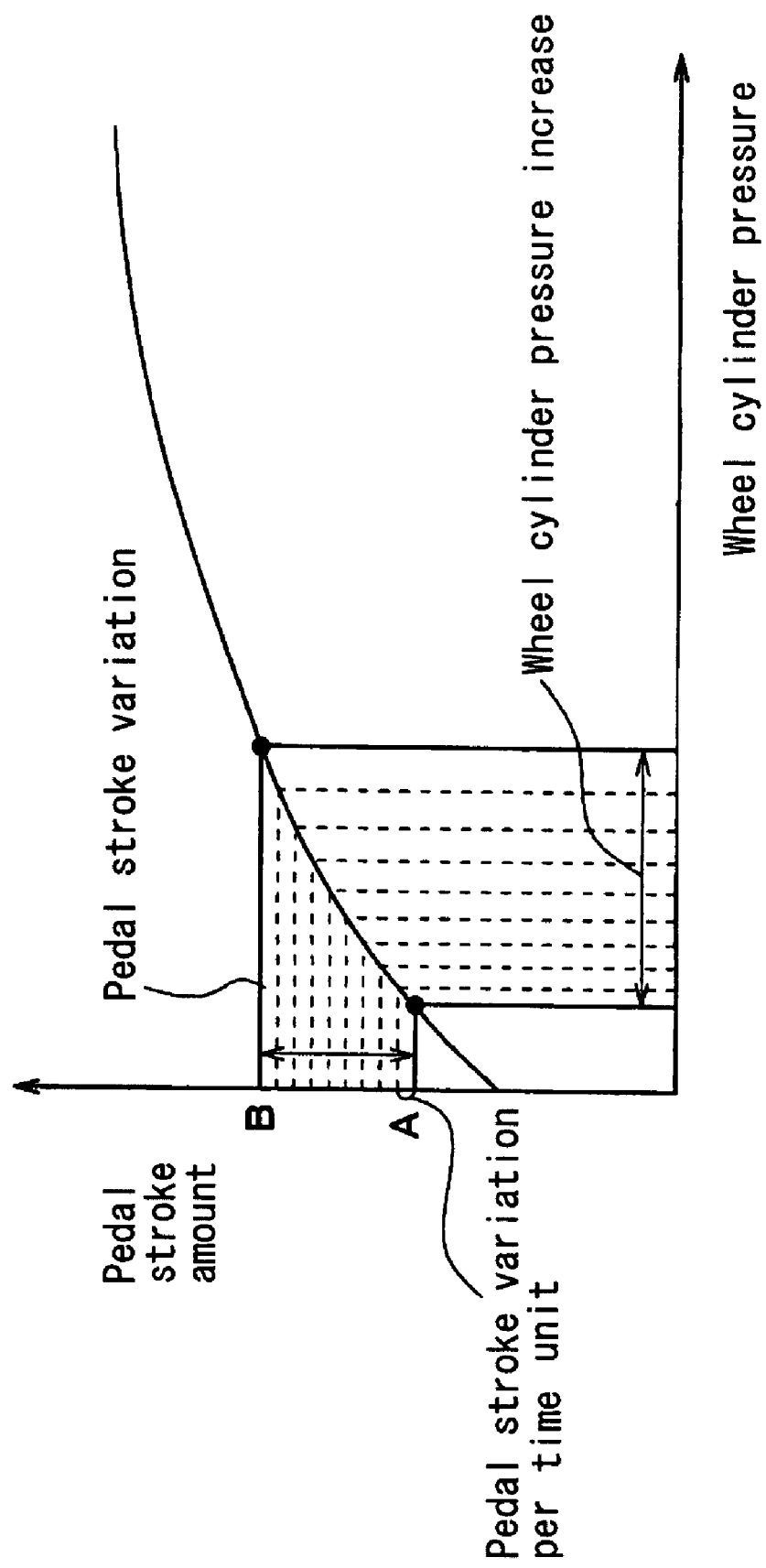
FIG. 18 is a graph illustrating a correlation between the wheel cylinder pressure and a stroke amount of the brake pedal according to a third embodiment.

FIG. 18 is a graph showing a correlation between a wheel cylinder pressure and an amount of stroke of a brake pedal 21. As illustrated in FIG. 18, the wheel cylinder pressure and the amount of stroke are not in a proportional relation. In a range where the stroke amount is small, an increase of the wheel cylinder pressure relative to an increase of the stroke amount is small. On the other hand, in a range where the stroke amount is large, the increase of the wheel cylinder relative to the increase of the stroke amount is large.

Thus, for example, when the stroke amount is changed from a point A to a point B as illustrated in FIG. 18 in the case of replacing the regenerative braking force with the controlled hydraulic braking force, the increase of the wheel cylinder pressure relative to the increase of the stroke amount is small in an early stage of the replacement. Then, the increase of the wheel cylinder pressure relative to the increase of the stroke amount is gradually larger as the replacement progresses. Accordingly, on the assumption that a decrease of the regenerative braking force per time unit is constant in the case of replacing the regenerative braking force with the controlled hydraulic braking force, i.e., an increase of the wheel cylinder pressure per time unit that can replace the regenerative braking force is constant, an increase of the stroke amount per time unit is largest in the early stage of the replacement and then gradually smaller. That is, a state as illustrated in FIG. 25 appears, which gives the driver a poor braking feeling.

Figure 25A:
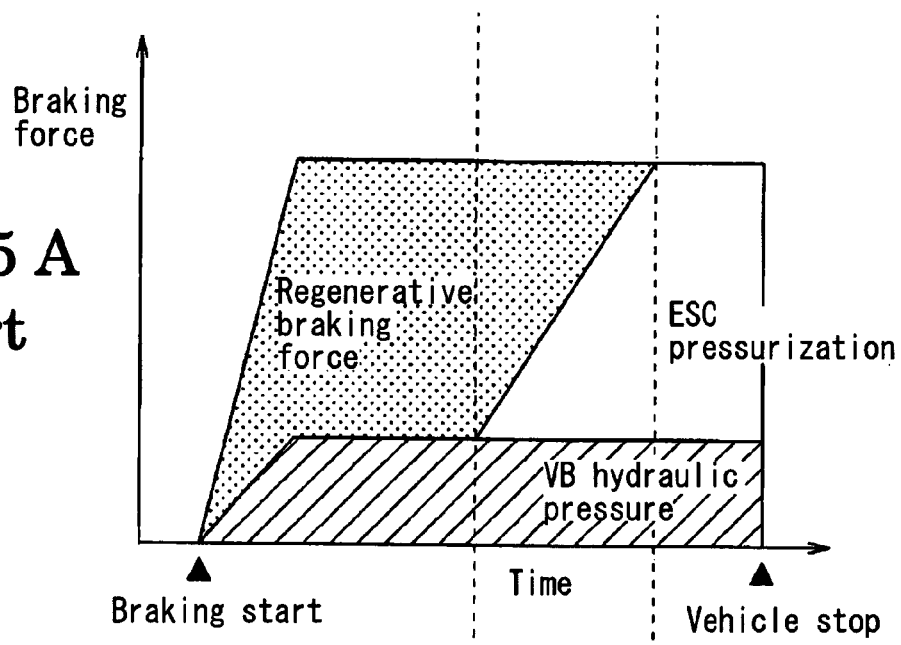
FIGS. 25A and 25B are time charts illustrating a correlation between the composition of the braking force and the stroke of the brake pedal according to a conventional apparatus.
Figure 25B:
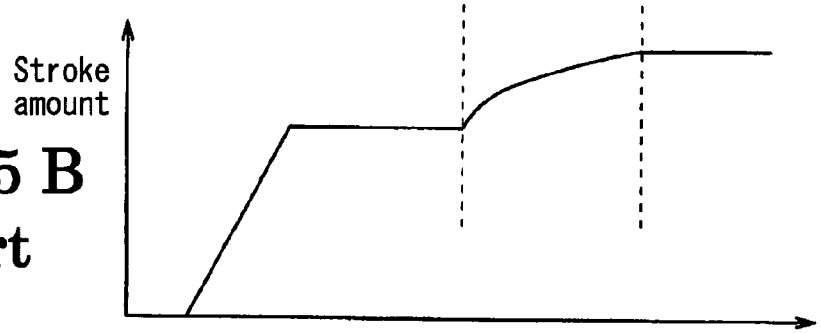

FIG. 25A is a view illustrating a state where the regenerative braking force is replaced with the controlled hydraulic braking force based on a time axis according to the conventional apparatus. FIG. 25B is a view illustrating a change in the stroke amount of the brake pedal 21 correlated to the time axis in FIG. 25A.

As illustrated in FIG. 25A, in the case of replacing the regenerative braking force (portion indicated as "Regenerative braking force" in FIG. 25A) with the controlled hydraulic braking force (portion indicated as "ESC pressurization in FIG. 25A), the regenerative braking force is decreased by a constant amount with time and that decrease is compensated by the controlled hydraulic braking force. Accordingly, the regenerative braking force can be replaced with the controlled hydraulic braking force while the target braking force required by the driver is not changed.

However, as illustrated in FIG. 25B, the stroke amount, when the brake fluid in the master cylinder 23 is consumed, is not constant relative to the passage of time. The variation of the stroke amount becomes large at the instant of starting the replacement of the regenerative braking force with the controlled hydraulic braking force, which may cause a poor braking feeling. Accordingly, the poor braking feeling can be prevented if the variation (i.e., increase) of the stroke amount is substantially constant or is gradually larger instead of suddenly large at the instant of starting the replacement.

Therefore, according to the third embodiment, the decrease of the regenerative braking force per time unit, i.e., the increase of the wheel cylinder pressure per time unit that can replace the regenerative braking force, is small at the early stage of the replacement and then is gradually larger so that the increase of the stroke amount per time unit can be constant.

Figure 19A:
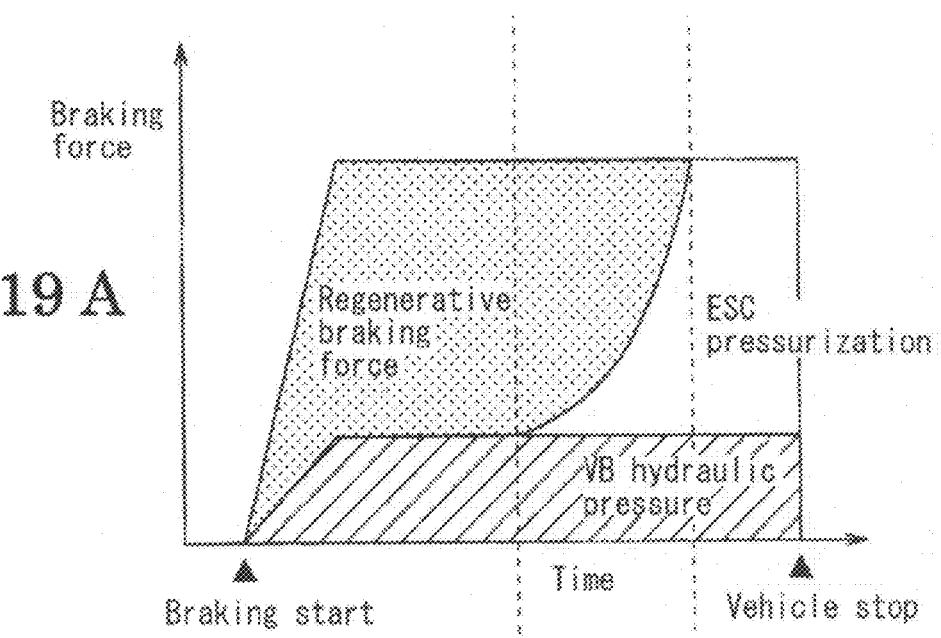
FIGS. 19A and 19B are time charts illustrating a correlation between the composition of the braking force and the stroke of the brake pedal according to the third embodiment.
Figure 19B:
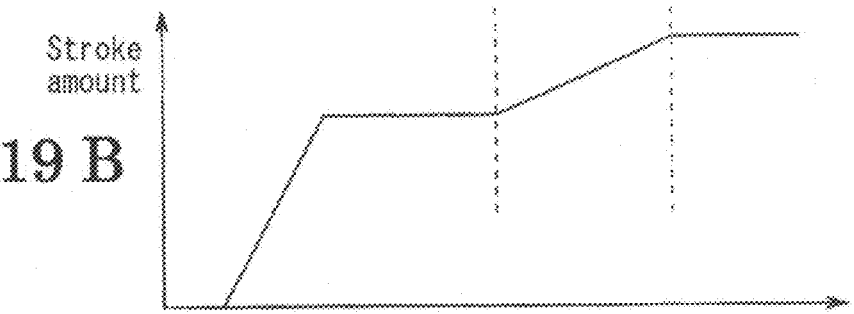

FIG. 19A is a view illustrating a state where the regenerative braking force (portion indicated as "Regenerative braking force" in FIG. 19A) is replaced with the controlled hydraulic braking force (portion indicated as "ESC pressurization in FIG. 19A) based on a time axis in the case of generating the braking force by the braking apparatus 1 according to the third embodiment. FIG. 19B is a view illustrating a change in stroke amount of the brake pedal 21 correlated to the time axis in FIG. 19A.

As illustrated in FIG. 19A, in the case of replacing the regenerative braking force with the controlled hydraulic braking force, the decrease of the regenerative braking force is small at the early stage of the replacement and then is gradually larger with the passage of time from the replacement start. Then, the decrease of the regenerative braking force is compensated by the controlled hydraulic braking force. Accordingly, as illustrated in FIG. 19B, the increase of the stroke amount per time unit can be constant, thereby preventing from giving a poor braking feeling to the driver.

Figure 20:
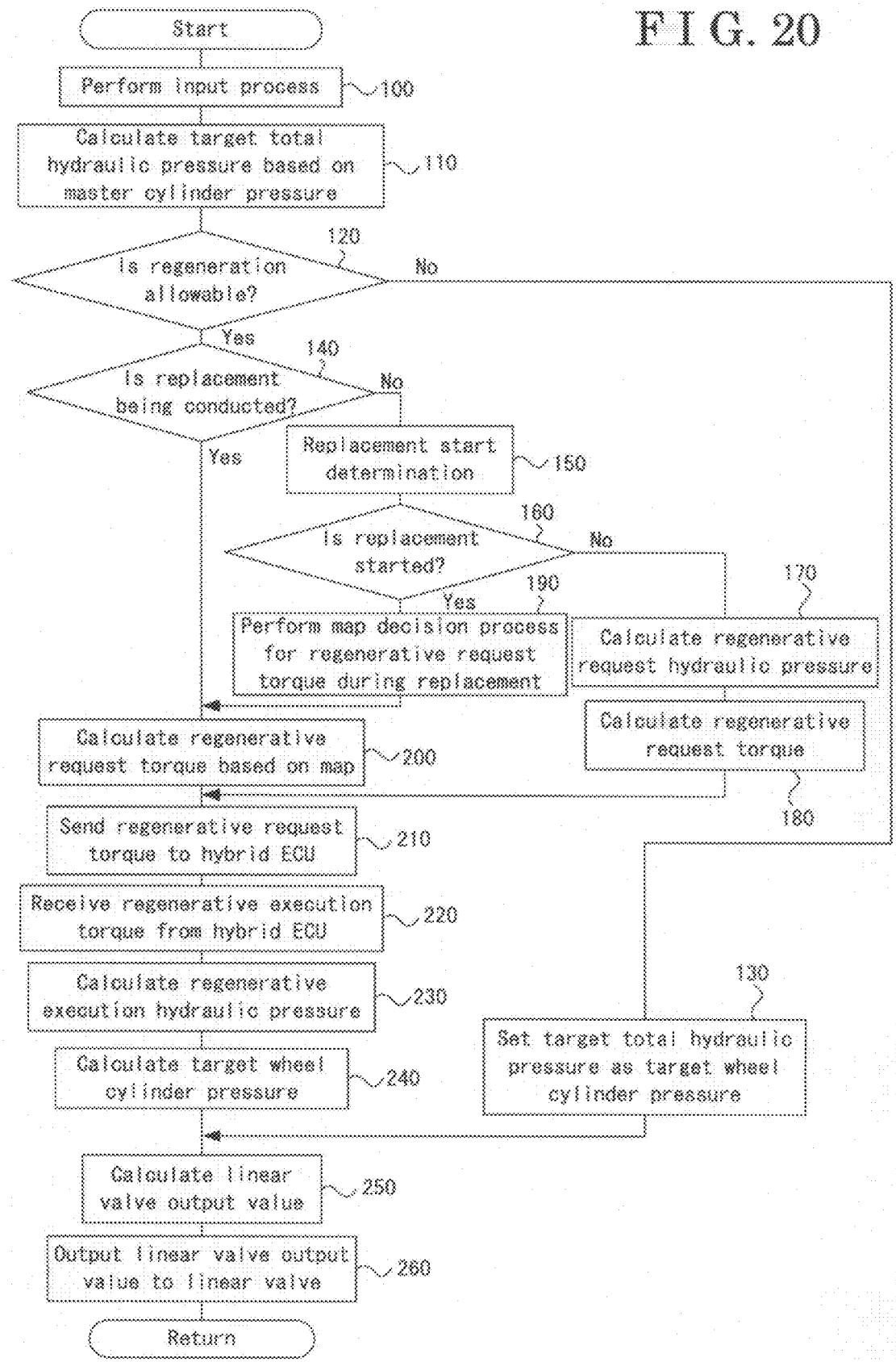
FIG. 20 is a flowchart of a regenerative cooperative control performed by the brake ECU according to the third embodiment.

Next, a cooperative control process performed by the brake ECU 60 for the purposes of making the change in stroke amount per time unit to be constant will be explained below. FIG. 20 is a flowchart of the cooperative control process, which is performed according to a program stored beforehand in a ROM, and the like, of the brake ECU 60 per predetermined calculation period when an ignition switch is in ON state.

First, in step 100, an input process is performed. Precisely, the brake ECU 60 inputs a detection signal from the pressure sensor P to obtain the master cylinder pressure, various data required for the regenerative brake control from the hybrid ECU 19, and the like. The master cylinder pressure is generated in response to the stroke amount of the brake pedal 21 and thus represents a request braking force by the driver. Then, in step 110, the brake ECU 60 calculates on the basis of the obtained master cylinder a target total hydraulic pressure, i.e., a wheel cylinder pressure required to generate the request braking force by the driver. That is, the brake ECU 60 acquires the request braking force by the driver as the equivalent master cylinder pressure value.

In step 120, it is determined whether or not the regeneration is allowable. Specifically, it is determined whether or not conditions are satisfied for enabling the regenerative braking force to be generated by the regenerative brake apparatus A. The conditions include, for example, that the brake pedal 21 is depressed by the driver, a vehicle speed is equal to or more than a predetermined speed, the battery 17 is prevented from falling into a failure state or a fully discharged state, and the like. The depression of the brake pedal 21 by the driver can be determined on the basis of a detection signal of a brake switch (not shown) input to the brake ECU 60. The state of the battery 17 can be determined on the basis of data received from the hybrid ECU 19, which controls the state of the battery 17, to the brake ECU 60.

When it is determined that the regeneration is not allowable in step 120, the request braking force is to be constituted only by the hydraulic braking force generated by the hydraulic brake apparatus B without relying on the regenerative braking force generated by the regenerative brake apparatus A. Thus, the program proceeds to step 130 in which the target total hydraulic pressure obtained in step 110 is directly set as the target wheel cylinder pressure.

On the other hand, when it is determined that the regeneration is allowable in step 120, the program proceeds to step 140 in which it is determined whether or not the replacement of the regenerative braking force with the controlled hydraulic braking force is being conducted. This determination is made on the basis of a replacement start flag that is set when a positive determination is made at the replacement start determination conducted in step 150. When the negative determination is made in step 140, the program proceeds to step 150 in which the replacement start determination is made.

The replacement start determination is performed by the program stored beforehand in the ROM and the like of the brake ECU 60. When it is determined that the replacement is started, the replacement of the regenerative braking force with the controlled hydraulic braking force is conducted by decreasing a regenerative command value sent from the brake ECU 60 to the hybrid ECU 19, and the like. In order to complete the replacement of the regenerative braking force with the controlled hydraulic braking force when the vehicle speed reaches a predetermined speed before the vehicle is stopped, the replacement start timing is defined at a predetermined time before the point when the vehicle speed reaches the predetermined speed. Then, when the replacement start timing is achieved, the replacement start is determined. Alternatively, the replacement start may be determined when the vehicle reaches a predetermined speed. Various examples that have been conventionally employed can be applied to the replacement start determination and thus detailed explanation is omitted here.

When the replacement start determination is made in the aforementioned manner and the replacement start is determined, the replacement start flag is set. Then, in step 160, it is determined whether or not the replacement has been started on the basis of whether or not the replacement start flag has been set. When the negative determination is made, the program proceeds to step 170.

In step 170, a regenerative request hydraulic pressure is calculated. The regenerative request hydraulic pressure is obtained by subtracting the master cylinder pressure from the target total hydraulic pressure obtained in step 110. Specifically, the hydraulic braking force generated by the hydraulic brake apparatus B is basically constituted by the wheel cylinder pressure based on the master cylinder pressure occurring in the master cylinder 23 upon a booster action of the vacuum booster 22. Then, the possible increase of the wheel cylinder pressure caused by the operation of the pumps 37 and 47 contributes the increase of the total wheel cylinder pressure. At the time before the replacement start, because of no increase of the wheel cylinder pressure by the pumps 37 and 47, the regenerative request hydraulic pressure corresponding to the desired regenerative braking force is equal to a value obtained by subtracting the master cylinder pressure from the target total hydraulic pressure.

Then, the program proceeds to step 180 in which a regenerative request torque is calculated. The regenerative request torque is a torque equivalent to the regenerative request hydraulic pressure obtained in step 170. The regenerative request torque is a braking torque generated on the basis of power generation of the motor 12.

Figure 21:
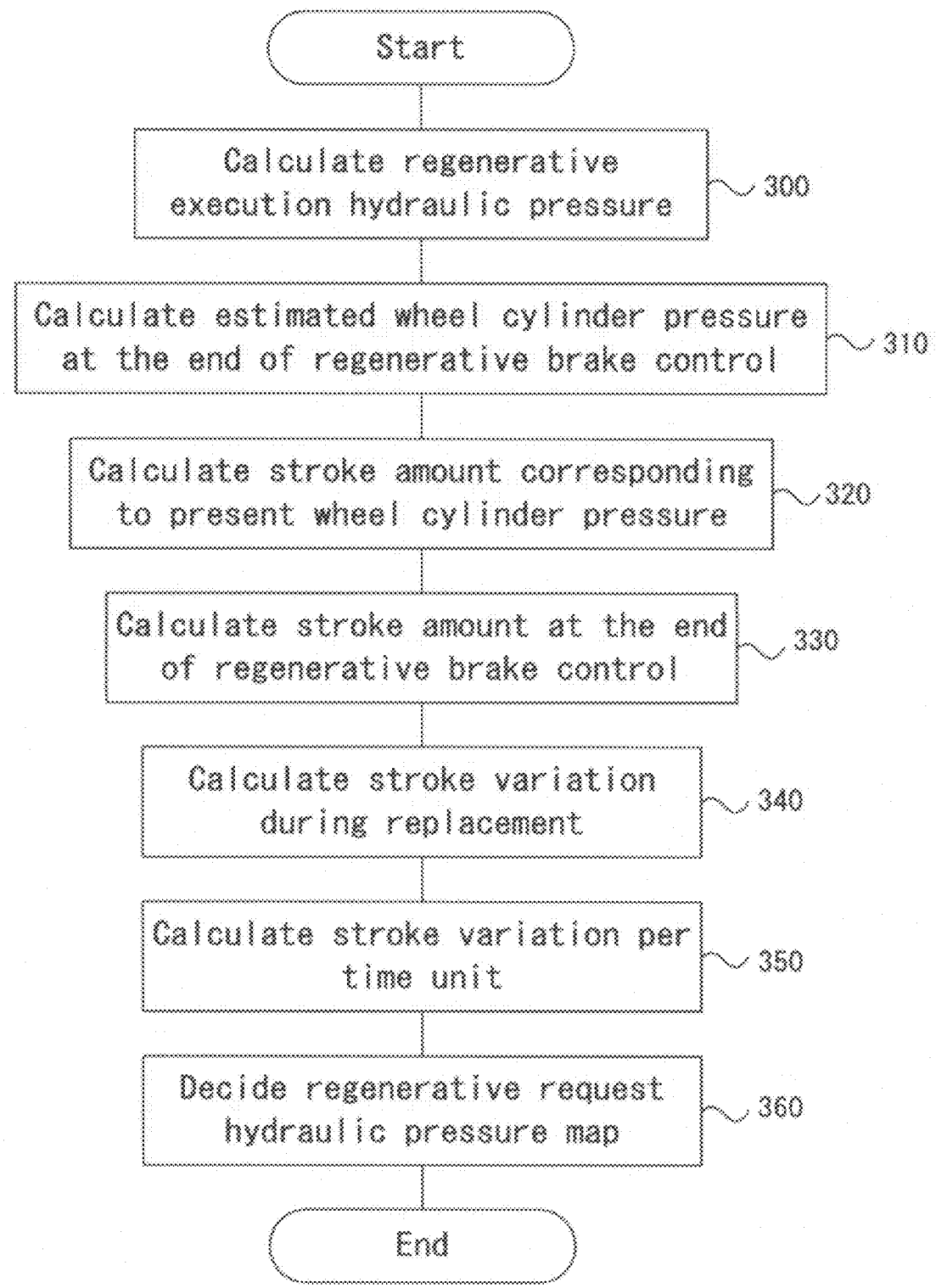
FIG. 21 is a flowchart of a map decision process in the regenerative cooperative control performed by the brake ECU according to the third embodiment.
Figure 22:
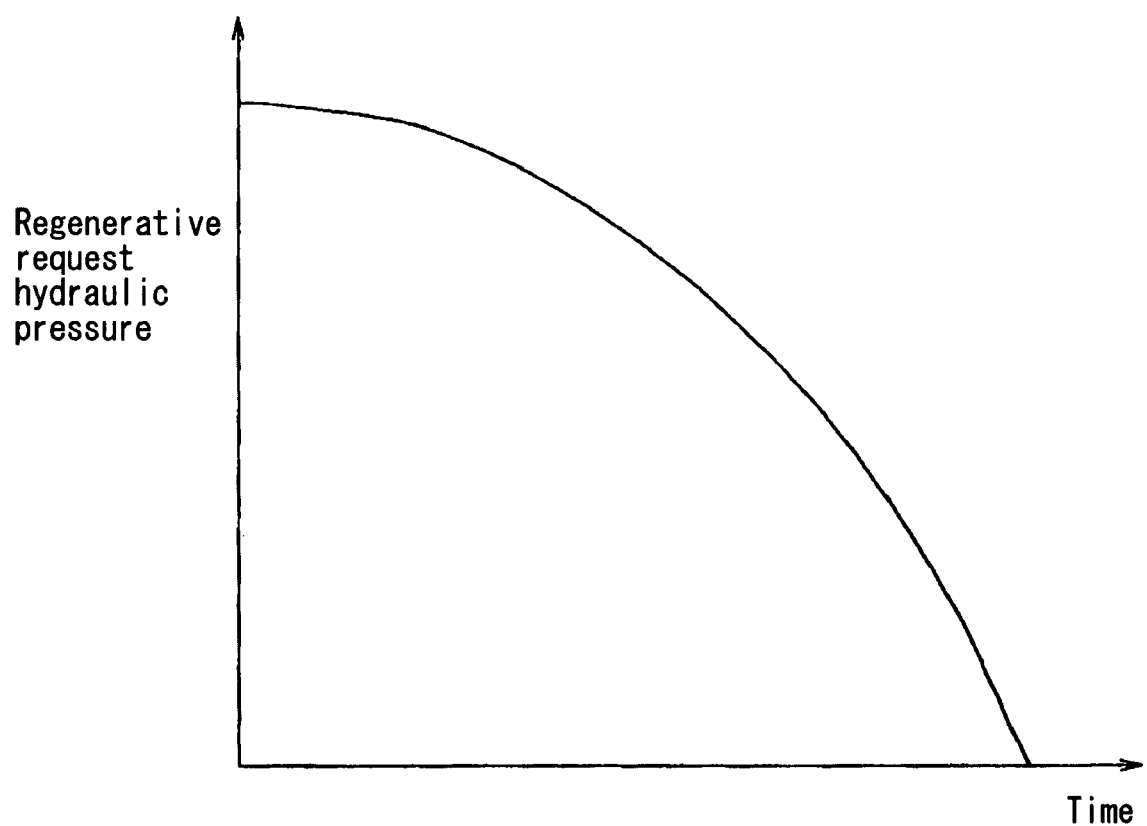
FIG. 22 is a graph illustrating characteristics of a regenerative request hydraulic pressure with a passage of time.

On the other hand, when the positive determination is made in step 160, the program proceeds to step 190 in which a map decision process is performed for deciding a map of the regenerative request torque during the replacement. FIG. 21 is a flowchart illustrating details of the map decision process.

In step 300, a regenerative execution hydraulic pressure is calculated. Precisely, a regenerative execution torque or a regenerative execution braking force obtained by the hybrid ECU 19 is converted to the hydraulic pressure so as to obtain the regenerative execution hydraulic pressure.

Next, in step 310, an estimated wheel cylinder pressure at the end of the regenerative brake control is calculated. Precisely, the wheel cylinder pressure in the present calculation period is obtained and then the regenerative execution hydraulic pressure obtained in step 300 is added to the calculated present wheel cylinder pressure, thereby obtaining the estimated wheel cylinder pressure at the time of completion of the regenerative brake control. That is, as illustrated in FIG. 19A, since the regenerative braking force is fully replaced with the controlled hydraulic braking force at the time of completion of the regenerative brake control, the wheel cylinder pressure that will be generated at the end of the regenerative brake control can be estimated by adding the regenerative execution hydraulic pressure to the wheel cylinder pressure in the present calculation period.

In this case, the wheel cylinder pressure in the present calculation period can be obtained on the basis of the deceleration presently acquired. For example, a vehicle speed is calculated on the basis of a wheel speed obtained from a detection signal from a wheel speed sensor (not shown) and then a time derivative is applied to the calculated vehicle speed, or a deceleration is directly obtained from a detection signal from an acceleration sensor (not shown), thereby acquiring a braking force that is assumed to cause that deceleration. Then, the obtained braking force is converted to the wheel cylinder pressure to thereby obtain the wheel cylinder pressure in the present calculation period.

The program then proceeds to step 320 in which the stroke amount of the brake pedal 21 is calculated. The stroke amount is obtained on the basis of characteristics between the wheel cylinder pressure and the stroke amount. For example, the characteristics between the wheel cylinder pressure and the stroke amount are as in the relation illustrated in FIG. 18. Thus, a map (or an approximating function thereof) representing the correlation illustrated in FIG. 18 is stored beforehand in the ROM and the like of the brake ECU 60 for obtaining the stroke amount corresponding to the present wheel cylinder pressure obtained in step 310. Afterwards the program proceeds to step 330 in which the stroke amount corresponding to the estimated wheel cylinder pressure at the end of the regenerative brake control is obtained on the basis of the map representing the correlation illustrated in FIG. 18.

In step 340, the variation in stroke during the replacement is calculated on the basis of a difference between the stroke amount corresponding to the present wheel cylinder pressure obtained in step 320 and the stroke amount corresponding to the estimated wheel cylinder pressure at the end of the regenerative brake control obtained in step 330. The program then proceeds to step 350 in which the stroke variation per time unit is calculated. Specifically, a time interval from the start of the regenerative brake control to the end thereof is calculated, the result of which is used for dividing the stroke variation obtained in step 340.

Next, in step 360, a regenerative request hydraulic pressure map is decided on the basis of the stroke variation per time unit. That is, the map of the wheel cylinder pressure and the stroke amount is decided by means of which the stroke variation per time unit can be constant. For example, the relation illustrated in FIG. 22 in which the decrease of the regenerative request hydraulic pressure is gradually larger with the passage of time can be achieved.

In the above, the map is used. However, the relation represented by the map can be approximated as a quadratic function expression or higher dimensional function expression, to which an elapsed time from the replacement start is substituted to thereby obtain the regenerative request hydraulic pressure. In this case, the quadratic function expression or higher dimensional function expression that is provided per vehicle speed during the replacement for obtaining the regenerative request hydraulic pressure can be identified when the vehicle speed is identified. Alternatively, the quadratic function expression or higher dimensional function expression that is provided per time period required for the replacement can be identified when the vehicle speed is identified.

When the map decision process is completed in the aforementioned manner, the program returns to the cooperative control process illustrated in FIG. 20 and proceeds to step 200. In step 200, the regenerative request torque is calculated on the basis of the map decided by the map decision process in step 190. Precisely, the elapsed time from the replacement start is measured and then the regenerative request torque corresponding thereto is read out from the map. The elapsed time from the replacement start is obtained, for example, by activating a timer incorporated in the brake ECU 60 from a point where the replacement start flag is set, by incrementing a count value of a counter (not shown) per calculation period, and the like.

Next, in step 210, a signal representing the regenerative request torque obtained in step 200 is sent to the hybrid ECU 19. The hybrid ECU 19 then causes the motor 12 to be driven via the inverter 16 such as by bringing an electromagnetic clutch for connecting or disconnecting the motor 12 and the front wheels FL and FR to a connected state so that the motor 12 is driven by the rotation force of the front wheels FL and FR for power generation, thereby generating the regenerative braking force by means of a resistance of the motor 12. The driving state of the motor 12 at this time such as the connecting time of the electromagnetic clutch is adjusted to thereby control the regenerative braking force to be responsive to the regenerative request torque. At the same time, the hybrid ECU 19 calculates the regenerative execution torque based on a counter electromotive force occurring at the motor 12 at this time and sends a signal representing the calculated regenerative execution torque to the brake ECU 60.

Accordingly, in step 220, the brake ECU 60 receives the signal representing the regenerative execution torque from the hybrid ECU 19. Then, in step 230, the brake ECU 60 calculates the regenerative execution hydraulic pressure by converting the regenerative execution torque into the hydraulic pressure and thereafter, in step 240, obtains the target wheel cylinder pressure by subtracting the regenerative execution hydraulic pressure obtained in step 230 from the target total hydraulic pressure obtained in step 110.

When the target wheel cylinder pressure is obtained in step 130 or step 240, the program proceeds to step 250 in which a linear valve output value required for generating the controlled hydraulic pressure is calculated by subtracting the master cylinder pressure from the target wheel cylinder pressure. In this case, the linear valve output is equal to a required current value for obtaining a differential pressure desired to occur at the hydraulic pressure control valves 31 and 41. The differential pressure to occur at the hydraulic pressure control valves 31 and 41 corresponds to a difference of the wheel cylinder pressure that can be enhanced relative to the master cylinder pressure. Thus, the differential pressure generated at the hydraulic pressure control valves 31 and 41 is directly equal to the increase of the wheel cylinder pressure corresponding to the hydraulic braking force desired to occur upon the pump drive.

Finally, in step 260, the current value obtained in step 250 is supplied as the linear valve output to a solenoid of the hydraulic pressure control valves 31 and 41 (linear valve) to that the differential pressure corresponding to the increase of the wheel cylinder pressure in response to the hydraulic braking force desired to occur can be generated at the hydraulic pressure control valves 31 and 41.

According to the aforementioned cooperative control process, in the case of replacing the regenerative braking force with the controlled hydraulic braking force, the decrease of the regenerative braking force per time unit is small at the early stage of the replacement and then is gradually larger as illustrated in FIG. 19A for the purposes of bringing the stroke amount per time unit to be constant. Thus, the increase of the stroke amount is made constant per time unit as illustrated in FIG. 19B, thereby preventing a poor braking feeling.

An alternative embodiment to the third embodiment will be explained below. According to the third embodiment, the decrease of the regenerative braking force per time unit is small at the early stage of the replacement and is then gradually larger to thereby bring the increase of the stroke amount per time unit to be constant. According to the present alternative embodiment, the increase of the regenerative braking force per speed unit, instead of time unit, is small at the early stage of the replacement and is then gradually larger. Thus, the structure of the braking apparatus for a vehicle 1 is substantially the same as that of the third embodiment and only the map decision process performed by the brake ECU 60 is different, which will be explained below.

Figure 23:
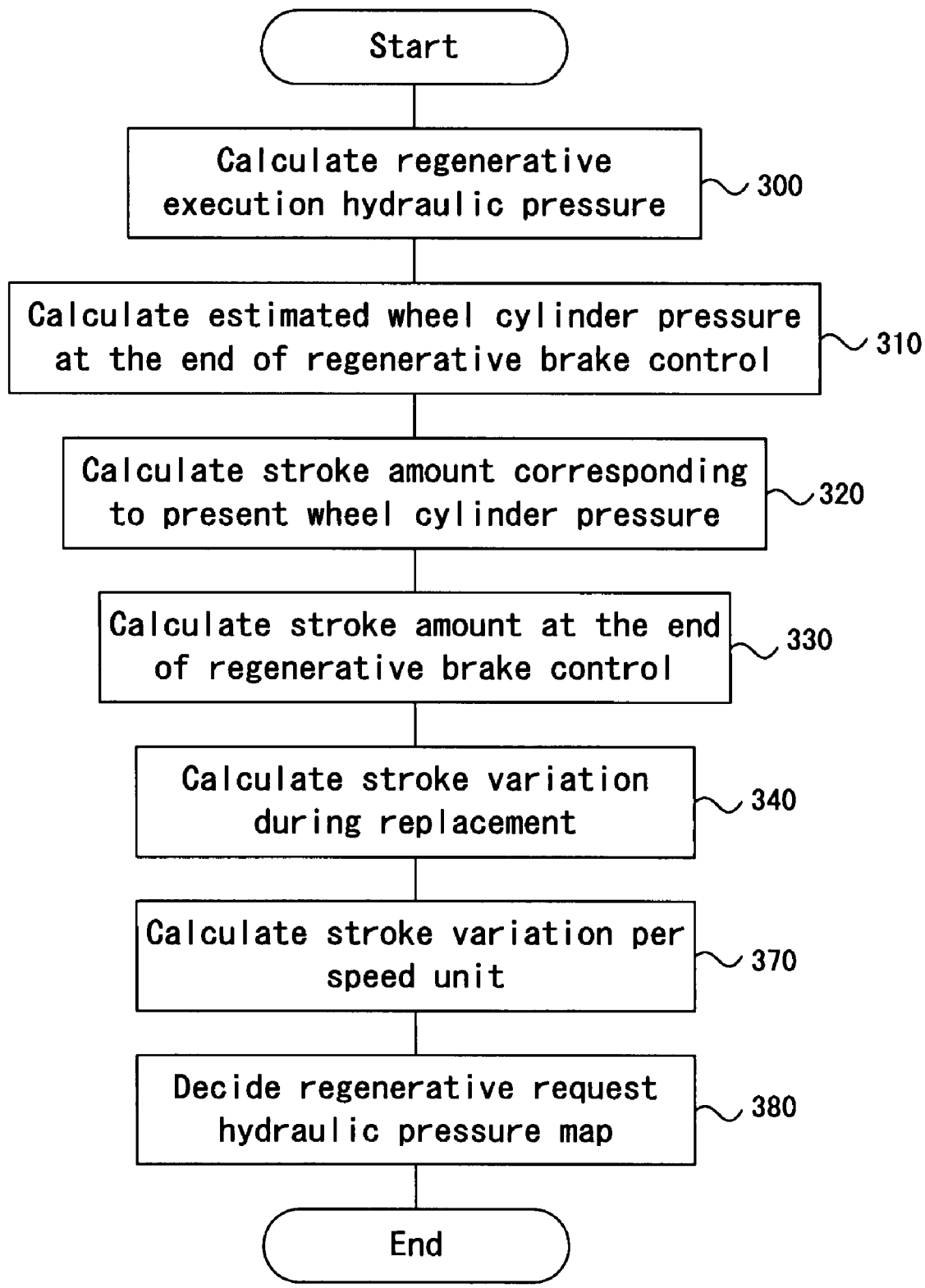
FIG. 23 is a flowchart of the map decision process according to an alternative embodiment to the third embodiment.
Figure 24:
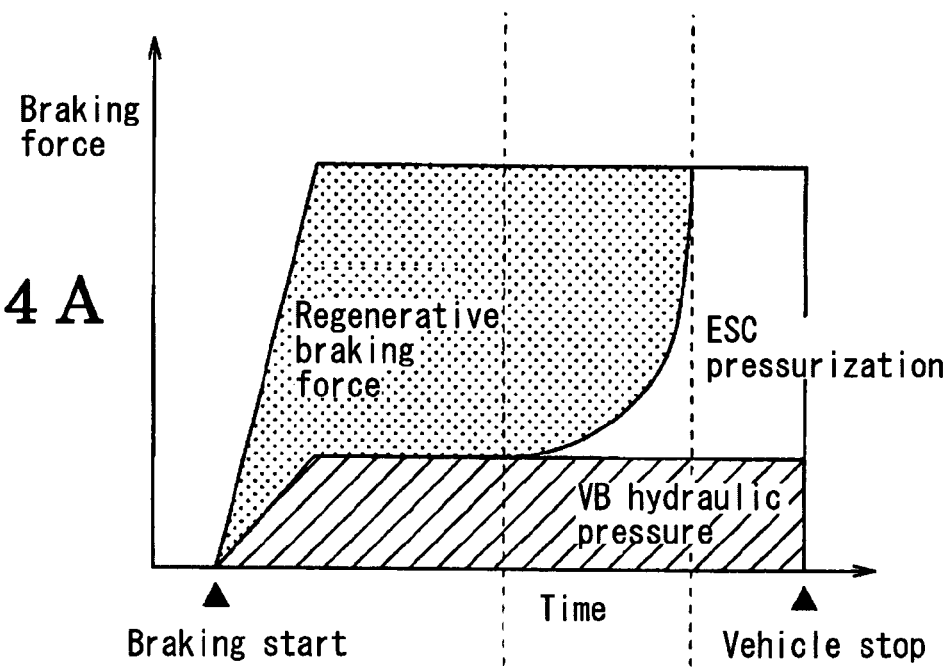
FIGS. 24A and 24B are time charts illustrating a correlation between the composition of the braking force and the stroke of the brake pedal according to the alternative embodiment to the third embodiment.
Figure 24:
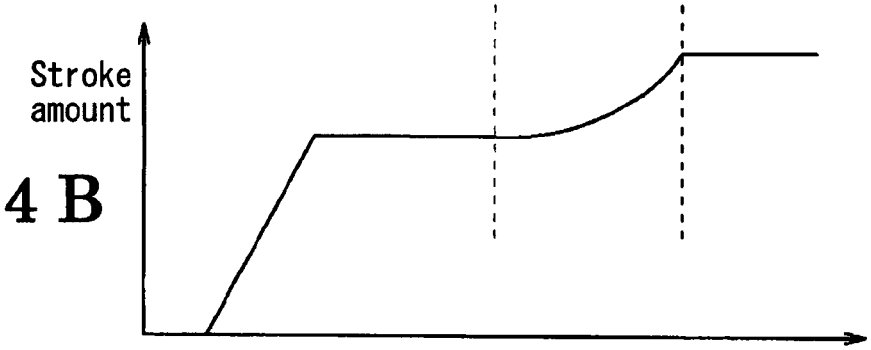

FIG. 23 is a flowchart illustrating details of the map decision process performed by the brake ECU 60 provided at the braking apparatus 1 according to the present alternative embodiment. As illustrated in FIG. 23, steps 300 through 340 in the map decision process are same as those of the third embodiment. In step 370, the stroke variation per speed unit is calculated. The stroke variation per speed unit is the stroke amount when the vehicle speed changes by a predetermined speed. For example, a value obtained by dividing a speed change from the replacement start to the replacement end by an equal interval is defined as the predetermined speed.

In step 380, the regenerative request hydraulic pressure map is decided from the map of the wheel cylinder pressure and the stroke amount so that the stroke variation per speed unit can be constant. For example, the relation illustrated in FIG. 22 in which the horizontal axis is changed from time to speed is obtained. The regenerative request hydraulic pressure is gradually larger as the speed changes. In this case, the map is used. Alternatively, the relation represented by the map can be approximated as a quadratic function expression or higher dimensional function expression.

When the map decision process is completed in the aforementioned manner, the program returns to the cooperative control process illustrated in FIG. 20 and proceeds to step 200, thereby performing the control same as that of the third embodiment.

Accordingly, the control for achieving the constant stroke variation per speed unit can be achieved. In this case, strictly speaking, the stroke variation per time unit is not precisely constant. However, since the decrease of the vehicle speed is substantially constant relative to the passage of time, the similar advantage to that of the third embodiment can be still obtained even when the stroke variation per speed unit is made constant.

However, the decrease of the vehicle speed may not be sometimes constant relative to the passage of time. If the decrease of the vehicle speed is large and thus the vehicle speed reaches zero earlier than expected, the vehicle speed may reach zero before completion of the replacement while the replacement is being performed so as to control the stroke variation per time unit to be constant. Thus, the control for bringing the stroke variation per speed unit to be constant should be performed while considering such a case, thereby achieving the same advantage as that of the third embodiment and a better robustness while securely completing the replacement.

According to the aforementioned third embodiment, the decrease of the regenerative braking force per time unit is small at the early stage of the replacement and is then gradually larger, thereby achieving the constant increase of the stroke amount per time unit. The driver is prevented from having a poor braking feeling accordingly. In the similar way, the change in the stroke amount can be prevented from suddenly becoming large at the moment of replacement start and be gradually larger, thereby also preventing a poor braking feeling.

A case in which the change in the stroke amount becomes gradually larger from the replacement start is illustrated in FIGS. 24A and 24B. FIG. 24A is a view illustrating a state where the regenerative braking force is replaced with the controlled hydraulic braking force based on a time axis. FIG. 24B is a view illustrating the change in stroke amount of the brake pedal 21 correlated to the time axis. As illustrated in FIGS. 24A and 24B, the change in the stroke amount is gradually larger from the replacement start. The correlation of such change in the stroke amount per time unit can be obtained by using a map (or approximating higher dimensional function expression) in which the increase of the stroke amount with the passage of time is made larger as compared to the correlation of the regenerative request hydraulic pressure relative to time in the map illustrated in FIG. 22.

Further, according to the aforementioned third embodiment and its alternative embodiment, each wheel cylinder pressure is obtained and then each stroke amount of the brake pedal 21 in response to each wheel cylinder pressure is obtained so as to use the correlation between the wheel cylinder pressure and the pedal stroke amount as illustrated in FIG. 18. In the similar way, a braking force, a deceleration, and the like of the wheels besides the wheel cylinder pressure are available as a parameter that indicates or corresponds to the wheel cylinder pressure and that has also the characteristics (i.e., correlation) as illustrated in FIG. 18. Accordingly, it is possible to obtain the braking force or the deceleration so as to obtain the pedal stroke amount in response to the obtained braking force or the deceleration based on the correlation between the braking force and the pedal stroke amount or between the deceleration and the pedal stroke amount.

Furthermore, according to the aforementioned third embodiment and its alternative embodiment, the map or the function expression for the regenerative request hydraulic pressure as a parameter corresponding to the regenerative request torque is used (see step 360) for obtaining the regenerative request torque at the time of replacement. Instead, a map or a function expression for the torque equivalent of the regenerative request hydraulic pressure may be created from the beginning and used for obtaining the regenerative request torque.

Each step in the flowchart corresponds to each means for performing various processes. For example, a portion of the brake ECU 60 for performing the process in step 110 corresponds to a target total braking force calculating means, a portion for performing the process in step 310 corresponds to a parameter detecting means, a portion for performing the process in step 320 corresponds to a stroke amount detecting means during the replacement, a portion for performing the process in step 330 corresponds to a stroke amount detecting means at the end of regeneration, a portion for performing the process in step 340 corresponds to a stroke variation calculating means, a portion for performing the processes in steps 350 and 370 corresponds to a variation per time unit or speed unit calculating means, a portion for performing the process in steps 360 and 380 corresponds to a regenerative request torque characteristics deciding means, and a portion for performing the process in step 200 corresponds to a regenerative request torque detecting means.

According to the third and its alternative embodiments, the replacement amount of the regenerative braking force with the controlled hydraulic braking force is gradually increased so that the variation of the stroke amount can be constant, or so that the stroke amount is prevented from becoming suddenly large at the moment of replacement, thereby avoiding giving a poor braking feeling.

Further, according to the third and its alternative embodiments, the stroke amount during the replacement and that at the end of the replacement are obtained on the basis of which the stroke amount variation during the replacement is calculated. Then, the stroke amount variation per time unit or per speed unit can be calculated so that the increase of the stroke amount per time unit or per speed unit can be substantially constant or be gradually increased with the passage of time from the replacement start or with the decrease of the vehicle speed. In doing so, the map or the function expression for the regenerative request torque corresponding to the stroke amount variation per time unit or per speed unit is decided and then used for obtaining the regenerative request torque so as to generate the corresponding regenerative braking force by the regenerative brake apparatus, thereby avoiding giving a poor braking feeling to the driver.

In this case, the regenerative request torque characteristics deciding means can use the map in which the regenerative request torque is made larger with the passage of time from the replacement start or the map in which the regenerative request torque is made larger along with the decrease of the vehicle speed from the replacement start for the regenerative request torque corresponding to the stroke amount variation per time unit or per speed unit.

Furthermore, the regenerative request torque characteristics deciding means can use the quadratic function expression or higher dimensional function expression approximating the correlation between the passage of time from the replacement start or the decrease of the vehicle speed from the replacement start, and the regenerative request torque for the regenerative request torque corresponding to the stroke amount variation per time unit or per speed unit.

Furthermore, as a parameter corresponding to the wheel cylinder pressure, the deceleration of the vehicle or the braking force of the wheels can be used as well as the wheel cylinder pressure itself.

A braking apparatus for a vehicle 1 according to a fourth embodiment of the present invention employed in a hybrid vehicle will be explained with reference to the attached drawings. The fourth embodiment has a substantially same structure as that of the first, second, and third embodiments and thus an explanation for the similar structure will be omitted and only a different portion will be explained below.

An operation of the braking apparatus for a vehicle 1 according to the fourth embodiment will be explained with reference to FIGS. 26 to 30. Before explaining the detailed operation of the braking apparatus 1, a reason why the operation is performed will be described below.

FIG. 26 is a view illustrating a correlation between an elapsed time from the braking start and each braking force. As illustrated in FIG. 26, at the time of the braking start, the request braking force by the driver is achieved by adding the regenerative braking force generated by the regenerative brake apparatus A to the hydraulic braking force caused by the master cylinder pressure generated in the master cylinder 23 based on the operation force of the brake pedal 21 that is boosted at the vacuum booster 22 (i.e., basic hydraulic braking force). Then, the regenerative braking force is replaced with the hydraulic braking force by the pump drive (i.e., controlled hydraulic braking force) with the passage of time.

The replacement of the regenerative braking force with the controlled hydraulic braking force is started when the positive determination is made at the replacement start determination performed by the brake ECU 60. The replacing method is same as that explained for the third embodiment.

At the timing of the replacement start, in order that the controlled hydraulic braking force can follow the decrease of the regenerative braking force, i.e., in order that an amount of brake fluid supplied to the wheel cylinders WC1 and WC2 is prevented from being insufficient at the time of the pump drive, the motor M is brought to a high revolution state before the replacement start.

Specifically, the motor M is brought to rotate from the braking start timing. However, before the replacement of the regenerative braking force with the controlled hydraulic braking force, the revolution of the motor M is set in response to a load thereof (i.e., the wheel cylinder pressure at that time, viscosity resistance of the brake fluid, and the like). That is, the motor M is rotated only for the purposes of suppressing a time-lug at the time of start-up of the motor M and preparing for a case in which the request braking force cannot be satisfied by the regenerative braking force and the basic hydraulic braking force. The revolution of the motor M in response to the load thereof is much smaller than that required for the replacement. Thus, it is necessary to increase beforehand the revolution of the motor M to a certain level that is sufficient for the replacement. At this time, the start point to increase the revolution of the motor M to a high level can be any time as long as the revolution of the motor M when the pump drive is started reaches a certain level at which the decrease of the regenerative braking force can be compensated. However, the early rotation of the motor M at a high level may cause wasted power consumption, which should be avoided.

Thus, according to the present embodiment, the revolution of the motor M is set to achieve the revolution of the motor M by means of which the decrease of the regenerative braking force can be compensated when the pump drive is started while avoiding the wasted power consumption as much as possible.

Next, a motor revolution setting process during the cooperative control performed by the brake ECU 60 for setting the revolution of the motor M will be explained below. Since the overview of the cooperative control is substantially same as that of the conventional apparatus, the explanation thereof is omitted and only a different point, i.e., the motor revolution setting process, will be described.

Figure 27:
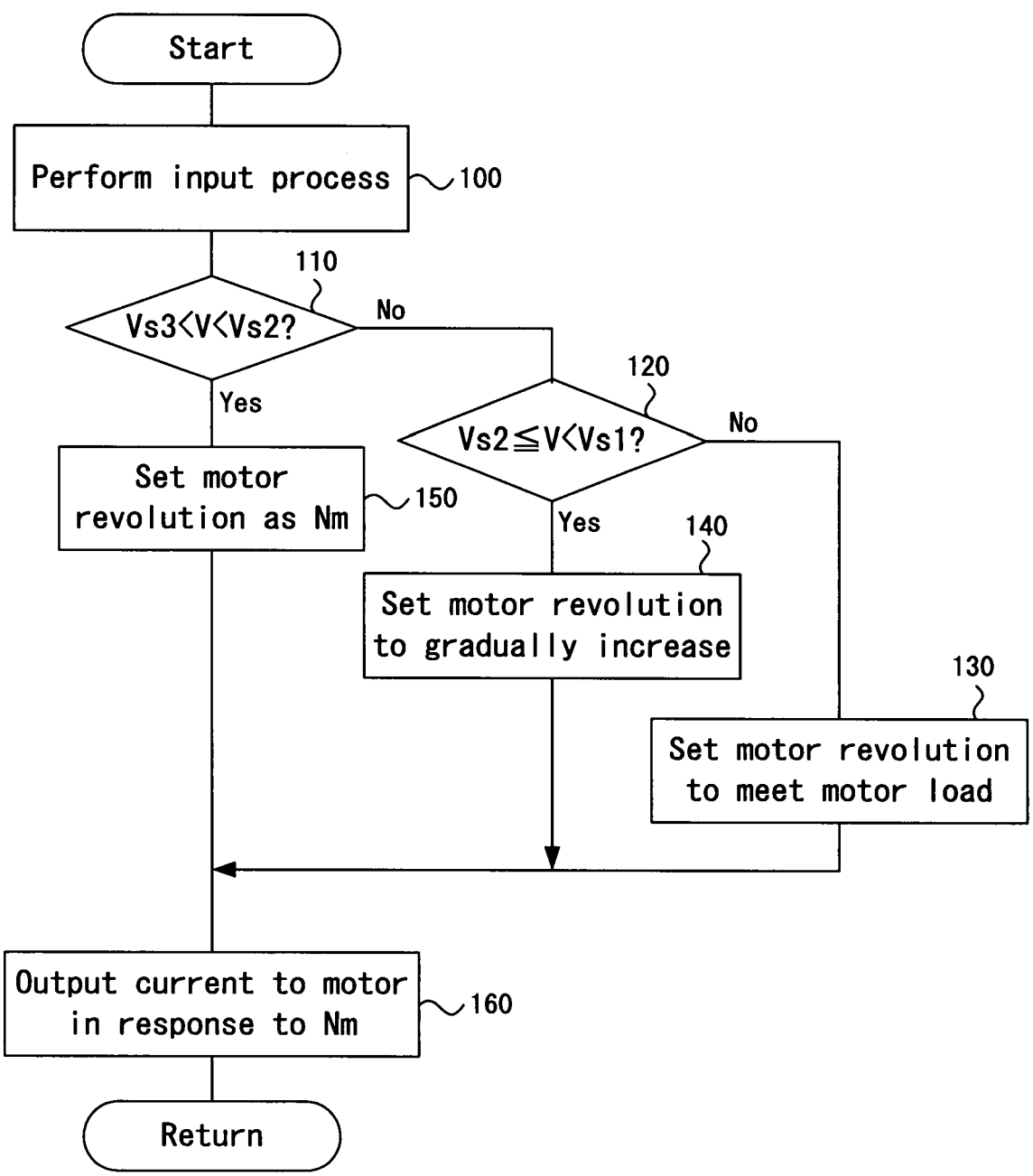
FIG. 27 is a flowchart of a motor revolution setting process according to the forth embodiment.

FIG. 27 is a flowchart of the motor revolution setting process. The motor revolution setting process is conducted according to a program stored beforehand in the ROM, and the like of the brake ECU 60 per predetermined calculation period during the braking (i.e., for example, when a brake switch not shown is in ON state).

Figure 28:
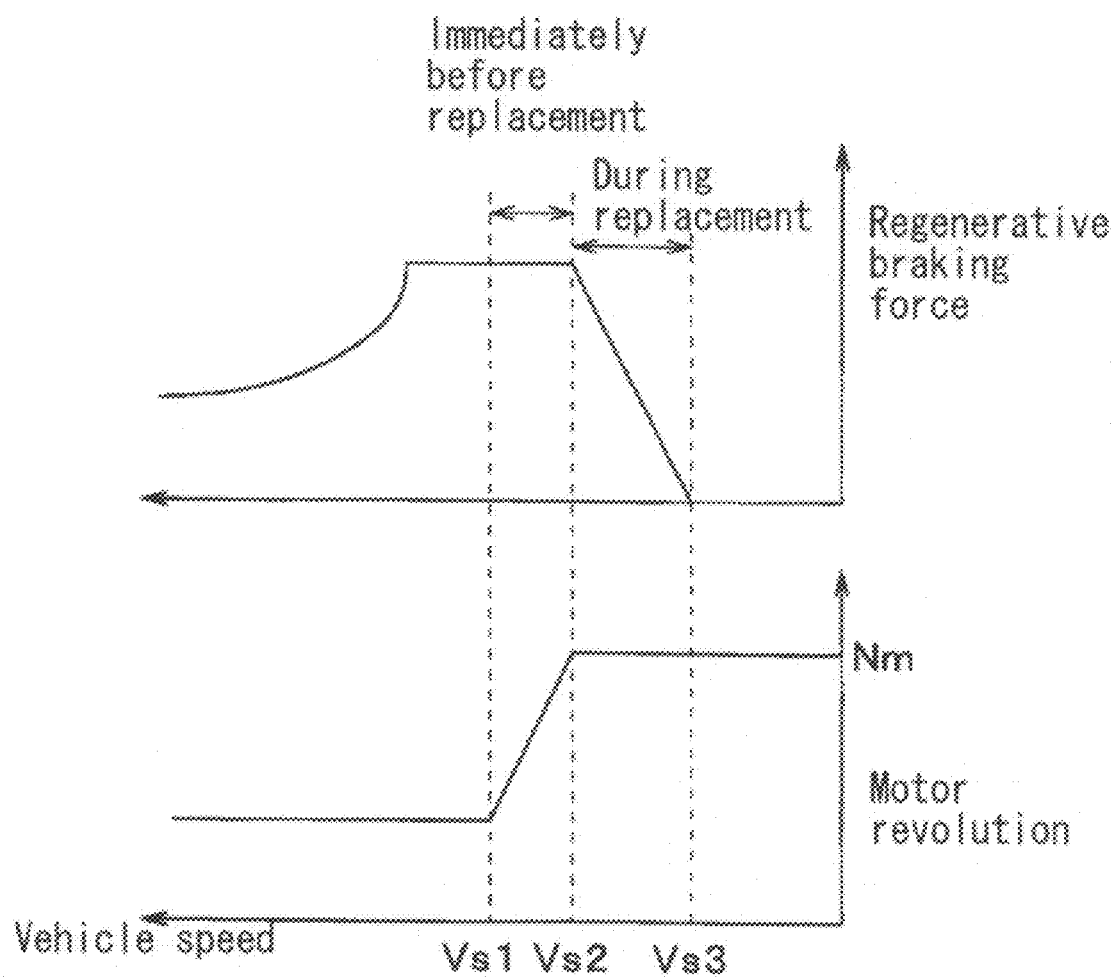
FIG. 28 is a time chart illustrating a regenerative braking force and a change in a motor revolution when the motor revolution setting process is performed according to the forth embodiment.

FIG. 28 is a timing chart illustrating the regenerative braking force and the change in motor revolution when the motor revolution setting process is conducted. According to the present embodiment, as illustrated in FIG. 28, the replacement is completed when the vehicle speed V reaches Vs3 (second speed) and is started when the vehicle speed V reaches Vs2 (first speed) that is greater than Vs3 by a predetermined speed. Then, a point at which the vehicle speed V reaches Vs1 (third speed) is set as a revolution increase start time so that the revolution of the motor M reaches the level required for the replacement.

In step 100, an input process is performed. Precisely, the brake ECU 60 inputs a detection signal from a wheel speed sensor to obtain the vehicle speed V, a detection signal from the pressure sensor P to obtain the master cylinder pressure, various data from the hybrid ECU 19 required for the regenerative brake control, and the like.

Next, in step 110, it is determined whether or not the replacement is being conducted. That is, it is determined whether or not the vehicle speed V is greater than the second speed Vs3 and at the same time smaller than the first speed Vs2 (i.e., Vs3<V<Vs2). When the replacement is not conducted, the negative determination is made and then the program proceeds to step 120.

In step 120, it is determined whether or not the replacement is about to start. That is, it is determined whether or not the vehicle speed V is smaller than the third speed Vs1 and at the same time equal to or greater than the first speed Vs2 (i.e., Vs2<V<Vs1). Until the replacement is about to start, the negative determination is made and then the program proceeds to step 130 in which the revolution of the motor M is set in response to the load thereof. On the other hand, when it is determined that the replacement is about to start and the positive determination is made in step 120, the program proceeds to step 140.

In step 140, the revolution of the motor M is set so as to gradually increase. Precisely, when the replacement start timing is met, the revolution of the motor M is set so as to increase to a revolution level Nm that is determined from a map representing the correlation between the wheel cylinder pressure and a wheel cylinder pressure change amount per time unit DpWC.

The wheel cylinder pressure change amount per time unit DpWC, and a map representing the correlation between the wheel cylinder pressure and the wheel cylinder pressure change amount per time unit DpWC will be explained below.

Figure 29:
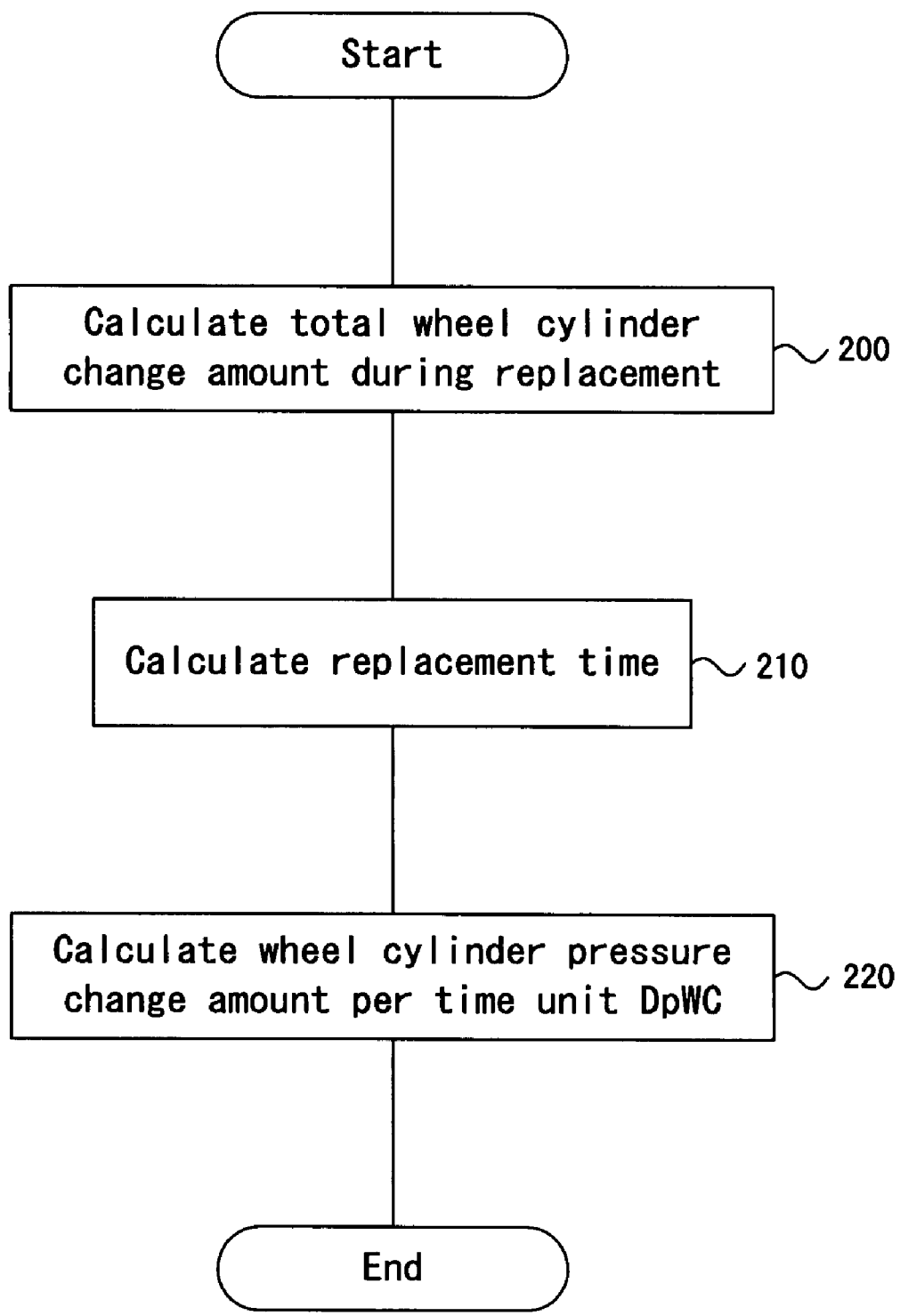
FIG. 29 is a flowchart of a calculation process for a wheel cylinder pressure change amount per time unit.

The wheel cylinder pressure change amount per time unit DpWC is obtained by dividing the total wheel cylinder pressure change amount during the replacement by the replacement time and is calculated on the basis of a flowchart of the calculation process of the wheel cylinder pressure change amount per time unit DpWC illustrated in FIG. 29.

First, in step 200, the total wheel cylinder change amount during the replacement, i.e., from the replacement start to the replacement end, is calculated. The total wheel cylinder pressure change amount is equal to the regenerative execution hydraulic pressure, which can be obtained by converting the regenerative execution torque received from the hybrid ECU 19 into the hydraulic pressure. Alternatively, at this time, the hybrid ECU 19 can convert the regenerative execution torque into the hydraulic pressure beforehand. Then, data representing the obtained regenerative execution hydraulic pressure can be input to the brake ECU 60. In this case, the brake ECU 60 inputs the data representing the regenerative execution hydraulic pressure in step 200.

Then, in step 210, the replacement time is calculated. The replacement time is a total time required for replacing the regenerative braking force with the controlled hydraulic braking force. The replacement time is obtained, using the deceleration acquired by a time-derivative of the vehicle speed, on the assumption that a time period for the vehicle speed V to be decelerated from Vs2 to Vs3 corresponds to the replacement time. That is, a value obtained by dividing a speed difference between Vs2 and Vs3 by the deceleration at the replacement start time (i.e., (Vs2−Vs3)/deceleration) is regarded as the replacement time.

In step 220, the wheel cylinder pressure change amount per time unit DpWC is calculated by dividing the total wheel cylinder pressure change amount obtained in step 200 by the replacement time obtained in step 210.

The revolution of the motor M required at the replacement start time, i.e., a required discharge amount of brake fluid, is correlated with the wheel cylinder pressure to be generated. The correlation therebetween varies depending on the wheel cylinder pressure change amount per time unit DpWC. FIG. 30 illustrates the correlation between the wheel cylinder pressure and the motor revolution in the cases where the wheel cylinder pressure change amount per time unit DpWC varies into three levels, i.e., DpWC1, DpWC2, and DpWC3 (in this case, DpWC1<DpWC2<DpWC3). As illustrated in FIG. 30, in order to achieve the wheel cylinder pressure change amount per time unit DpWC, the required motor revolution is larger when the wheel cylinder pressure generated is smaller (i.e., the required discharge amount of brake fluid is larger), and, on the other hand, the required motor revolution is smaller when the wheel cylinder pressure generated is larger (i.e., the required amount of brake fluid is smaller). In addition, the greater the wheel cylinder pressure change amount per time unit DpWC is, the larger the required motor revolution is (i.e., the required amount of brake fluid is larger) even with the same wheel cylinder pressure generated.

Accordingly, multiple maps (or function expression) each representing the correlation between the wheel cylinder pressure and the motor revolution corresponding to each magnitude of the wheel cylinder pressure change amount per time unit DpWC have been stored beforehand in the ROM, and the like of the brake ECU 60 so that, when the wheel cylinder pressure change amount per time unit DpWC is desired, the map corresponding thereto can be selected.

Therefore, in step 140, when the wheel cylinder pressure change amount per time unit DpWC is obtained according to the calculation process illustrated in FIG. 29, the map corresponding to the obtained wheel cylinder pressure change amount per time unit DpWC is selected from the multiple maps stored so as to obtain the total wheel cylinder pressure during the replacement. The total wheel cylinder pressure at this time is on the basis of the master cylinder pressure in the master cylinder 23 generated upon boosting of the vacuum booster 22 during the replacement and thus obtained on the basis of the master cylinder pressure input in step 100.

When the map corresponding to the wheel cylinder pressure change amount per time unit DpWC is selected and the wheel cylinder pressure is obtained, the motor revolution corresponding to the obtained wheel cylinder pressure is acquired using the selected map and is then stored as Nm.

Then, a value obtained by subtracting the revolution in response to the motor load set in step 130 from the revolution is regarded as the required revolution change amount until the replacement start, which is then divided by the replacement time obtained in step 210 so as to obtain the revolution change amount per time unit. The motor revolution is gradually increased so as to meet this revolution change amount per time unit. For example, at the time before the replacement start, the process in step 140 is conducted per calculation period. Thus, the revolution change amount per calculation period is obtained as the revolution change amount per time unit and then the revolution of the motor M is increased by the revolution change amount per calculation period each time the process in step 140 is conducted.

The revolution of the motor M is increased in the aforementioned manner and, when the replacement start timing is met, the positive determination is made in step 110. In this case, the program proceeds to step 150 in which the revolution of the motor M is set to Nm.

When the revolution of the motor M is specified in the aforementioned steps 130 through 150, the program proceeds to step 160 in which the current in response to the specified revolution of the motor M is supplied thereto so that the revolution of the motor M reaches the specified revolution level.

Accordingly, as illustrated in FIG. 28, the revolution of the motor M can be controlled to a certain level required for the replacement, thereby preventing the start-up delay of the controlled hydraulic braking force because of the insufficient brake fluid supplied by the pumps 37 and 47.

As mentioned above, according to the braking apparatus for a vehicle 1 of the present embodiment, the revolution of the motor M is increased prior to the replacement so as to achieve the certain level by which the decrease of the regenerative braking force caused at the start time of the pump drive can be compensated. Therefore, the brake fluid supplied by the pumps 37 and 47 is prevented from being insufficient and then the wheel cylinder pressure equal to the differential pressure command value by the hydraulic pressure control valves 31 and 41 can be achieved. The deceleration that has been obtained before the replacement can be retained after the replacement, thereby preventing an issue that the start-up of the hydraulic braking force is delayed because of the insufficient brake fluid supplied by the pumps 37 and 47.

Further, the start timing of the revolution of the motor M is adjusted so that the motor M achieves the required revolution at the replacement start time. Thus, the wasted power consumption caused by the early rotation of the motor M at the high level can be prevented.

According to the present embodiment, the revolution increase start timing of the motor M prior to the replacement is conducted when the vehicle speed V reaches Vs1. Setting of Vs1 decides the increasing gradient of the revolution of the motor M. This gradient is associated with a degree of noise upon rotation of the motor M, a suction amount of the brake fluid in the master cylinder 23 due to the driving of the pumps 37 and 47, i.e., the amount of further depression of the brake pedal 21, which thus should be considered.

Further, according to the present embodiment, each step in the flowchart corresponds to each means for performing various processes. For example, a portion of the brake ECU 60 for performing the process in step 140 corresponds to the motor revolution setting means, a portion for performing the process in step 200 corresponds to the total change amount calculating means, a portion for performing the process in step 210 corresponds to the replacement time calculating means, and a portion for performing the process in step 220 corresponds to a change amount per time unit calculating means.

Furthermore, according to the forth embodiment, prior to the replacement start, the revolution of the motor is increased to a certain level at which the decrease of the regenerative braking force can be compensated when the pump drive is started, thereby preventing insufficiency of the amount of brake fluid supplied by the pump. As a result, the start-up of the controlled hydraulic braking force is prevented from delaying.

Furthermore, according to the forth embodiment, the revolution of the motor is gradually increased while the vehicle speed is changed to the first speed from the third speed. Thus, the start timing to increase the motor revolution can be adjusted so as to obtain the certain revolution at the time of replacement start, which can prevent the wasted power consumption that may be caused by early rotating the motor at the high level.

Furthermore, according to the forth embodiment, the motor revolution (Nm) corresponding to the wheel cylinder pressure at the time of replacement start can be obtained by using the map or function expression representing the correlation between the wheel cylinder pressure and the revolution of the motor correlated to an amount of change in the wheel cylinder pressure per time unit. Then, prior to the replacement start, the revolution of the motor can be increased to the level obtained, thereby preventing the start-up delay of the controlled hydraulic braking force because of the insufficient brake fluid supplied by the pump.

According to the aforementioned embodiments, the front and rear brake systems are provided in a front engine front drive vehicle. However, the front and rear brake systems in a front engine rear drive vehicle can be employed. Further, according to the aforementioned embodiment the vacuum booster 22 is used as a booster device. However, a booster device for accumulating in an accumulator the hydraulic pressure generated by the pump and then for boosting or increasing the accumulated hydraulic pressure can be used.

Furthermore, according to the aforementioned embodiments, the motor 12 is directly connected to the wheels FL and FR or an axle thereof. However, instead, the motor 12 may be connected via a decelerator. In such a case, the embodiments of the present invention can be still used.

Furthermore, according to the aforementioned embodiments, the brake ECU 60 and the hybrid ECU 19 constitute the controlling means. However, the controlling means may be constituted together with the other ECU. In addition, each function that the brake ECU 60 and the hybrid ECU 19 includes is only an example and may be achieved by a single ECU in which the brake ECU 60 and the hybrid ECU 19 are integrated. A function portion that achieves the aforementioned each function may be provided at the other ECU than the brake ECU 60 and the hybrid ECU 19.

Furthermore, according to the aforementioned embodiments, the brake pedal is explained as the brake operation member. Alternatively, a brake lever may be the brake operation member. Further, the request braking force by the driver in response to the operation of the brake operation member is obtained on the basis of the detection signal of the pressure sensor P. In this case, other components or parts that generate an output corresponding to the request braking force by the driver such as a detection signal of a pedal pressure sensor for detecting the depression of the brake pedal 21 may also be accepted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A braking apparatus for a vehicle, comprising:
a hydraulic brake apparatus including a master cylinder, a pump which suctions brake fluid in the master cylinder and discharges the brake fluid to wheel cylinders provided at respective wheels, a hydraulic pressure control valve, and a fluid passage and generating a basic hydraulic pressure by the master cylinder in response to a brake operation so as to apply the generated basic hydraulic pressure to the wheel cylinders provided at the respective wheels connected to the master cylinder by means of the fluid passage at which the hydraulic pressure control valve is provided so that a basic hydraulic braking force is generated at the wheels, the hydraulic brake apparatus generating a controlled hydraulic pressure by driving the pump by a motor so as to apply the generated controlled hydraulic pressure to the wheel cylinders so that a controlled hydraulic braking force is generated at the wheels;
a regenerative brake apparatus causing, during regenerative brake control, a regenerative braking force to be generated at any of the wheels in response to a state of the brake operation; and
braking force replacement controlling means for gradually replacing the regenerative braking force with the controlled hydraulic braking force while braking during which at least the regenerative braking force is applied for a purpose of achieving a braking force replacement control to ensure a total braking force required for the wheels by decreasing the regenerative braking force at a gradient within a predetermined range and by increasing the controlled hydraulic braking force in response to the decrease of the regenerative braking force;

wherein the braking force replacement controlling means specifies a gradually increasing replacement amount per time unit of the regenerative braking force with the controlled hydraulic braking force so that the replacement amount per time unit gradually increases over time from a start replacement at which replacement of the regenerative braking force with the controlled hydraulic braking force is started, and the braking force replacement controlling means includes:

target total braking force calculating means for calculating a target total braking force to generate a request braking force by a driver for the vehicle in response to the brake operation of a brake operation member;

parameter detecting means for detecting a parameter that represents a wheel cylinder pressure generated by the hydraulic brake apparatus at a time of the replacement;

stroke amount detecting means for obtaining, during the replacement, a stroke amount of the brake operation member corresponding to the parameter that represents the wheel cylinder pressure detected by the parameter detecting means during the replacement;

estimated parameter calculating means for calculating a parameter that represents an estimated wheel cylinder pressure generated by the hydraulic brake apparatus at the end of the replacement;

stroke amount detecting means for obtaining, at the end of the regenerative brake control, a stroke amount of the brake operation member corresponding to the parameter that represents the estimated wheel cylinder pressure calculated by the estimated parameter calculating means;

stroke variation calculating means for calculating a stroke variation during the replacement based on the stroke amount obtained by the stroke amount detecting means during the replacement and the stroke amount obtained by the stroke amount detecting means at the end of the regenerative brake control;

variation per time unit or speed unit control means for controlling the stroke variation which varies in per time unit or speed unit so that an increase of the stroke amount per time unit or speed unit is constant or is gradually increasing in association with an elapsed time from the start replacement or a deceleration on a basis of the stroke variation calculated by the stroke variation calculating means;

regenerative request torque characteristics deciding means for deciding a map or a function expression of a regenerative request torque corresponding to the stroke variation per time unit or speed unit obtained by the variation per time unit or speed unit calculating means; and regenerative request torque detecting means for obtaining the regenerative request torque based on the map or the function expression decided by the regenerative request torque characteristics deciding means.

2. A braking apparatus for a vehicle according to claim 1, wherein the braking force replacement controlling means starts the braking force replacement control when a vehicle speed reaches a start replacement vehicle speed and finishes the braking force replacement control when the vehicle speed reaches an end replacement vehicle speed that is smaller than the start replacement vehicle speed, the start replacement vehicle speed and the end replacement vehicle speed being variable so as to decrease the regenerative braking force at the gradient within the predetermined range during the braking force replacement control.

3. A braking apparatus for a vehicle according to claim 2, wherein the start replacement vehicle speed and the end replacement vehicle speed are defined on the basis of at least one of a deceleration and the regenerative braking force during the braking.

4. A braking apparatus for a vehicle according to claim 3, further comprising deceleration detecting means for detecting the deceleration, wherein the braking force replacement controlling means changes the start replacement vehicle speed to increase in response to an increase of the deceleration detected by the deceleration detecting means when the detected deceleration is larger than a predetermined value.

5. A braking apparatus for a vehicle according to claim 3, further comprising deceleration detecting means for detecting the deceleration, wherein the braking force replacement controlling means changes the end replacement vehicle speed to decrease in response to an increase of the deceleration detected by the deceleration detecting means when the detected deceleration is larger than a predetermined value.

6. A braking apparatus for a vehicle according to claim 5, wherein the end replacement vehicle speed is restricted by an end replacement vehicle speed lower limit.

7. A braking apparatus for a vehicle according to claim 1, wherein the hydraulic brake apparatus generates at least the controlled hydraulic braking force for any period while quantity of the brake operation state is increasing.

8. A braking apparatus for a vehicle according to claim 7, wherein the regenerative brake apparatus is prohibited to generate the regenerative braking force until a predetermined time has elapsed from an increased start of the quantity of the brake operation state, and the hydraulic brake apparatus generates the controlled hydraulic braking force in place of the regenerative braking force which is prohibited to be generated.

9. A braking apparatus for a vehicle according to claim 8, wherein the predetermined time is variable depending on a changing speed of the quantity of the brake operation state.

10. A braking apparatus for a vehicle according to claim 7, wherein the regenerative brake apparatus is prohibited to generate the regenerative braking force while quantity of the brake operation state is increasing, and the hydraulic brake apparatus generates the controlled hydraulic braking force in place of the regenerative braking force which is prohibited to be generated.

11. A braking apparatus for a vehicle according to claim 7, wherein the regenerative brake apparatus generates the regenerative braking force as a predetermined ratio of the total braking force required for the wheels in response to the state of the brake operation until a predetermined time has elapsed from an increased start of the quantity of the brake operation state, and the hydraulic brake apparatus generates the basic hydraulic braking force and the controlled hydraulic braking force as a remaining ratio of the total braking force.

12. A braking apparatus for a vehicle according to claim 11, wherein the predetermined ratio is variable depending on a vehicle speed at the braking start caused by the brake operation.

13. A braking apparatus for a vehicle according to claim 1, wherein the braking force replacement controlling means increases a revolution of the motor to a predetermined level at which a required discharge amount of brake fluid at the start replacement is obtained by the time the braking force replacement control is started.

14. A braking apparatus for a vehicle according to claim 1, wherein the gradual increase of the replacement amount per time unit causes a constant increase per time unit in stroke amount of a vehicle brake pedal.

15. A braking apparatus for a vehicle according to claim 1, wherein a decrease per time unit of the regenerative braking force resulting from the replacement amount per unit time specified by the braking force replacement controlling means is relatively small at an early stage after the start replacement speed is reached, and then gradually becomes larger.

16. A braking apparatus for a vehicle according to claim 1, wherein a gradual decrease per time unit of the regenerative braking force resulting from the replacement amount per time unit specified by the braking force replacement controlling means causes constant increase per time unit in stroke amount of a vehicle brake pedal.

17. A braking apparatus for a vehicle, comprising:
- a hydraulic brake apparatus including a master cylinder, a pump which suctions brake fluid in the master cylinder and discharges the brake fluid to wheel cylinders provided at respective wheels, a hydraulic pressure control valve, and a fluid passage and generating a basic hydraulic pressure by the master cylinder in response to a brake operation so as to apply the generated basic hydraulic pressure to the wheel cylinders provided at the respective wheels connected to the master cylinder by means of the fluid passage at which the hydraulic pressure control valve is provided so that a basic hydraulic braking force is generated at the wheels, the hydraulic brake apparatus generating a controlled hydraulic pressure by driving the pump by a motor so as to apply the generated controlled hydraulic pressure to the wheel cylinders so that a controlled hydraulic braking force is generated at the wheels;
- a regenerative brake apparatus causing, during regenerative brake control, a regenerative braking force to be generated at any of the wheels in response to a state of the brake operation;
- braking force replacement controlling means for gradually replacing the regenerative braking force with the controlled hydraulic braking force while braking during which at least the regenerative braking force is applied for a purpose of achieving a braking force replacement control to ensure a total braking force required for the wheels by decreasing the regenerative braking force at a gradient within a predetermined range and by increasing the controlled hydraulic braking force in response to the decrease of the regenerative braking force;
- an amount of the regenerative braking force which the braking force replacement controlling means replaces per unit time with the controlled hydraulic braking force constituting a replacement amount per unit time; and
- the braking force replacement controlling means specifying a non-constant replacement amount per time unit, and the braking force replacement controlling means including:
- target total braking force calculating means for calculating a target total braking force to generate a request braking force by a driver for the vehicle in response to the brake operation of a brake operation member;
- parameter detecting means for detecting a parameter that represents a wheel cylinder pressure generated by the hydraulic brake apparatus at a time of the replacement;
- stroke amount detecting means for obtaining, during the replacement, a stroke amount of the brake operation member corresponding to the parameter that represents the wheel cylinder pressure detected by the parameter detecting means during the replacement;
- estimated parameter calculating means for calculating a parameter that represents an estimated wheel cylinder pressure generated by the hydraulic brake apparatus at the end of the replacement;
- stroke amount detecting means for obtaining, at the end of the regenerative brake control, a stroke amount of the brake operation member corresponding to the parameter that represents the estimated wheel cylinder pressure calculated by the estimated parameter calculating means;
- stroke variation calculating means for calculating a stroke variation during the replacement based on the stroke amount obtained by the stroke amount detecting means during the replacement and the stroke amount obtained by the stroke amount detecting means at the end of the regenerative brake control;
- variation per time unit or speed unit control means for controlling the stroke variation which varies in per time unit or speed unit so that an increase of the stroke amount per time unit or speed unit is constant or is gradually increasing in association with an elapsed time from the start replacement or a deceleration on a basis of the stroke variation calculated by the stroke variation calculating means;
- regenerative request torque characteristics deciding means for deciding a map or a function expression of a regenerative request torque corresponding to the stroke variation per time unit or speed unit obtained by the variation per time unit or speed unit calculating means; and
- regenerative request torque detecting means for obtaining the regenerative request torque based on the map or the function expression decided by the regenerative request torque characteristics deciding means.

* * * * *